(12) United States Patent
Fox et al.

(10) Patent No.: US 9,955,364 B2
(45) Date of Patent: Apr. 24, 2018

(54) TELECOMMUNICATION NETWORKS

(71) Applicant: VODAFONE IP LICENSING LIMITED, Newbury, Berkshire (GB)

(72) Inventors: Dave Fox, Newbury (GB); Gavin Wong, Newbury (GB); Peter Cosimini, Newbury (GB); Christopher Pudney, Newbury (GB); Anthony Sammut, Newbury (GB); Assen Mahaboob Khan Golaup, Newbury (GB); John Moughton, Newbury (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 14/875,082

(22) Filed: Oct. 5, 2015

(65) Prior Publication Data
US 2016/0198349 A1 Jul. 7, 2016

Related U.S. Application Data

(62) Division of application No. 13/532,341, filed on Jun. 25, 2012, now Pat. No. 9,154,994.

(30) Foreign Application Priority Data

| Jun. 24, 2011 | (GB) | 1110744.8 |
| Jun. 24, 2011 | (GB) | 1110750.5 |
| Aug. 3, 2011 | (GB) | 1113405.3 |
| Aug. 3, 2011 | (GB) | 1113407.9 |
| Aug. 3, 2011 | (GB) | 1113859.1 |

(51) Int. Cl.
*H04L 12/28* (2006.01)
*H04W 24/02* (2009.01)
(Continued)

(52) U.S. Cl.
CPC .......... *H04W 24/02* (2013.01); *H04W 28/08* (2013.01); *H04W 36/0033* (2013.01); *H04L 45/00* (2013.01); *H04W 28/10* (2013.01)

(58) Field of Classification Search
CPC ...................................................... H04L 45/00
(Continued)

(56) References Cited

U.S. PATENT DOCUMENTS

| 9,154,994 B2 | 10/2015 | Fox et al. |
| 2003/0223419 A1 | 12/2003 | Yasaki et al. |

(Continued)

FOREIGN PATENT DOCUMENTS

| EP | 2081337 A1 | 7/2009 |
| EP | 2166724 A1 | 3/2010 |

(Continued)

OTHER PUBLICATIONS

EP Search Report for EP 12 17 3474 dated Oct. 23, 2012.
(Continued)

*Primary Examiner* — Christopher R Crompton
(74) *Attorney, Agent, or Firm* — Workman Nydegger

(57) ABSTRACT

A mobile telecommunications network includes a core and a radio access network having radio means for wireless communication with mobile terminals registered with the network, wherein the radio access network includes control means 700 operable to control the use of network resources by the mobile terminals. The control means processes control plane signalling.

13 Claims, 31 Drawing Sheets

(51) Int. Cl.
*H04W 28/08* (2009.01)
*H04W 36/00* (2009.01)
*H04L 12/701* (2013.01)
*H04W 28/10* (2009.01)

(58) Field of Classification Search
USPC .......................................................... 370/389
See application file for complete search history.

(56) References Cited

U.S. PATENT DOCUMENTS

| | | |
|---|---|---|
| 2005/0068967 A1 | 3/2005 | Terry et al. |
| 2007/0094712 A1 | 4/2007 | Gibbs et al. |
| 2008/0086574 A1* | 4/2008 | Raciborski ........ H04L 29/12066 709/245 |

FOREIGN PATENT DOCUMENTS

| | | |
|---|---|---|
| EP | 2 299 754 A1 | 3/2011 |
| WO | 2009014317 A2 | 1/2009 |
| WO | 2011003943 A2 | 1/2011 |
| WO | 2011044164 A1 | 4/2011 |

OTHER PUBLICATIONS

Rodriguez et al. "A middleware architecture supporting seamless and secure multimedia services across an intertechnology radio access network—seamless content delivery in the future mobile internet", IEEE Wireless Communications, vol. 16, No. 5, Oct. 1, 2009, pp. 24-31.

European Search Report issued in EP 12173474 dated Feb. 21, 2013.

* cited by examiner

TELECOMMUNICATION NETWORKS

CROSS REFERENCE TO RELATED APPLICATIONS

This application is a continuation, and claims the benefit, of U.S. patent application Ser. No. 13/532,341, entitled TELECOMMUNICATION NETWORKS, filed Jun. 25, 2012, now U.S. Pat. No. 9,154,994, which claims benefit and priority to United Kingdom Application No. 11 107 50.5, filed on Jun. 24, 2011, United Kingdom Application No. 11 107 44.8, filed on Jun. 24, 2011, United Kingdom Application No. 11 134 05.3, filed on Aug. 3, 2011, United Kingdom Application No. 11 134 07.9, filed on Aug. 3, 2011, and United Kingdom Application No. 11 13 859.1, filed on Aug. 11, 2011; the entireties of which are incorporated herein by reference.

FIELD OF THE INVENTION

The present invention relates to a mobile telecommunications network including a core and a radio access network having radio means for wireless communication with mobile terminals registered with the network.

BACKGROUND

Recently, a dramatic rise in sales of both smart-phones and laptop data cards has resulted in a substantial increase in the amount of data communications passing through mobile telecommunications networks. This volumetric increase can also be attributed to enhancements made to the capabilities of the networks. In fact it has been reported that mobile data growth grew 30 percent over the course of the second quarter of 2009. The most popular use for mobile data was HTTP browsing, although usage of HTTP streaming is growing considerably. Other mobile data uses include HTTP downloading and Peer-to-Peer (P2P) activities such as file sharing.

This ability to use the cellular networks for mobile data services, such as Internet browsing is resulting in subscribers treating their mobile networks in much the same way as they treat their fixed networks. That is, users are tending to expect the same service from the Internet, irrespective of their access method. However, mobile networks have a more restricted capacity and are more costly to operate, as compared to fixed networks.

In this regard, from the network operator's viewpoint, as the mobile broadband traffic volume carried over 2G, 3G and HSPA (High Speed Packet Access) networks continues to grow, the cost of supporting this data volume is becoming more and more expensive based on the current network architecture and deployments. In fact, access and data volumes are likely to rise faster than the revenue used to build and maintain the networks. This cost differential is exacerbated by one of the current business models being utilised, whereby operators charge a flat rate for unlimited amounts of data.

The increased usage is also unfortunately likely to result in an increase of data traffic jams, and hence a degradation of service for mobile users if not properly managed.

It has been proposed to control data-heavy users by "choking" the bandwidth available to them when a maximum data volume limit is exceeded. Whilst this addresses the problem on an individual level, it does not address the network capacity problem as a whole.

It is therefore apparent that mobile broadband is at a crossroads as networks and business models are strained by bandwidth demand that is unmatched by revenue generation.

These problems will only get worse with moves to position mobile data as a replacement for fixed DSL (Digital Subscriber Line) access and with the advent of higher radio access speeds with the proposed 4G LTE/SAE (Long Term Evolution/System Architecture Evolution) network. A large percentage of this traffic will consist of data which is destined for the public Internet, a significant proportion of which mobile operators will not be able to add value to, despite carrying the data on their own backhaul transport, core transport or cellular core infrastructure.

In addition to the problems discussed above, conventional mobile telephone communications networks have architectures that are hierarchical and expensive to scale. Many of the network elements, such as the BTS, routers, BSC/RNC etc are proprietary: devices of one manufacturer often do not interface with devices from another manufacturer. This makes it difficult to introduce new capabilities into the network as a different interface will be required for devices from each manufacturer.

Further, conventional base stations are not capable of intelligent local routeing or processing. Furthermore, the capacity of existing networks is not always used effectively. For example, many cell sites are under used, whilst others are heavily used.

The current network architecture has the following disadvantages:—
- Hierarchical and expensive to scale
- Backhaul is a major problem
- Proprietary platforms: BTS, BSC/RNC, SGSN etc
- Closed nodes and interfaces
- Very limited application or customer awareness (except for QoS priority)
- No intelligent local routeing or processing
- Inefficient use of installed capacity There is therefore a need to overcome or ameliorate at least one of the problems of the prior art. In particular there is a need to address the needs of both the network operators and the users in improving the provision of mobile broadband data services.

SUMMARY OF THE INVENTION

In one aspect the present invention provides a mobile telecommunications network including a network core and a radio access network having radio means for wireless communication with terminals registered with the network, wherein the radio access network includes control means operable to control the use of network resources by said terminals, wherein the control means is operable to process control plane signalling.

The control means may include an application programming interface, API, which provides a consistent interface to a multiplicity of applications hosted on the control means.

The control means may include an adapter (e.g. another API) operable to provide a consistent interface with the control means, the adapter communicating with an element of the network core or radio means. The communications between the element of the core network and the radio means is generally proprietary. However, the adapter enables standardised communications between the control means and the adapter, so these communications can be of a standard form irrespective of the element type or manufacturer.

The radio means may comprise a base station and a controller thereof. In a UMTS/3G network the radio means may for example comprise a NodeB and RNC. In a GSM/2G network the radio means may comprise a BTS and a BSC. In a LTE/4G network the radio means may comprise an eNodeB.

The control means may include policy application means operable to receive policy and/or routeing information from the network core and to provide instructions to the radio means to act in accordance with the policy and/or routeing information.

At least one of radio means may include enforcement means for enforcing the instructions such that the enforcement means controls at least one of whether terminal uplink traffic is diverted from the radio means to the control means and duplicated to the control means. The mobile terminal traffic may be user plane traffic and/or control plane traffic.

The control means may include means operable to interact with an element of the network core and/or radio means to cause that element to route terminal downlink traffic to the control means. The downlink traffic may then be modified (e.g. optimised) by the control means before the downlink traffic is passed to the mobile terminal.

The control means may be operable to request and process radio resource information relating to a terminal from an element of the network core or radio means. The control means may configure interactions with a mobile terminal in dependence on the radio resource information. The control means may request that it is informed of the radio resource connected (RRC) state (e.g. active state and idle state) of a mobile terminal and/or may cause the RRC state to be changed. The control means may use the radio resource information to cause the relocation of a mobile terminal to be delayed (e.g. until a file download is completed.

The control means may be operable to request and process information from the network core relating to a terminal or bearer. The control means may request that the network core established, modifies or remove radio bearers based on radio conditions of a mobile terminal. The control means may request that QoS profile associated with a user bearer is changed. The control means may request that the network core reports when a parameter is changed for a mobile terminal—for example its IP address.

The control means may be operable to perform mobility management functions for a selected terminal registered therewith. These mobility management functions may be mobility management functions corresponding to those that are conventionally performed by the core network—for example by a MME of the core. This may be advantageous for mobile terminals that are generally stationary, such as mobile terminals forming part of a vending machine. Performing mobility management functions at the core network is unnecessary for stationary devices and is wasteful of communication resources. By moving the mobility management functions to the control means of the radio access network for selected devices, some communications between the radio access network and the core are avoided.

According to a second aspect of the present invention, there is provided a mobile telecommunications network including a network core and a radio access network having radio means for wireless communication with terminals registered with the network, wherein the radio access network includes a plurality of control means operable to control the use of network resources by said terminals, each associated with a respective other element of the radio access network, and wherein, when a terminal is handed over from a first of said elements to a second of said elements, services provided by the control means associated with the first of said elements are selectively transferred so that they are provided by the control means associated with the second of said elements.

According to a third aspect of the present invention, there is provided a mobile telecommunications network including a network core and a radio access network having radio means for wireless communication with terminals registered with the network, wherein the radio access network includes control means operable to control the use of network resources by said terminals, wherein, when a terminal attaches to an element of the radio means, the element is operable to advise the control means associated with element of the attachment of the terminal such that the control means is enabled to register with the network for providing services to the terminal. A user profile may be provided to the element as part of the attachment process. The user profile may indicate whether or not the control means is applicable to providing services to the user's mobile terminal.

According to a fourth aspect of the present invention, there is provided a mobile telecommunications network including a network core and a radio access network having radio means for wireless communication with terminals registered with the network, wherein the radio access network includes control means operable to control the use of network resources by said terminals, and wherein the network further includes a gateway with which a plurality of the control means are registerable and which is operable to configure the control means registered therewith. For example, the gateway may provide a list of applications and services which can be used by mobile terminals registered with a control means.

The control means may be registered as at least one of: a controller for controlling the radio resources of a terminal served by the control means; a traffic source on the user plane path; and an information source for providing information relating to a terminal served by the control means. For example, in a 3G network a control means located at the RNC may be a traffic source and a control means located at the NodeB may be an information source, and in a 4G network a control means located at the eNodeB may be a traffic source and in information source.

The gateway may host an enterprise application which is operable to configure the control means registered therewith to provide specified information thereto. The requested information may include system load, radio resource (RR) conditions mobile terminal location and mobility.

The gateway may be operable to store the provided information and to use this information to serve received requests for data. For example a plurality of received requests for data may all require the same information. The gateway may serve these plurality of requests by the stored information (so that the information is only required to be obtained from the control means once, thereby avoiding wasting network resources by transmitting identical information twice). The gateway may also process the information in order to serve requests for data. For example, the gateway may calculate the arithmetical mean of a set of information to serve a request for data.

According to a fifth aspect of the present invention, there is provided a mobile telecommunications network including a network core and a radio access network having radio means for wireless communication with terminals registered with the network, wherein the radio access network includes control means operable to control the use of network resources by said terminals, and wherein the control means is operable to receive a request for service from a terminal and to determine whether the control means should provide the requested service, the control means being operable to return to the terminal an address which facilities access to the service at the control means or access to the service elsewhere in dependence upon the determination by the control means. The request for service may be a DNS lookup request. If the control means determines that it should provide the requested service, it may return the IP address of the relevant application hosted on the control means. If the control means determines that is should not provide the service, it may return an address that allows the service to be provided elsewhere, such as via the network core. An element of the radio means does not need to analyse requests for service to determine how to route those requests: the element may simply route the requests to the address provided—and this routes the request to the appropriate destination. The determination of where a request should be serviced may depend of criteria discussed in the detailed embodiment such as whether content filtering or lawful interception functionality at the network core is necessary.

According to a sixth aspect of the present invention, there is provided a mobile telecommunications network including a network core and a radio access network having radio means for wireless communication with terminals registered with the network, wherein the radio access network includes control means operable to control the use of network resources by said terminals, wherein the network core includes means operable to instruct the control means to selectively route received requests for service from a terminal to the core network without serving those requests for service. This is advantageous, for example, for a pre-pay mobile terminal. If the user of the mobile terminal exhausts their credit, the core network may instruct the control means (via a gateway in the embodiment) to no longer serve requests for service from that mobile terminal. Requests for service from that mobile terminal, rather than being served by the control means, are routed to the core network (e.g. via a PDP context/GGSN). This allows the core network to block the request for service or to divert the user to a credit top-up server, for example. If a user purchases further credit, the core network will instruct the control means to again serve requests for service.

The control means may be operable to receive a copy of signalling messages sent between the radio means and a terminal and to forward information from the messages to the core network. The messages may be forwarded to an entity of the core network that performs Lawful Interception processing.

The control means may be operable to configure the forwarded information from the messages such that the core network can readily identify if the forwarded information should be analysed. The forwarded information may include a flag or field that enables filtering by the core network of information that require analysis (for example Lawful interception processing). The forwarded information may be configured to include a header for this purpose.

According to a seventh aspect of the present invention, there is provided a mobile telecommunications network including a network core and a radio access network having radio means for wireless communication with terminals registered with the network, wherein the radio access network includes control means operable to control the use of network resources by said terminals, and wherein the control means is operable to record details of content that it delivers to a terminal and to pass the details to the core network, the details enabling the core network to access a copy of the content for analysis. This is advantageous when there is a central copy of content send by the control means. It avoids transmitting the content between the control means and the core unnecessarily. The analysis performed by the core may be Lawful Interception analysis.

According to an eighth aspect of the present invention, there is provided a mobile telecommunications network including a network core and a radio access network having radio means for wireless communication with terminals registered with the network, wherein the radio access network includes control means operable to control the use of network resources by said terminals, and wherein the control means is operable to host an application and to selectively passes traffic relating to that application for analysis by the network core. The application may be classified according to the nature of traffic that is will produce. The analysis performed by the core may be Lawful Interception analysis. If an application is classified as likely to produce traffic that should be subject to Lawful Interception analysis, the control means passes this traffic to the core network for such analysis. Applications which produce traffic that does not require lawful interception analysis include applications such as power/utility meter gathering applications. For some applications, such as games, some of the data will require analysis (such as voice and messaging data) whereas other data, such as video data, will not require analysis.

According to a ninth aspect of the present invention, there is provided a mobile telecommunications network including a network core and a radio access network having radio means for wireless communication with terminals registered with the network, wherein the radio access network includes control means operable to control the use of network resources by said terminals, and wherein the control means is operable to cache data relating to an application hosted thereby and includes means for temporarily restricting access to the cached data until the data has been analysed at the network core. The analysis performed by the core may be Lawful Interception analysis.

The present invention further provides a method of operating a mobile telecommunications network as discussed above and/or below.

The terminal may be a mobile device.

The network may be a cellular network, such as a 2G, 3G or 4G network.

BRIEF DESCRIPTION OF THE DRAWINGS

An embodiment of the present invention will now be described in more detail with reference to the accompanying Figures in which.

In the figures, like elements are generally designated with reference signs.

DETAILED DESCRIPTION

Key elements of a 3G mobile telecommunications network, and its operation, will now briefly be described with reference to FIG. 1.

Each base station (e.g. Node B 1 and Femto 2) corresponds to a respective cell of the cellular or mobile telecommunications network and receives calls from and transmits calls to a mobile terminal (not shown) in that cell by wireless radio communication in one or both of the circuit switched or packet switched domains. The mobile terminal may be any portable telecommunications device, including a handheld mobile telephone, a personal digital assistant (PDA) or a laptop computer equipped with a network access datacard.

The nodeB 1 or Femto 2 can be considered to comprise two main parts: a radio frequency part (radio unit) and a baseband part. The radio frequency part handles the transmission of radio frequency signals between the antenna of the nodeB 1 or Femto 2 and the mobile terminal, and for converting radio frequency signals into digital baseband signals (and vice versa). The baseband part is responsible for controlling and managing the transmission of the baseband signals to other components of the mobile telecommunications network.

In a macro 3G network, the Radio Access Network (RAN) comprises Node Bs and Radio Network Controllers (RNCs). The Node B is the function within the 3G network that provides the physical and transport radio link between the mobile terminal (User Equipment, UE) and the network. The Node B performs the transmission and reception of data wirelessly across the radio interface, and also applies the codes that are necessary to describe channels in a CDMA system. The RNC is responsible for control the Node Bs that are connected to it. The RNC performs Radio Resource Management (RRM), some of the mobility management functions and is the point where encryption is done before user data is sent to and from a mobile terminal. The RNC connects to the Circuit Switched Core Network through a Media Gateway (MGW) and to an SGSN (Serving GPRS Support Node) 5 in the Packet Switched Core Network. In FIG. 1, Node B 1 is controlled by RNC 3 across the Iub interface. An RNC may control more than one node B.

Figure 1:
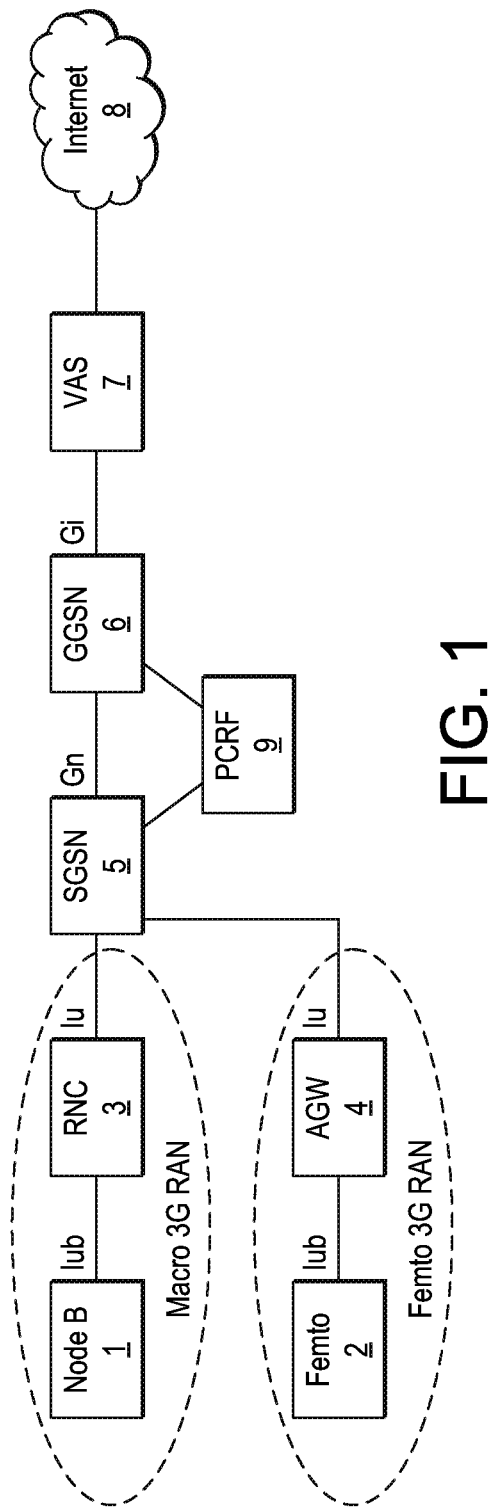
FIG. 1 illustrates a high level packet data network architecture, useful for explaining the prior art and embodiments of the present invention.

FIG. 1 also illustrates a Femto 3G RAN, with Femto 2 operating as the base station. Femto 2 is connected to an Access Gateway (AGW) (a.k.a Concentrator) 4 via an Iuh interface. Femto is an abbreviation of "femto-cells", and many other different names have been used, including home access points (HAPs), access points (APs) and femto-base stations, but all names refer to the same apparatus.

The radio link between the Femto 2 and the mobile terminal uses the same cellular telecommunication transport protocols as Node B 1 but with a smaller range—for example 25 m. The Femto 2 appears to the mobile terminal as a conventional base station, so no modification to the mobile terminal is required for it to operate with the Femto 2. The Femto 2 performs a role corresponding to that of Node B 1 in the macro 3G RAN.

The Femto 2 would typically be configured to serve a Wireless Local Area Network (WLAN) located in a home or office, in addition to GSM/UMTS/LTE networks. The WLAN could belong to the subscriber of the mobile terminal, or be an independently operated WLAN. The owner of Femto 2 can prescribe whether it is open or closed, whereby an open AP is able to carry communications from any mobile device in the GSM/UMTS/LTE network, and a closed AP is only able to carry communications from specific pre-assigned mobile devices.

Conventionally, in a 3G network (macro or Femto), the RANs are controlled by a mobile switching centre (MSC) and an SGSN (Serving GPRS Support Node) 5 of the core network. The MSC supports communications in the circuit switched domain, whilst the SGSN 5 supports communications in the packet switched domain—such as GPRS data transmissions. The SGSN is responsible for the delivery of data packets from and to the mobile terminals within its geographical service area. It performs packet routeing and transfer, mobility management (attach/detach and location management), logical link management, and authentication and charging functions. A location register of the SGSN stores location information (e.g., current cell, current VLR) and user profiles (e.g., IMSI, address(es) used in the packet data network) of all mobile terminals registered with this SGSN. In FIG. 1, since the embodiment is concerned with data transmission, only the SGSN is illustrated as being in communication with RNC 3 and AGW 4, across the Iu interface. The RNC 3 typically has a dedicated (not shared) connection to its SGSN 5, such as a cable connection.

Communications between the AGW 4 and the SGSN 5 are preferably IP based communications, and may be, for example, transmitted over a broadband IP network. Further, the connection between the Femto and the AGW 4 may use the PSTN (Public Switched Telephone Network). Typically a DSL cable connects the AGW to the PSTN, and data is transmitted there-between by IP transport/DSL transport. The Femto or AGW converts the cellular telecommunications transport protocols used between the mobile terminal and the Femto 2 to the appropriate IP based signalling.

The femto 2 may be connected to the AGW by means other than a DSL cable and the PSTN network. For example, the femto 2 may be connected to the AGW by a dedicated cable connection that is independent of the PSTN, or by a satellite connection.

The SGSN 5 is in communication with the GGSN 6 (Gateway GPRS Support Node) across the Gn interface. The GGSN is responsible for the interworking between the GPRS network and external packet switched networks, e.g. the Internet. The GGSN enables the mobility of mobile terminals in the networks. It maintains routeing necessary to tunnel the Protocol Data Units (PDUs) to the SGSN that service a particular mobile terminal. The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the mobile network address of the destination user. The readdressed packets are sent to the responsible SGSN. For this purpose, the GGSN stores the current SGSN address of the user and their profile in its location register. The GGSN is responsible for IP address assignment and is the default router for the connected mobile terminal. The GGSN also performs authentication and charging functions. Other functions include IP Pool management and address mapping, QoS and PDP context enforcement.

In turn the GGSN 6 may route data via any applicable Value Added Service (VAS) equipment 7, before data is forwarded towards its intended destination via the Internet 8. As an example of the functionality of the VAS equipment, the traffic may be inspected for adult content before reaching the end-user if this user is under 18 years of age.

For billing purposes in particular, a PCRF (Policy and Charging Rules Function) apparatus 9 is also provided, in communication with both the SGSN 5 and the GGSN 6.

The SGSN 5, GGSN 6, VAS 7 and PCRF apparatus 9 comprise the core network of the mobile telecommunications network.

Mobile telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (e.g. arithmetical mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Generally calculations to determine whether to perform a handover from one base station to another base station are performed by the network, whereas calculations whether to perform cell reselection are performed by the mobile terminal.

Data in a mobile telecommunications network can be considered to be separated into "control plane" and "user plane". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted.

In addition to the elements and functions described above, mobile telecommunications networks also include facilities for transmitting SMS messages. SMS messages are transmitted over the control plane only (and not the user plane).

This architecture is what currently is being used to carry all packet data to and from mobile terminals. That is, in today's implementation of the Packet data architecture, user plane traffic traverses across all the network elements shown between the Node B or Femto on which the user is camped and the internet. That is, all data is directed from the applicable RAN through the core network components SGSN, GGSN and VAS before reaching the internet. All PS traffic accordingly follows the same path and therefore has the same network costs. All applications are processed on the client (on the mobile device) or on the server (which is connected to the internet), and the network core therefore acts like a bit-pipe in the current architecture. For data, where the mobile network operator cannot add any value by carrying it on its own backhaul transport, core transport or cellular core infrastructure (the core network), such as data destined for the public internet without required intervention from the core network, there is no benefit to routeing this data via the core network.

However, a large percentage of this traffic can be handled in a more intelligent manner for example through content optimisation (Video & Web), content caching, or locally routed or directly routeing content to the public Internet. All these techniques reduce the investment required by a mobile operator to carry the data on its own backhaul and core transport or cellular core infrastructure.

In order to offer low cost packet data, to support new services and to manage customer expectation, a step-change reduction in the end-to-end cost per bit is required.

Mobile operators want to reduce their packet data handling costs through alternate network architectures based on commoditised IT platforms, breaking away from the traditional architecture based on their voice legacy. These new network architectures overcome the Access architecture issues of today In order to successfully offer cheap packet data and be able to compete with the fixed broadband offers (flat fee) a solution is proposed which focuses on the reduction of the end-to-end cost per bit, especially for Internet access service.

This enables mobile operators to reduce packet data handling costs by means of an alternative network cost model architecture, which breaks out of the traditional network architecture and nodes and utilises lower cost transport networks to optimise the data flow.

Figure 2:
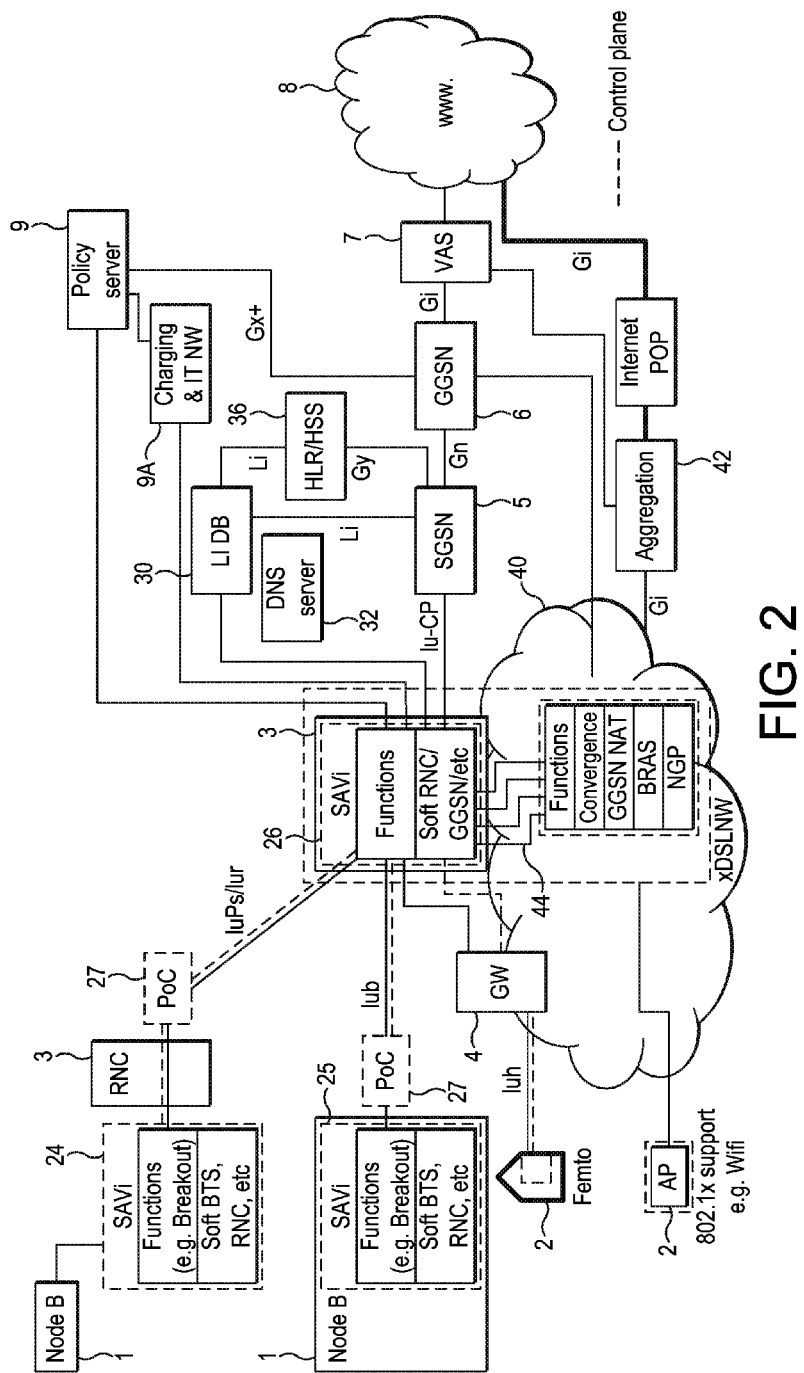
FIG. 2 illustrates the introduction of a new functional "platform" in a 3G network.

In this regard, FIG. 2 shows a high level description of the architecture that may be adopted to deploy this on a 3G network.

According to this arrangement, novel "platforms" (control units/means, also referred to as "SAVi") 24, 25, 26 for performing functions such as caching, routeing, optimisation and offload/return decision functionality are integrated into the network. This decision functionality may be incorporated in the radio architecture. In this regard, the platforms 24, 25, 26 may be incorporated into the NodeBs 1 (25), RNCs 3 (26) or exist as separate physical entities (24). It is these platforms 24, 25, 26 that, for example, determine the path of communications originating from the mobile terminals.

The exact placement of the platform 24, 25, 26 is not essential, and, for a macro 3G network, it can be placed at or between the Node Bs and the RNCs, and also between the RNCs and the SGSNs (or any combination thereof). It would also be possible to place the platform 24, 25, 26 at the GGSN (although not the SGSN as this does not control user data, only control data).

In the 3G Macro network, the aim is to offload a high percentage of the macro network traffic from the core and transport (IuPS, Gn, etc) by diverting specific traffic type for certain user(s) class directly to the Internet.

Where the platform 24, 25 is located in the Node Bs (or on the Iub interface), it may be possible to redirect the data from all the remaining mobile network elements (e.g. the RNC, SGSN, GGSN and VAS for macro 3G), and sending the data directly to the Internet 8. In a similar manner, where the platform 26 is located at the RNC (or on the Iu interface), it becomes possible to redirect the data from the SGSN 5, GGSN 6 and the VAS 7. The alternative data route is preferably a DSL using ADSL.

It is also preferable to aggregate the alternative data routes for each cell, where applicable. In this regard, each cell will have at least one RNC 3 and a plurality of Node Bs, so where the decision blocks are situated at or in the vicinity of the Node Bs, for instance, there will be a plurality of links which should ideally be aggregated before being passed to the Internet 8. At the point of this aggregation 42, there is preferably a further decision block which enables data to be returned to the legacy route. For instance, a new policy rule may have been implemented, which requires or enables previously offloaded data to be returned to the core network route. This new policy rule may be communicated to the return decision module by the core network policy module. In FIG. 2, this returning of data is only shown to the VAS 7, but the data may be returned to one or more of the other core network elements.

Each of the NodeBs 1 is connected to the mobile network core through a Point of Concentration (PoC) 27. All traffic from the NodeBs 1 which is to be routed through the core mobile network is routed to the PoC 27. This includes both user plane and control plane data. On the control plane level, the PoC 27 routes data to and from the SGSN 5 and the GGSN 6. Control data is also sent to and from other core network components, including the Lawful Interception Database (LI DB) 30, DNS Server 32, Policy Server 9 (including Charging rules and IT Network 9A) and Home Location Register/Home Subscriber Server (HLR/HSS) 36 (which contains subscriber and device profile and state information).

User plane data is transmitted by the PoC 27 to the SGSN 5 and the GGSN 6. From the GGSN 6, data is routed across a VAS 7 node to the Internet 8. In 3G this is the standard data path from the mobile terminals to the Internet.

To implement an advantageous feature, an alternative path on which to re-route certain data to the internet 8 is provided, whereby, each NodeB 1 and Femto 2 may be connected to a fixed line connection 40 (e.g xDSL) which is directly connected to the internet 8. These xDSL connections may be made directly to the NodeB and/or Femto or made to the NodeB/Femto via other components, such as the PoC 27. In FIG. 2, the xDSL Network 40 may be a third party network or may be a network owned or controlled by the owner of the mobile telecommunications network. By using such an alternative path, radio capacity, backhaul transport resource, core transport resource, cellular core network resources can be saved as well as improving performance and enhancing revenue for the mobile network operator.

As each Node B 1 and/or PoC 27 is associated with a platform 24, 25, 26, for each data packet request originating from a mobile terminal, a decision at the platform 24, 25, 26 is made as to whether the traffic may bypass the core mobile network entirely or may be passed into the core mobile network. The location at which the traffic is routed towards the internet is preferably at the platform 24, 25, 26; however, it may alternatively be routed out from the core network towards the internet at a different component. Traffic offloaded from the macro network is routed by the platform 26 to the xDSL network 40 by link 44 (the decision to offload this traffic may have been made at platform 24, 25 or 26—although the decision is implemented at platform 26)

Figure 3:
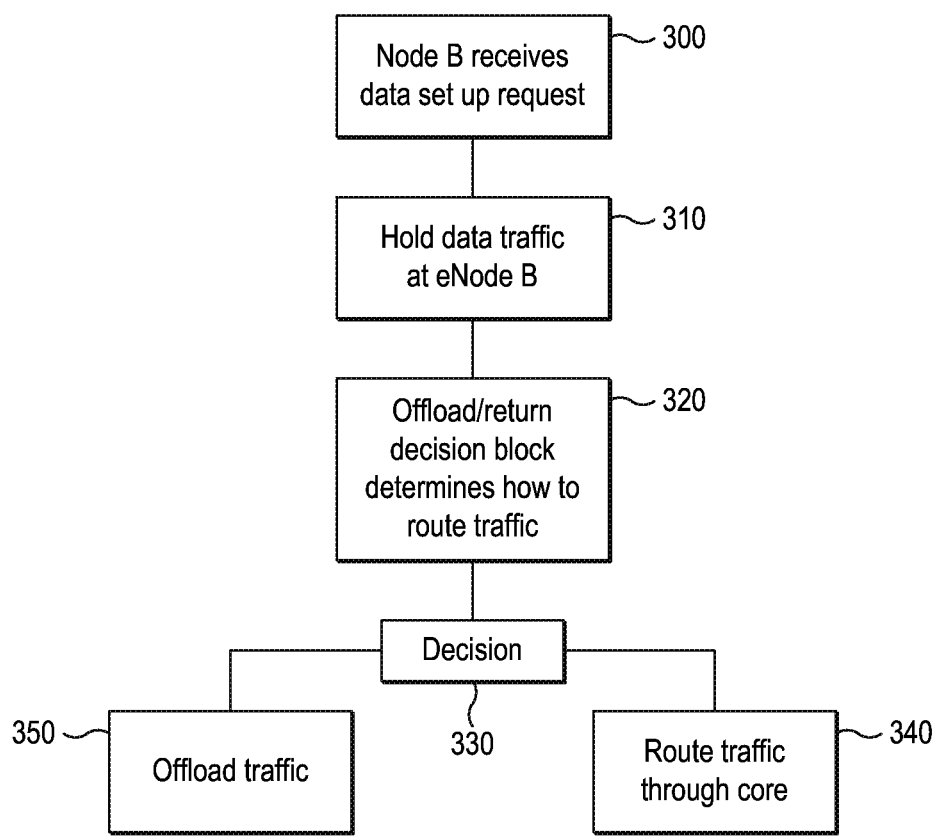
FIG. 3 illustrates a flow chart of an example offload decision process as implemented in the 3G network of FIG. 2

Preferably the Offload/Return decision is dependent upon the type of data or user. To exemplify this feature of the embodiment, FIG. 3 is a flow diagram showing the steps taken when deciding how to route the traffic in the architecture of FIG. 2. For instance, consider an NodeB receives a request to set up a data call from a user device which is camped on the NodeB at 300. Once the NodeB has identified the request as a data call and the type of traffic/user, rather than automatically routeing the data traffic to the core network, the data request is held at the NodeB at 310 until a decision has been made as to how to route the data, in particular whether to offload the traffic directly to the internet or whether to return the data through the core mobile network. Typically, the signalling (control plane) for the connection will continue through the normal route but the user data traffic will be held at the NodeB, this is possible by virtue of the separate user and control planes, as shown in FIG. 2.

The decision as to whether or not to use the Core mobile Network to route the data traffic can be based on various aspects, particularly relating to the properties of the data being routed and/or status of the user routeing the data.

The Mobile Network may add value to traffic by providing a number of services, such as compressing the user data to speed-up the data transfer while downloading (if this functionality is not already supported by the platforms 24, 25, 26). These different services can be broken up into groups and provided by different entities (e.g. this enables greater flexibility in the provision of the services, such as the mandated Internet Watch Foundation—IWF—requirement, which can only be supported by the mobile operator). The platforms 24, 25, 26 therefore make a decision on whether to service the data locally through caching, fetch the data from other node or from the internet via offload functionally or whether to route the traffic through the core network, based on the applicability of one or more of the services to the traffic. That is, platform 24, 25, 26 decides when data traffic requires one or more of the services and when it can do without them.

It should also be noted that these services are ones that could be provided without using the core network. These are services that add value to the customer, and which subscribers will pay for (explicitly or implicitly).

Referring again to FIG. 3, the platform 24, 25, 26 decides at 320 what to do with the traffic (from coming for the network/internet or orientated by the device). This decision may be made by interrogating certain servers or databases stored centrally within the core network which can compare the type of service, type of user etc with criteria which identifies the type of action shall be considered, e.g whether the traffic is suitable for offloading directly to the internet (at 330) from the NodeB or whether the traffic should be routed through the core (at 340). Examples of some of the considerations used in influencing the decision of whether to offload the traffic are discussed below in more detail. The implementation of this data offload technique needs to be carefully considered, as it places additional constraints on the network design.

The following is a non-exhaustive list of examples of challenges that have to be considered when implementing the data offload technique:

a) maintaining Customer Services provided by the core network or otherwise;
b) maintaining Network Services (e.g. Charging Rate Limiting/application control); and
c) maintaining Regulatory Services (e.g. to enable Lawful Interception and Regulatory Content Filtering).

Some specific examples of Customer Services that can be taken into account by the offload decision module include:

i) Parental Control: A service which customers subscribe to that filters content in order to shield children from unwanted websites and programs. Whether traffic from a given user needs to be filtered can be determined by a Common User Repository (CUR) lookup, where the CUR stores user profile information, such as whether the user is an adult or a child etc. If traffic needs to be filtered, then either the traffic cannot be offloaded or it needs to be filtered somewhere other than the core network.

ii) Traffic Optimisation: Optimisation is only required for low bandwidth connections (2G). By looking at the Radio Access Type (RAT) and the International Mobile Equipment Identity (IMEI) it can be determined whether or not a subscriber needs these services. Where traffic optimisation is not required, the traffic can be offloaded iii) Marketing Proposition: The mobile network is typically setup to provide full mobility with acceptable Quality of Service (QoS). A further option could be to offer best effort QoS without guaranteed full mobility. As an example, for when a heavy user has exceeded their fair usage limit, their traffic could be designated as low priority traffic and offloaded.

The Network Services that can be taken into account by the offload decision module are typically those that the network operator needs to manage its network. Some examples include:

i) Charging: The charging plan that a user subscribes to can be used to determine whether or not to offload that user's data. For instance, it is most easily avoided when the customer has a flat rate plan. That is, users on flat rate plans do not need their usage tracked for charging purposes in real time and so can be offloaded onto the alternative route. For users who are roaming or whose charging plan depends upon usage, then, the operator/supplier needs to track their total usage in real-time, and so their data needs to be maintained on the core network route so that rate-limits and data usage can be accurately tracked and alarms/alerts activated when usage exceeds allowances. This is because, if this is not avoidable then Call Data Records (CDRs) need to be generated by the module for the real time charging.

ii) Rate-limiting/application control: This is currently used to manage the traffic flow according to a certain usage policy. Excessive bandwidth usage or controlling P2P applications are common reasons to rate limit users. Therefore, where a user transmitting data is determined to be under a rate restriction (i.e. throttling) or the data they are transmitting has an application restriction (i.e. the application is blocked), then that data can be offloaded. This exceeded allowance information would typically be communicated to the decision module (24, 25, 26) by the HLR/HSS. This traffic management enables the total traffic volume to be reduced and is typically fully managed by the network operator.

iii) QoS: The network uses QoS to manage traffic during high load situations and to support marketing propositions. To enable QoS considerations to be enforced by the offload decision module, a connection is established between the offload module and the Policy and Charging Rules Function (PCRF) entity. This enables decision criteria to be dynamically fed to the offload module, for instance to maintain high priority users on the core network path and/or high priority application types, such as VoIP. It is to be appreciated that the connection to the PCRF is not essential, and alternatively, static or semi-static rules, pre-stored with the offload module, can be considered.

iv) Mobility: Mobility, such as cell handover, is an issue that needs to be managed by the core network. Therefore, terminals that are in motion should not be offloaded. The mobility of a mobile terminal could be determined by querying the Node B. Some users could be provided with a contract that allows only fixed or limited mobility use, so that the service provided was equivalent to a fixed broadband package. Different charging tariffs could be applied depending on whether a user was at a fixed location or mobile. Two ways the offload decision module can handle a mobile terminal's mobility are as follows:

1. The offload decision module can have the capability to characterise the radio link between the device and the network by monitoring the number of handovers implemented for the mobile terminal. If a certain number of handovers occur over a fixed duration, the mobile terminal can be classified as in motion, and any data from the mobile terminal can thereafter be routed back into the core network to avoid any further packet data delay. This of course assumes that the mobile terminal had been designated for data offload on the bypass link.

2. The offload decision module is situated on the IuPS for the 3G network (i.e. between the RNC and the SGSN) or Si for the LTE (i.e. between the eNode B and the PoC), and checks the Iur or X2 signalling information (i.e. between a set of RNCs controlled by a given 3G SGSN and between a corresponding set of eNode Bs for LTE). If this monitoring shows that a mobile terminal is hopping between cells one of which is not connected to (and therefore managed by) the offload decision module, any data from the mobile terminal can thereafter be routed back to the legacy path through the core network.

Regulatory Services are services that are mandated by legislation, and are typically provided to all traffic. Some specific examples of Regulatory Services that can be taken into consideration by the offload decision module include:

i) Lawful Interception (LI): The ability to provide Lawful interception will be maintained in any offload or local breakout plans. The options for offload are:

Maintain the evaluation of LI in the core network, and not offload users whose traffic needs to be intercepted (e.g. where the user has been tagged by the police for communication interception). Since the LI functionality is handled by the core network, the core network accordingly cannot be bypassed;

Add LI capability to the offload decision module, which will require a local LI interface with a dedicated database identifying the users to be intercepted. With this option, upon identifying traffic from a user on the list, a copy of the data can be made at the local LI interface and the traffic offloaded. The copied data can then be reported to the appropriate authorities; or Alternatively, LI may be performed at the Internet Service Provider (ISP). With this option, since LI is considered at the ISP it is not a consideration at the offload decision engine, and so the data may be offloaded, where possible. However, to effect this option, a Service Level Agreement (SLA) with relevant ISP providers may need to be amended in order to include the support of LI in the ISP network rather than in the mobile network infrastructure.

ii) Regulatory Content Filtering (e.g. for Internet Watch Foundation (IWF)): This required functionality blocks illegal websites. This functionality could easily be added to the offload decision module as it is not processor intensive. An http proxy server, for instance, could be used to support this functionality. Otherwise, the traffic will be returned back to a dedicated core node(s).

A further criterion that the platform (24, 25, 26) module may consider is the priority of the customer. In this regard, a network operator may wish to prioritise traffic across its network based on the priority level of the customer. For example, a high value customer (e.g. a corporate customer or a subscriber with on a high tariff contract) may be given priority over a low value customer. In this situation, a network may decide to offload lower value customers directly to the internet. This is related to the QoS criterion mentioned above, although the QoS criterion is generally linked to traffic management to maintain a balanced network, whereas the priority referred to can be used to ensure subscribers get a level of service commensurate with their service agreement.

The embodiment of FIG. 2 is in relation to a 3G network. Embodiments of the invention are equally applicable to 4G (LTE/SAE) networks.

The LTE/SAE macro network includes eNode Bs which make up the RAN. The eNode Bs effectively combine the functionality of the node B and the RNC of the 3G network. These eNodeBs are the network components which communicate with the mobile communication devices. It is envisaged that the eNodeBs will be arranged in groups and each group controlled by a Mobility Management Entity (MME) and a User Plane Entity (UPE).

The MME performs many of the mobility functions traditionally provided by the SGSN. The MME terminates the control plane with the mobile device. It is responsible for terminating NAS (Non Access Stratum) Signalling such as MM (Mobility Management) and SM (Session Management) information as well as coordinating Idle Mode procedures. Other responsibilities of the MME include gateway selection inter MME Mobility and authentication of the mobile device.

The UPE manages protocols on the user plane such as, storing mobile terminal contexts, terminating the Idle Mode on the user plane, and PDP context encryption.

The platforms would operate in the same manner as described in relation to the 3G network. The platforms may be located at many different locations in the 4G network.

Figure 4:
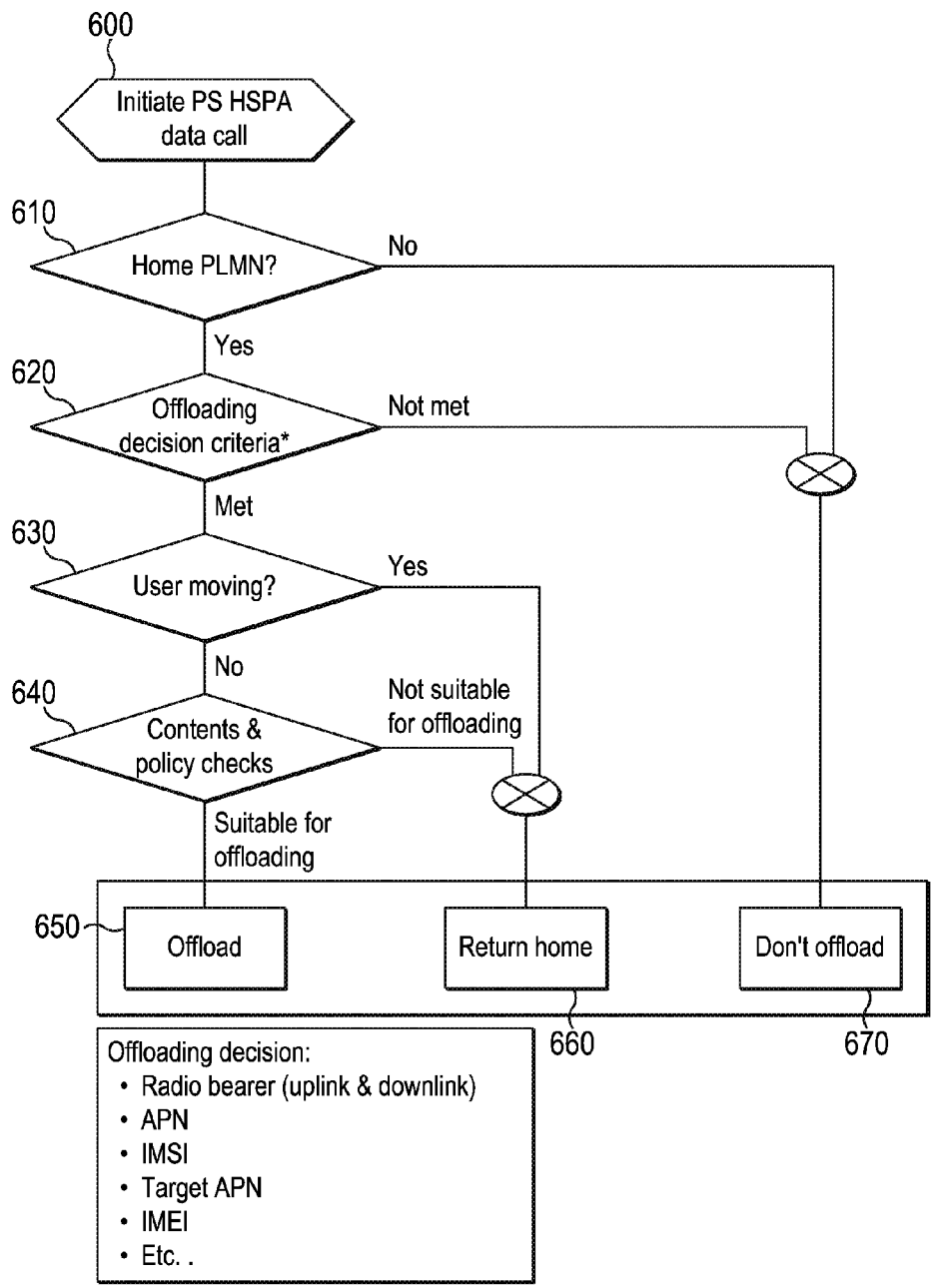
FIG. 4 illustrates a flow chart of an example offload decision making process that may be implemented by a redirection module

A more specific example of how the platform 24, 25, 26 may be implemented is described in relation to FIG. 4. FIG. 4 is a flow diagram illustrating a preferred method for deciding whether to offload data traffic to the internet. The decision structure is composed in a hierarchical form in order that certain types of user or data are always directed through the core network. The example of FIG. 4 is described for a 3G network but it will be clear to those skilled in the art that these decisions could be applied to any type of radio access technology.

Once a PS HSPA data call (or other connection) is made and received at the Node B at 600, a primary consideration by the platform 24, 25, 26 at 610 is whether the device is operating on its home network or whether it is roaming. If the device is roaming then all traffic is automatically routed through the core network. The reason for this is that the home network would want to guarantee the security and accurate billing (due to different charging principle between home and visited operator) of the user's traffic. The platform 24, 25, 26 at 610 will also consider other factors, such as what application types running on the mobile terminal require connections. If the mobile device is operating on its home network at 610, or if the applications do not require a connection to the core network, the platform 24, 25, 26 considers secondary offloading criteria at 620. Examples of secondary criteria may include the functions required by the device, the radio bearer currently used by the device, the APN, or the priority level of the customer identified, for example, through IMSI, IMEI or the target subscriber. If the offloading criteria are met at 620, the decision moves to the tertiary criteria, otherwise, the traffic is not offloaded.

At 630, the system checks the mobility of the user. If the user is moving, he is considered not suitable for offload due to an expected interruption delay of the user data when moving between source and target cell.

Finally, at 640 the system conducts a contents and policy check to confirm whether the user is suitable for offload. If it is determined that the user is suitable for offload to the internet, the eNodeB offloads the traffic to the internet at 650. If it is determined that the user is not suitable for offloading to the internet at 640 then the procedure returns "home" at 660. A connection is provided by a network core in a conventional way and the tests of the flowchart shown in FIG. 4 are repeated periodically to determine whether offloading directly to the internet becomes possible subsequently.

If the device is determined to be roaming at step 610, then the device is not offloaded directly to the internet, but remains connected via the network core in a conventional way at 670. Similarly, if the offloading criteria are not met at steps 620, the mobile device remains communicating via the network core in the conventional way, again at 670.

The hierarchical decision method is useful because it reduces the number of challenges across the network. It will be evident to those skilled in the art that different hierarchical structures will be appropriate for different networks, different conditions etc and that the example of FIG. 4 is just one way the decision could be made.

For instance, whilst arrangements have chiefly been described in relation to transmitting data traffic from a mobile terminal to a data network, the principles may also be applied to transmissions from a data network towards a mobile terminal.

In the arrangements described above the decision regarding the route is said to be made at call set-up. However, it should be appreciated that a decision to change the routeing of data may be made at the beginning of a communication session (for example establishment of a PDP context), or during a communication session. The routeing of data may change several times during a single communication session. For example, when a communication session is initiated it may be detected that the user is not moving, in which case a decision will be made to offload the data over the alternative data route. Subsequently it may be detected that the user is moving, and at this point a decision may be made to beginning routeing data for the communication session via the mobile network. During the communication session, the mobile terminal may become stationary for a prolonged period of time again, and at this time a further decision may be made to send subsequent data during the communication session via the alternative data route. Subsequently again, the user may then attempt to access age-restricted content, and it will be detected that parental control is required. In response for the requirement for parental control, a decision may be made to redirect subsequent data during the communication session via the core network so that core network parental controls can be applied.

It is to be appreciated that the present embodiments of the invention are to be distinguished from HSDPA offload, a technique used on the Iub interface between the Node B and the RNC. HSDPA offload which serves to separate data traffic from voice traffic, so that non-real time data traffic is sent down a less expensive backhaul to complement or replace the expensive E1/T1 TDM backhaul link between the two. Once this diverted traffic reaches the RNC, however, it is returned to the cellular and transport core networks and there is no differentiation made based upon data traffic type.

In the arrangement described above the platform 24, 25, 26 primarily handles data offload decisions. As will be described below, the platform can perform may other functions.

Embodiments of the invention in which the Radio Access Network controls the use of resources by mobile terminals will now be described.

Platform Architecture

Figure 5:
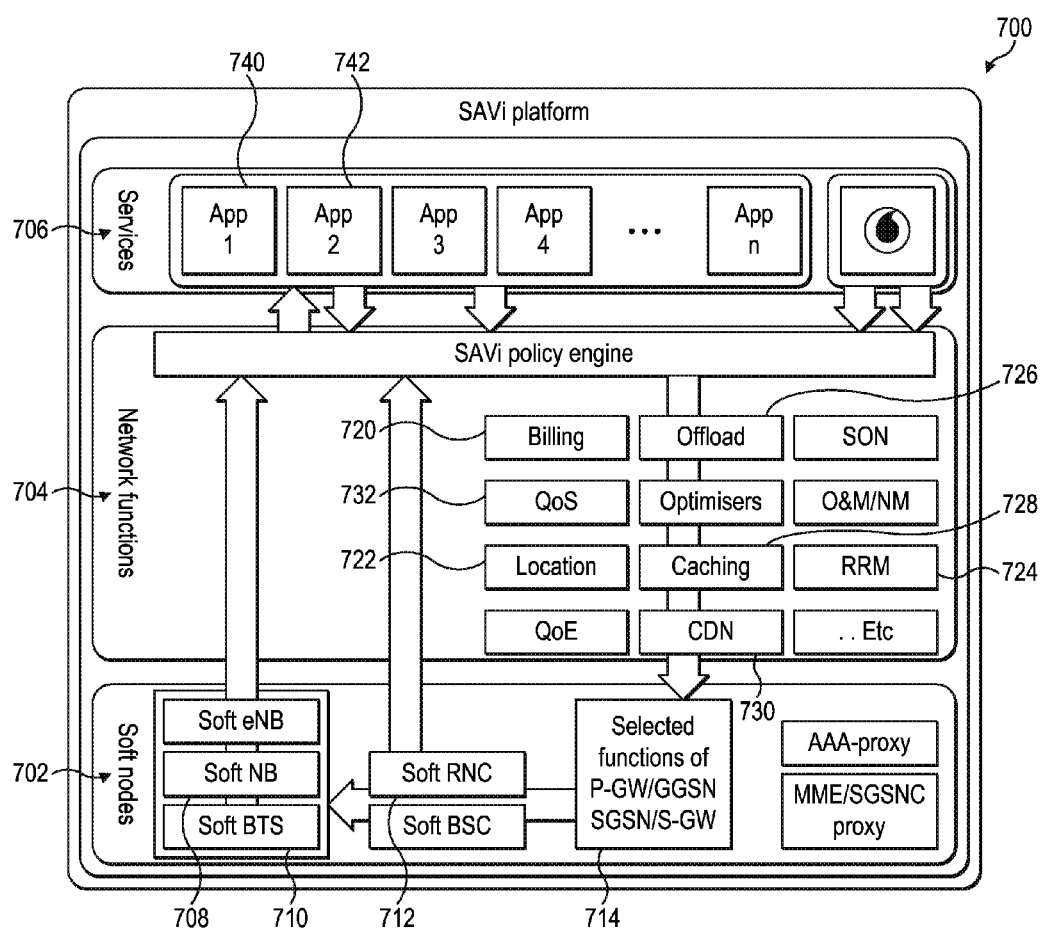
FIG. 5 shows the novel "platform" in more detail provided in the Radio Access Network in accordance with an embodiment of the invention.

As discussed above, a mobile telecommunication network is modified by the introduction of a "platform" 24,25,26. Such a platform (or control unit/means, also referred to as "SAVi") is shown in more detail at 700 FIG. 5 and which includes three principal parts: soft nodes 702 (physical/transport layer), network functions 704 and services 706 (application layer).

The platform 700 communicates with the radio frequency/RF part (radio unit) of a base station, such as a NodeB 1. The soft nodes 702 of the platform 700 comprise components such as a soft NodeB 708, soft BTS 710, soft eNodeB 711 and soft RNC 712 and soft SGSN/GGSN 714. The soft nodeB 708 provides functions equivalent to the baseband part of a conventional NodeB in a 3G telecommunications network. The soft BTS 710 provides baseband functions equivalent to the baseband functions of a BTS in a conventional 2G mobile telecommunications network. The soft enodeB 711 provides baseband functions equivalent to the baseband functions provided by a conventional enodeB in a 4G mobile telecommunications network. The platform 700 may therefore communicate with the radio frequency part of a 2G, 3G or 4G base station and provide appropriate baseband services for 2G, 3G or 4G technologies (or indeed for other technologies). A 3G mobile terminal that wishes to obtain telecommunication services from the mobile telecommunications networks connects wirelessly to the radio frequency part of a NodeB. Baseband functions may be provided either by a baseband part of the conventional NodeB or by the soft NodeB 708 forming an element of the soft node part of the platform 700. For example, the soft NodeB 708 may receive radio measurements from the radio frequency part of the NodeB to which it is connected, and may provide these radio measurements to other elements of the platform 700.

The network functions part 704 of the platform 700 includes modules for performing functions similar to those performed by the core network of a mobile telecommunications network, such as billing 720, location tracking 722 and the radio resource management (RRM) 724. The network functions may further comprise an offload decision module 726 that performs a function similar to the offload decision modules 24, 25 and 26 described above. The network functions part 704 may further comprise a caching function 728 and Content Delivery Network function 730.

The network functions parts 704 of the platform 700 provides an Application Programming Interface (API) framework to the services part 706 of the platform 700. The services part 706 of the platform supports a plurality of applications 740, 742 etc.

The network functions fall into three main categories, those that enable the network operation (e.g. charging, O&M), those that support service operation (e.g. Location) and those that optimise the usage of the network by certain applications and services (e.g. Caching, Video Optimisation).

The applications supported on the Platform 700 are the entities that supply or demand the flow of data on the network, akin to a server on the internet, e.g. gaming server, navigation server.

The API is implemented by a software program running on the network function part 704 which presents a novel standardised interface for the applications 740, 742 etc of the services part 706. The novel standardised API provides a consistent interface, defining communication protocols, ports etc. Full details of the API may be published to allow a multiplicity of applications to be developed for the platform 700 by multiple developers. This should be contrasted with prior art arrangements where each component of a mobile telecommunications network (such as BTS, BSC/RNC, SGSN etc) is proprietary and tends to have a unique interface, meaning that a different application must be written for each node of a conventional network.

The applications 740, 742 etc may provide services to users of the telecommunications network by co-operating with other parts of the platform 700.

The details of the use of each application used by the a user of the mobile telecommunications network is stored in an application context/container. The Application context contains application names, protocol used to carry such application, their characteristics that are measured/reported over period of time and some statistical information about these applications (volume, number of users using these applications, etc.).

Figure 6:
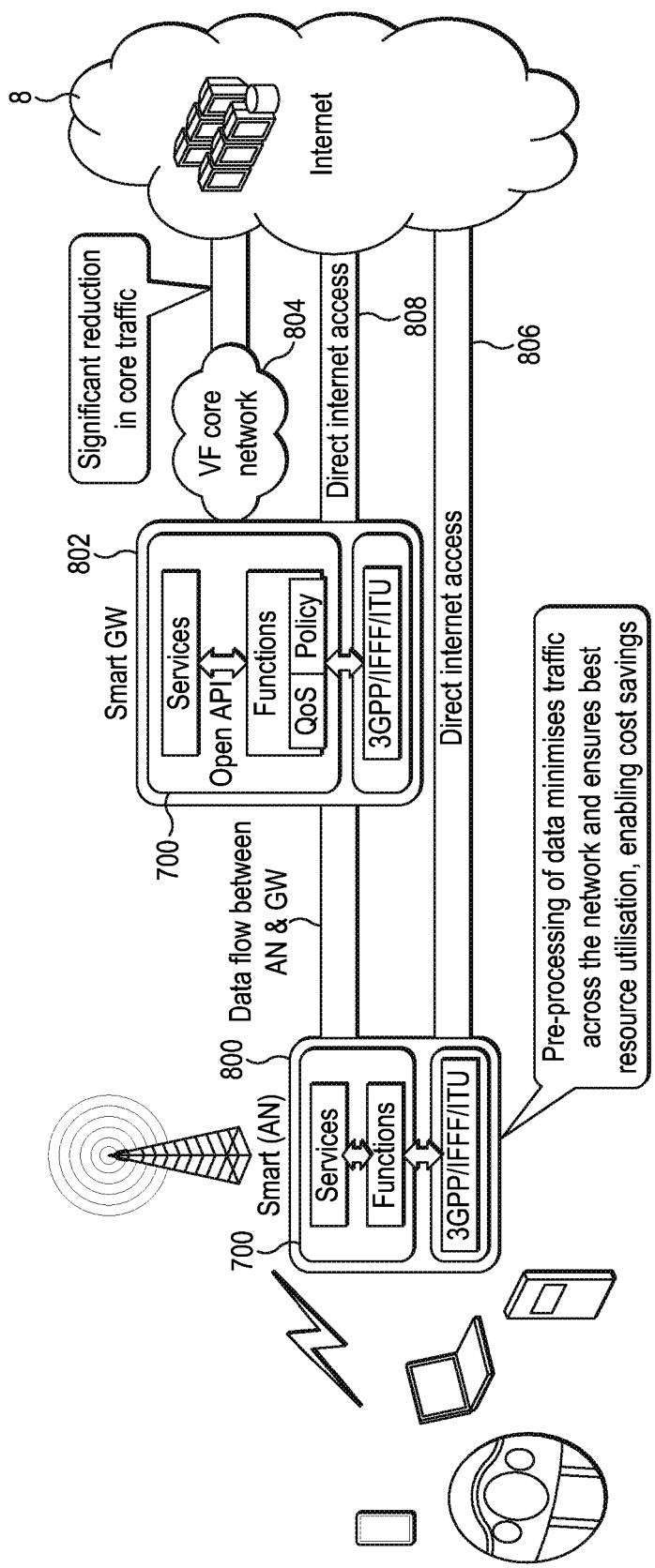
FIG. 6 shows possible locations of the platform within a mobile telecommunications network.

As shown in FIG. 6, a platform 700 may be provided at each base station of the mobile network (where it is connected to the radio frequency part of the base station—NodeB 1 in FIG. 2), forming an access node 800. Platform 700 may also be provided at the RNC (item 3 in FIG. 2) where it forms a gateway 802. The access node 800 and the gateway 802 are both configured to communicate directly with the network core 804 (for example, comprising the SGSN 5, GGSN 6 and VAS 7 (as shown in FIG. 4)). The access node 800 and gateway 802 may also be connected to the internet 8 for direct internet access via direct links 806 and 808, respectively, such that at least a portion of the core network 804 is bypassed in the manner described above.

The following are examples of access technologies that can be provided within the access node 700:
3GPP: GSM/CPRS, UMTS/HSPA & LTE
IEEE: 802.11 family & 802.16 family
ITU: DSL, ADSL, VDSL, VDSL2

Allocation of Functions to Platforms

Figure 7:
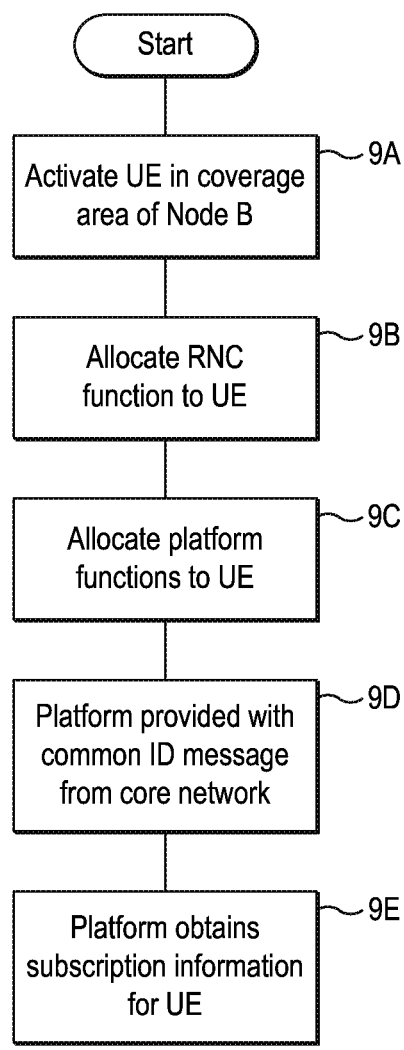
FIG. 7 is a flow chart showing the steps performed when a mobile terminal is activated.

The steps performed when a mobile terminal is activated at a NodeB, at the Femto or at the Access Point (AP) of the network which includes the novel platform 700 will now be described with reference to FIG. 7. At step 9A the mobile terminal (UE) is activated within the coverage area of a particular NodeB, at the Femto or at the AP. The access part of the NodeB, at the Femto or at the AP communicates information from the mobile terminal to the platform 700 associated with the NodeB, at the Femto or at the AP. At step 9B the platform 700 then allocates the baseband NodeB, at the Femto or at the AP function and the RNC or BRAS (Broadband Remote Access Server) function either at access node 800 at the NodeB at the Femto or at the AP site or at the gateway 802 at the RNC or BRAS site of the network or even from neighbouring nodes that have spare resources to pull. The decision as to whether the RNC or BRAS function is allocated at the platform 700 of access node 800 or the gateway node 802 may be made depending on various criteria, including:

The device type—for example this decision can be based on the radio access capabilities that the mobile terminal indicates upon activation, such as whether it is operating in the circuit switched or packet switched domains.

The location of the mobile terminal. If the mobile terminal is near the edge of the cell (which can be determined by network power measurements or neighbour cell measurements from the mobile terminal, within a plus or minus 3 dB range for the RACH).

The establishment cause of the connection request: such that the NodeB can filter the unnecessary signalling information from the mobile terminal which is not critical—for example periodic routeing area update messages.

Upon allocating the baseband NodeB at the Femto or at the AP and the RNC or BRAS function, the NodeB at the Femto or at the AP may allocate the mobile terminal to a particular carrier dedicated to the RNC or BRAS function.

Once the RNC or BRAS function is allocated to either the access node 800 or the gateway 802 at step 9C, other functions performed by the platform 700 at the access node 800 (or other access node) and the gateway 802 (or other gateway) are allocated to the mobile device. All other platform functions may be provided by the platform where the RNC or BRAS function is allocated to the mobile terminal. However, a platform at a different location to that which provides the RNC or BRAS function to the mobile terminal may provide some or all other functions.

At step 9D the platform which is allocated the RNC or BRAS function is provided with a Common ID message from the core network 804.

At step 9E, this message is used by the platform 700 to look up the complete subscription information for the mobile terminal, as well as the resource requirements (QoS) of the services required and negotiated PDP context, this information being provided by the core network 804.

The subscription information relating to the device that is obtained from the central nodes (e.g, core network) 804 is used to allocate the other functions at access node 800 and/or the gateway 802 in dependence upon various factors, including:

- Detailed information regarding the mobile terminal type obtained from the core network.
- The subscription characteristics of the mobile terminal.
- The applications previously used most frequently by the mobile terminal.
- The characteristics of the applications previously used by the mobile device and the performance requirements thereof.
- The historic mobility of the mobile terminal (speed, connection, distance travelled etc).
- The location of the mobile terminal and the likely destination of traffic from the mobile terminal based on historic usage patterns.
- The load of the NodeB providing RF services to the mobile terminal, and the historic traffic trends at that NodeB at Femto or at AP.
- The characteristics of the NodeB at the Femto or at the AP providing RF services (for example, the location, what other devices are connected through the NodeB at the Femto or at the AP, the number of machine to machine devices being attached and served by the NodeB, etc).

As mentioned above, a single mobile terminal may have platform functions/applications allocated on a plurality of platforms. Generally, when a mobile terminal is near-stationary it is most efficient for its functions/applications to be served from an access node 800 (i.e. distributed), whereas mobile terminals with greater mobility (or lower anticipated cell hold times) will be most efficiently served by having fewer or no functions/applications served from the access Node 800, and more or all functions/applications served from a gateway 802 (i.e. centralised). The assignment of functions/applications to a mobile terminal between an access node 800 and a gateway 802 will also depend upon the characteristics of the service type provided by the application (for example, the average IP session duration, the popularity of the particular application, the average mobility of mobile terminal using the service provided by the application etc).

Traffic management may be performed at the access node 800, where there is access to real-time radio information from the radio frequency part of the NodeB, the Femto or the AP serving the mobile device.

Centralised Radio Resource Management (RRM) may be provided at the gateway 802, and maintains performance across different access modes 800, which may have different radio access technologies, frequency bands, coverage etc. The RRM function 724 of the platform 700 of the gateway 802 may obtain information regarding radio traffic management from each access node 800 to dynamically position subscribers to particular radio technology. This technique will be used to allocate network resources based on the resource availability, application used and user mobility, For example, the traffic management information may be provided by the soft NodeB 708, Femto or AP of the platform 700 at the access node 800. This soft NodeB 708 obtains radio information relating to the mobile terminal from the radio frequency part of the NodeB to which the mobile terminal is wirelessly connected.

For a particular mobile terminal, functions provided by an access node 800 and gateway 802 may be coordinated to work together in an advantageous manner (i.e. a hybrid or distributed arrangement). For example, the gateway 802 may set operating limits or ranges within which functions performed by the access node 800 may be performed, without reference to the gateway 802. When the functions move outside the ranges set, control of those functions may be passed to the gateway 802.

Further, the access node 800 and the gateway 802 may cooperate to advantageously optimise content delivery to a mobile terminal.

Figure 8:
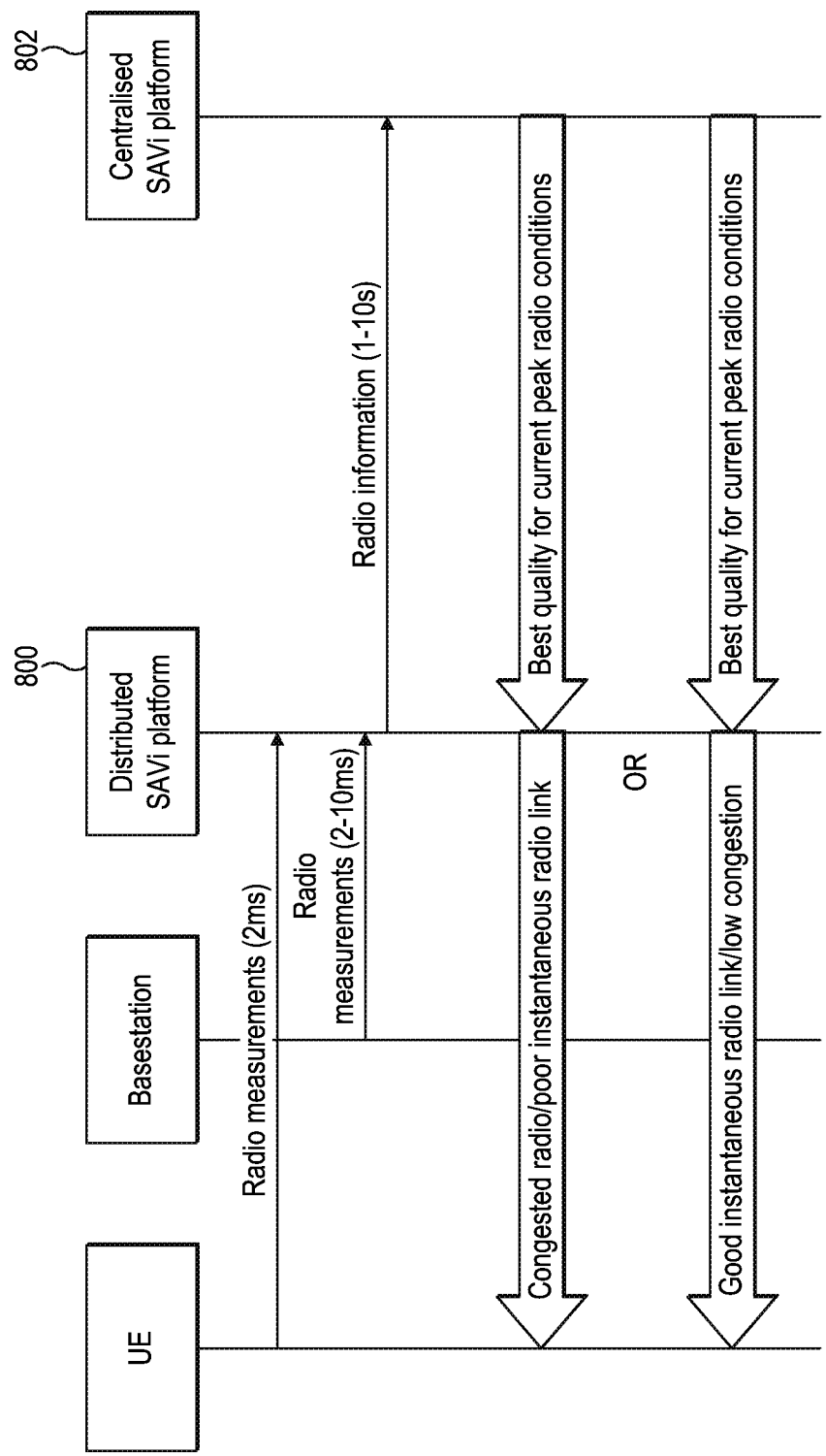
FIG. 8 shows the optimisation of content delivery to a mobile terminal.

The optimisation of content delivery will now be described with reference to FIG. 8 of the drawings. Content may be optimised at gateway 802 and at an access node 800. The gateway 802 may serve multiple access nodes 800, and my distribute content to those multiple access nodes 800, for onward transmissions from each of those access nodes 800 to a mobile terminal via the radio frequency part of NodeB, the Femto or the AP serving that node. Radio quality measurements are reported by the mobile terminal to the access node 800 at regular intervals, such as 2 millisecond intervals. Radio quality measurement relating to that mobile terminal are transmitted between the radio frequency part of the NodeB, the Femto or the AP serving the mobile terminal to the access node 800 at regular intervals, such as between 2 and 10 millisecond intervals. These radio measurements are received at the soft nodes 702 and are passed to functions 704 (e.g. to QoS function 732 for analysis). These radio frequency measurements from the mobile terminal and the NodeB are reported by the access node 800 to the gateway 802 (e.g. to QoS function 732 of the gateway 802 for analysis) at regular intervals, such as intervals of between 1 and 10 seconds. The gateway 802 may receive radio information from multiple access nodes 800. The radio measurements received by the gateway 802 may be analysed over a relatively long period, such as between 1 and 2 minutes. The radio quality measurements may be averaged (for example, the arithmetical mean of the radio quality maybe determined) over this time period. The transmission of content from the gateway 802 may then be optimised according to this calculation. Where the content is distributed by the gateway 802 to a plurality of access nodes 800, the content distribution will be based on the analysis of the radio quality indicators from all of the access nodes 800. The analysis may consider the maximum or peak radio performance over the time period of between 1 and 2 minutes.

When the content is received by each access node 800, the access node 800 then distributes the content to each mobile terminal. This distribution is optimised based on real-time network mode and mobile terminal specific radio link quality, as determined over a period of, for example, between 1 and 10 milliseconds. That is, content delivered to a mobile terminal that has high radio link quality may be optimised in a different manner to a mobile terminal that had poor radio link quality.

Figure 9:
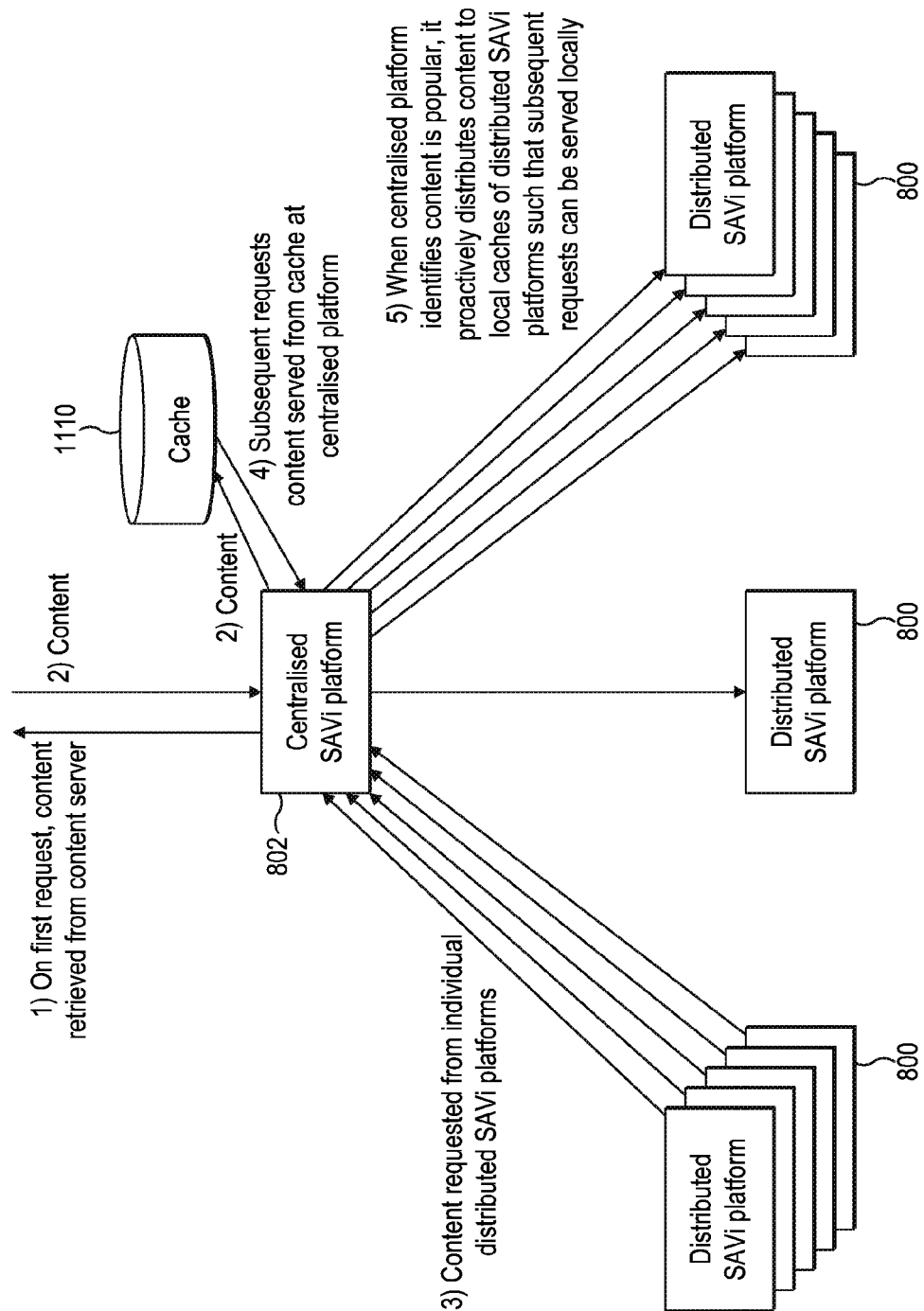
FIG. 9 shows a further optimisation of content delivery to a mobile terminal.

The co-operation between access nodes 800 and gateways 802 may further enhance the distribution of content in a manner now to be described with reference to FIG. 9.

When a mobile terminal requests a particular content item, this request is transmitted to the access node 800 serving that mobile terminal, assuming that this is the first request for this content item to the access node 800, the access node 800 passes this request to the gateway 802 serving the access node 800. Assuming that this is the first request for this content item from the gateway 802, the gateway 802 retrieves the content from a content server. The content is then provided by the content server to the gateway 802, and from there is distributed to the access node 800, and onwardly to the requesting mobile terminal. Advantageously, the gateway 802 maintains a record of content items that are requested frequently. When a content item is determined by the gateway 802 to be requested frequently, this is stored in a cache 1110 associated with the gateway 802 (which may be the cache 728 of the platform 700). Subsequent requests for that content item from access nodes 800 to the gateway 802 can then be serviced by retrieving the content item from the cache 1110 and distributing the content item to the requesting access node 800, and thus avoiding the need to request the content from the content server.

The gateway 802 may be further configured to identify popular content items that are likely to be requested by a large number of access nodes 800. When it is determined that a content item is popular, the gateway 802 may push these content items to each of the access nodes 800 associated therewith (so that this content is hosted at the access node 800, using Content Delivery Network (CDN) function 730 of the network functions 704 of the gateway 802 and the access node 800). The content is then available at the access node 800 for transmission to any mobile terminal that requests it, without having to retrieve this content from the gateway 802 or the content server. Advantageously, the distribution of such content items is performed in a manner which takes into account the capacity or the congestion of the link between the mobile terminal and the gateway 802 and the nature of the content. For example, typically a link between a mobile terminal and the gateway 802 may experience very little usage and congestion in the early hours of the morning. The content item can be advantageously transmitted in between the gateway 802 and the access node 800 at this time, when there is spare capacity. The gateway 802 will determine whether the content item is suitable for transmission on this basis, for example, by taking into account a number of times that the content item has been requested, the size of the content item and the storage space at the access node 800. If a content item is relatively small and is time-critical, such as news headlines, then such a content item may be distributed frequently throughout the day, as such content is not suitable for transmission once a day at early hours of the morning, as it becomes quickly out of date.

Relocation of Mobile Terminal

Figure 10:
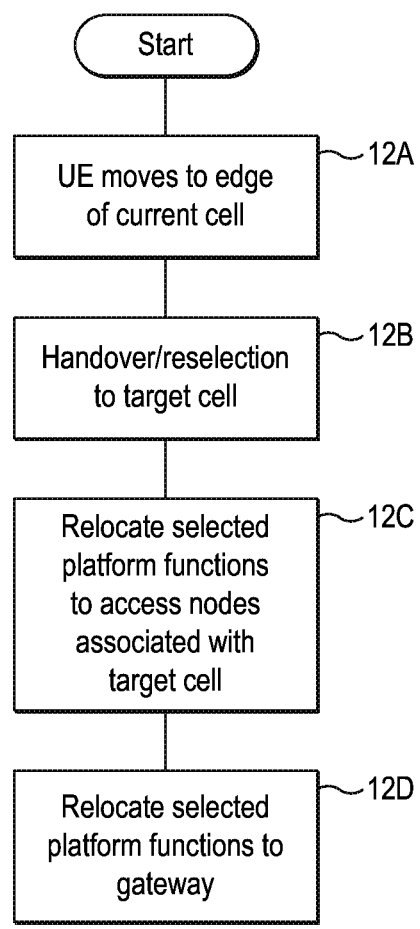
FIG. 10 is a flow chart showing the procedures performed when a mobile terminal moves within the network.

The procedures performed when a mobile terminal moves between cells in the mobile telecommunications network will now be described with reference to FIG. 10. In the conventional manner at step 12A, when the mobile terminal moves to the edge of its current serving cell, the radio measurements reported from the mobile terminal and the radio frequency part of the NodeB, the Femto or the AP serving that mobile terminal are used by the core network to determine when to perform a handover and to which target cell the handover should be performed. When the best target cell has been identified, handover to that target cell from the serving cell is performed at 12B in a conventional manner.

At step 12C selected platform functions may be relocated from the source access node (that served the old cell) to the destination access node (that serves the new target cell).

When the source and destination access nodes are served by the same gateway, only base station function (such as soft NodeB functions 708) may be relocated to the destination access node.

The relocation of functions of the access nodes is performed independently to the radio handover, so for some time after the radio handover, the source access node continues to serve content to the mobile terminal through the destination access node. The routeing of data packets for the 3G network between the destination and the source access nodes may be performed using an Iu interface between the RNC or BRAS function 712 of the destination access node and the SGSN/GGSN function 714 of the source access node. Alternatively, the routeing of data packets between the destination and the source access nodes can be completed by the SGSN/GGSN function 714 of the destination access node connecting directly to functions of the source access node through an IP interface.

After handover has been completed at step 12B, the access node controlling the mobile terminal may be relocated from the source access node to the destination access node in coordination with the gateway. the standardised handover decisions (mainly based on coverage, quality, power, interference, etc.) for 2G, 3G, LTE & fixed network are used to move the mobile from one node or system to another. However, the platform 700 introduces new opportunity to make the handover decision based on type or characteristics of the certain application, type of user and the QoS requirements.

The timing of the relocation of access node functions from the source to destination platform may be dependent on the following:
  the duration of the current connection/communication of the mobile terminal
  the speed of movement of the mobile terminal
  the characteristics of the applications being used by the mobile device, the quality of service, the predicated type and amounts of transmission ongoing.
  The radio resource allocations status at the mobile terminal
  The respective node of the source and destination and access nodes.

At step 12D, optionally, some functions will be reallocated from the access nodes to the gateway. For example, if the destination access node is heavily loaded and is congested, or has a lower capability then the source access node, or the mobile terminal is determined to be very mobile, it may be advantageous to transfer functions to the gateway. Functions are reallocated from the access node to the gateway by, for example, a Serving Radio Network Subsystem (SRNS) relocation between the RNC function 712 of the access node and the gateway. Alternatively the functions may be reallocated by performing a radio reconfiguration of user connection to the mobile terminal.

The reallocation of functions from an access node to the gateway may be performed at call/communication sessions set-up. At call/communication session set-up, further subscriber information will be provided, which may be used by the access node or gateway to be determine whether it would be advantageous to reallocate functions from the access node to the gateway. Reallocation of functions from the access node 800 to the gateway 802 may be performed during an active connection when a requirement of the communication sessions has been modified, or where the required resource is not available at the access node 800.

According to the same principles, applications may be (re)located (or distributed) between access nodes 800 and for gateways 802 to provide optimised application delivery/best use of the communication resources.

As mentioned above, information about each application used by the user at the mobile terminal is stored in an application context. The application context is shared between each access node 800 and gateway 802 that control the user connection for that mobile terminal. One of the access nodes 800/gateways 802 will be the "master" for that particular application, and that will also be the master of an application specific record in the application context. The application context is advantageously periodically synchronised between the access node 800 and the gateway 802.

The application information is the application context specific to a particular mobile terminal, and this is passed between access nodes and gateways during reallocation for a mobile terminal, enabling the application to be seamlessly passed access nodes/gateways, avoiding impacts to the user experience.

Figure 11:
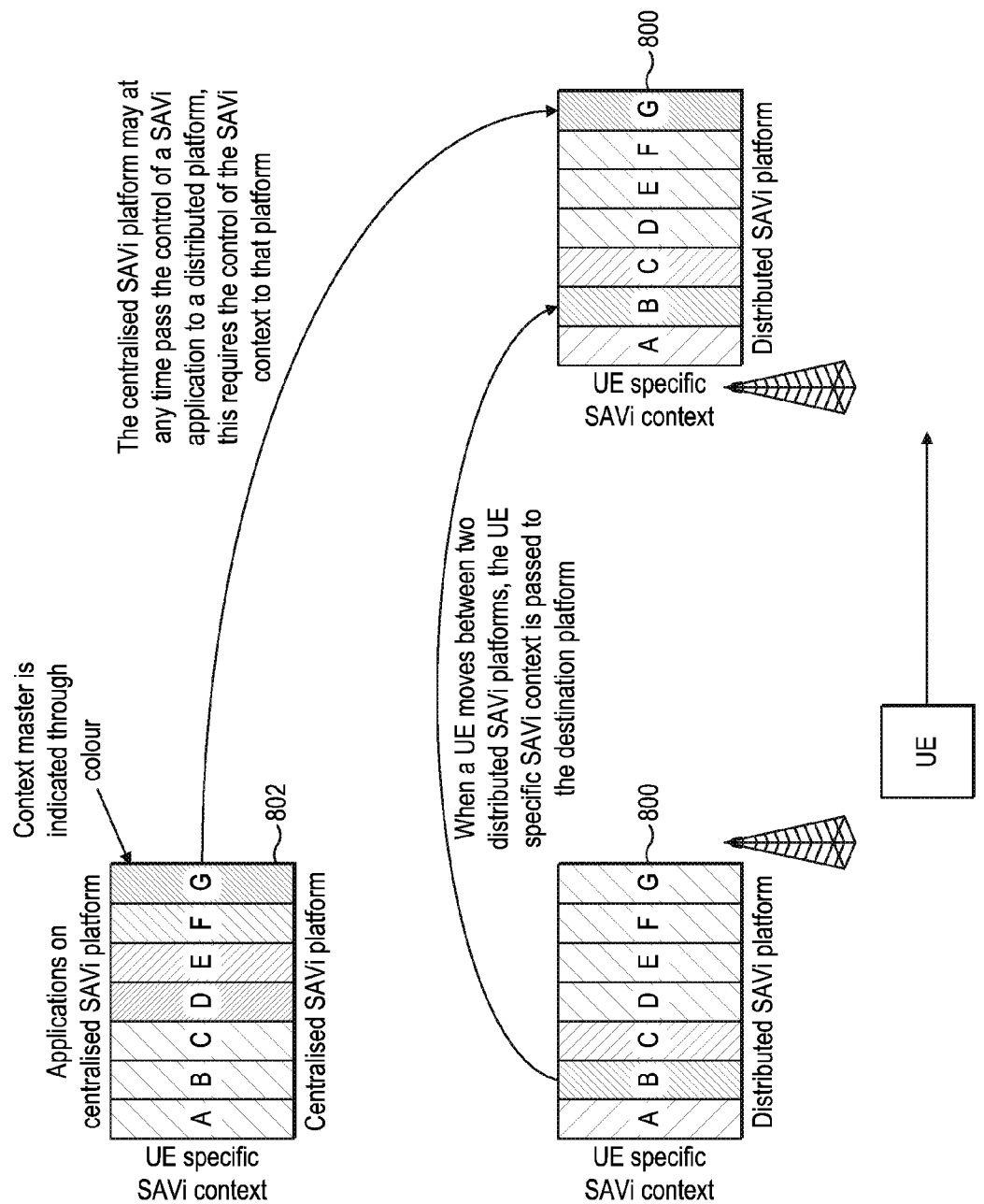
FIG. 11 shows the transfer of information between platforms.

FIG. 11 shows the transfer of application information between access nodes and gateways.

Tailoring Bandwidth to Application

Radio measurements received from the radio frequency part of the NodeB, the Femto or the AP serving the mobile terminal are passed to the soft nodes 702 of the platform 700 (of the access node 800 or gateway 802 serving the mobile terminal), and are passed to the network functions 704 of the platform 700, which then distributes the measurements to where necessary within the platform 700. The platform 700 has access to the subscriber information from the core network, which allows the network functions 704 to deliver data traffic in a manner that is optimised for radio conditions as indicated by the radio measurements. The data traffic may also be optimised according to the subscription of the user of the mobile terminal available radio resource, mobile terminal capability, and/or for the class of the terminal (e.g. access technologies used). This optimisation allows bandwidth usage to be balanced with customer experience. The subscriber information may include information about the price plan of the user of the mobile terminal. The mobile network operator may track the type of application used by the user, the total data usage of the user, and may differentially target radio resources the highest data value stream of users.

By hosting applications 740, 742 in the services part 706 of the platform the access node 800 (or at least the gateway 802), the point of the network that is aware of the application being used by the user of the mobile terminal closer in the link between the mobile terminal and the core network to the NodeB serving the mobile terminal. This enables the sharing of network resources to the most appropriate data streams, such as the most profitable data streams. Such awareness of the application to which a request for data transmission relates allows the use of low value data streams, such as peer-to-peer file sharing, to be allocated only limited bandwidth, so that remaining bandwidth can be targeted to particular users. In the uplink, transmission of data can be controlled by the access node 800 (or gateway 802) hosting the application to control data flow appropriately before data is onwardly transmitted towards the core of the network (which was not possible with conventional arrangements).

Application Programming Interface (API)

As mentioned above, a novel API is provided which defines the language that each of the software modules 740, 742 of the platform 700 use to communicate to coordinate to optimise application delivery to users. The platform 700 negotiates which each application 740, 742 the specific resource and performance requirements based on the application characteristics, allowing the application to directly communicate the scheduling performance requirements, rather than using a predefined set of quality of service parameters. This negotiation between the platform 700 and the applications 740, 742 is facilitated by the API.

The API may also facilitate the provision of radio link quality information (e.g. from QoS function 732) to applications 740, 742.

The API may further enable the platform 700 to control use of the applications 740, 742—e.g. to allow, disallow or adapt the applications.

By way of example, the application 740 may be a Voice over IP (VoIP) application. The nature of Voice over IP communications is that there is a virtually continuous succession of small data packets in which voice data is communicated. The voice data must be communicated with no or minimal latency in order that a two-way conversation can be performed successfully. The Voice over IP application 740 is able to compress voice data before transmission using a variety of techniques/CODECs. The compression techniques/CODECs may range from a relatively low compression technique, which provides high quality voice reproduction but requires a large bandwidth, to a much higher compression technique which provides reduced voice quality and which requires a much lower bandwidth.

The API is operable to provide details of the application characteristics to the network functions part 704 of the platform 700. This makes the network functions part 704 of the platform aware of the characteristics of the application. In the present example, as the application is a Voice over IP application, the network functions part 704 may be made aware that the application will tend to transmit continuous successions of small data packets that require transmission with no or low latency. The network function 704 may then be configured appropriately.

The API may further be operable to allow the network functions part 704 to communicate radio link quality information to the application 740. For example, when the network functions part 704 received information regarding the application characteristics (via the API), it may allocate radio link resources to that application 740. This allocation of radio link resources may be communicated by the network functions part 704 to the application 740 (via the API). The application 740 may then select an appropriate compression technique/CODEC in dependence upon the radio link quality available. During a Voice over IP call, the available radio link quality may be communicated regularly from the network functions part 704 to the application 740 (via the API) to allow the application 740 to vary the compression technique/CODEC used in accordance with changes to the radio link quality.

The network functions part 704 may control how the applications 740, 742 work (via the API). The network functions part 704 may allow, disallow or adapt the applications 740, 742 hosted in the services part 706 of the platform 700. For example, the network functions part 704 may require the Voice over IP application 740 to use a particular compression technique/CODEC if radio link bandwidth is restricted.

Another example of how the network functions part 704 may advantageously provide radio link quality information to an application (via the API) is when the application 742 is a gaming application used by several users. If the radio link quality information received by the application 742 indicates that bandwidth is restricted, the application 742 may adapt is communications to the users such that latency of the communications is increased uniformly for all of the users (so that they all experience the same delay), in order that each of the users is provided with the same gaming experience.

In the embodiments described, the devices that connect to the platforms 700 are mobile devices that connect to the platforms via the radio access network of a mobile/cellular telecommunications network. It should be appreciated that non-mobile (fixed) devices may be connected to the platforms 700, for example by a wired or cable connection.

Allocation of Services

The control means is responsible for allocating the service instance for each UE, based on the UE locations and the control means capacity, capability and available resources to host another instance of a service.

For certain low popularity services or where the available serving control means capacity or capability is limited, the service can be hosted from a central control means, or from a neighbouring distributed control means.

For some services/functions, where the source and destination client applications are in the same geographical region, being served by the same site (e.g. BTS location) or site cluster (e.g. finite number of sites), the access node 800/gateway 802 ensures that the server for the service is located close to both users, and the traffic is routed between the users within the site.

1 The SAVi Implementation 1.1 SAVi Platform Architecture

Figure 12:
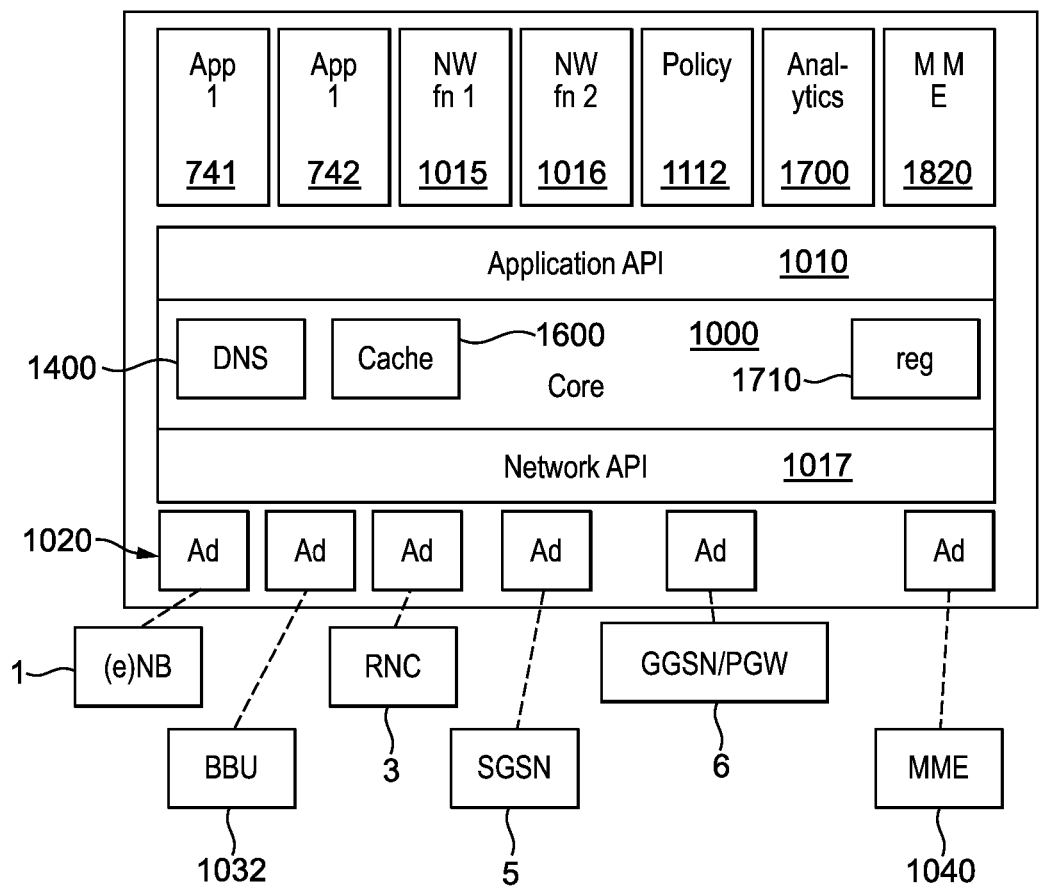
FIG. 12 shows a modified version of the novel "platform" in in accordance with an embodiment of the invention.

An alternative representation of the platform 700 is shown in FIG. 12. The platform 700 includes a platform core 1000 which communicates based on two sets of APIs:

- Application APIs 1010—which, as discussed above, offers standardised hosting environment for applications providing communication to Service Software 741, 742 and Network Functions Software 1015, 1016 hosted on the platform 700.
- Network APIs 1017—which provide control and connectivity to network nodes 1030 through a vendor specific Adaptors 1020; Network API defines standardised communication between core 1000 and the Adaptors 1020; Communication between Adaptor 1020 network nodes and 3GPP/LTE node, such as (e)NodeB 1, BBU 1032, RNC 3, SGSN 5, GGSN 6/P-GW and MME 1040, remains proprietary The Platform 700 includes common network functions Software 1015, 1016 such as Scheduling, Routeing, Billing/accounting, security and Policy functions, which allow the architecture to offer seamless experience across the network. The Platform 700 will provide capability to meet the Lawful Intercept (LI) requirements.

The Adaptors 1020 translate the Vendor specific implementation on the 3GPP/LTE nodes 1030, such as eNB, BBU, RNC, SGSN, GGSN/P-GW and MME, to common and open interface to the environment of platform 700.

The Adaptor 1020 for each 3GPP/LTE node 1030, such as eNB, BBU, RNC, SGSN, GGSN/P-GW and MME, is responsible for ensuring communication between the Network API 1017 and 3GPP node is secure.

The Platform 700 provides the capability for some Applications 741,742 hosted in the Platform 700 to be contacted remotely from the platform 700.

Logically control and data traffic interfaces (control plane and user plane) between the physical manifestations of the platforms 700 exist independent of the underlying 3GPP/LTE network nodes 1030. These interfaces will require to be made secure through functionality included within each platform 700.

The Platform 700 also provides the capability for hosted Network 1015,1016 and Service Applications 741,742 on different platforms 700 to communicate and pass data in a secure manner without mandating security to be provided by the application 741,742,1015,1016.

In contrast to the arrangements described above, in this implementation the platform 700 may handle both control and data traffic interfaces (control plane and user plane), rather than just the data traffic/user plane. Further, in contrast to the arrangements described above the nature of the gateway 802 may be different. In the implementation described hereinafter, the gateway 802 may be located other than at the RNC. For example, the gateway 802 may be located at the SGSN 5, GGSN 6, VAS 7 or PCRF apparatus 9, or in any part of the network core or RAN. In the implementation described hereinafter, the gateway 802 may be considered to be an interface between the platforms 700 at the access node (800) and the core network, rather than part of the "control means".

1.2 SAVi Functional Architecture

When the platform 700 environment is introduced into a mobile network it means that traffic can be inserted, hosted or created in the data path between GGSN 6 and UE, potentially impacting the operation of existing core systems (such as charging, policy enforcement & LI from other core network components (Charging rules and IT Network 9A, Policy Server 9 and including the Lawful Interception Database (LI DB) 30—see FIG. 2) which need to be replicated.

1.1.1 Functions of Gateway 800

- Consolidation of SAVi interaction with LI/Policy/charging
- Aggregation of UE, Cell and Transmission Performance/Load Measurements from platforms 700
- Optimisation of traffic to the access based on measurements
- Hosting of Applications 741,742 e.g. when users are highly mobile and Heterogeneous platform 700 deployments 1.1.2 Functions of Platform 700 in the Access (as Access Node) 802

- Hosting of Applications 741,742/Optimisation Functions
- Analysis of User data and signalling
- Measurement of UE, Radio, Transmission Performance
- Charging, LI, Policy enforcement of Hosted Apps and Traffic 2 Procedures Between 3GPP and SAVi The Network API 1017 between the platform 700 and the 3GPP nodes 1030 has to perform certain functions which are important to the operation of the platform 700 system. The basic set of functionality is described in this section.

2.1 User Arrival Notification

When the UE transitions from PMM Idle to PMM Active state, the 3GPP core network passes the UE IMSI to the Radio Access Network. The 3GPP system should treat this as a trigger to inform the platform 700 system that a User has arrived on the 3GPP node.

2.1.1 Subscriber Profile

In Rel-8 of 3GPP, a new parameter called Subscriber Profile ID for RAT/Frequency priority is included and passed to the Radio Access Network alongside the UE identity. The parameter is operator configurable and is stored in the HLR 36, passed to the SGSN 5 as part of the Subscriber context. The Access network is configured by the operator to understand how to act for each parameter.

It is proposed that the three most-significant bits (MSB) of this parameter is used to determine whether the platform 700 is enabled for a specific UE, and provide a pointer to the default platform 700 configuration to be used for this device before specific UE specific configuration is available.

If the three MSBs of the Subscriber Profile parameter are set to '000' then the 3GPP RAN understands that it should not inform platform 700 of the presence of this UE; if the three MSBs are any other value, then the 3GPP passes the IMSI and the three MSBs of the Subscriber Profile to the platform 700 the "User Arrival Notification" procedure on the Network API 1017.

2.1.2 PDP Context Profile

The RAB (Radio Access Bearer) establishment procedure for a PDP context includes the RAB parameters to the RAN. Within this set of parameters there are a series of QoS parameters for each of the active PDP contexts. It is proposed that one of these parameters is used as an indicator that the PDP context is allowed to be passed to the platform 700.

The 3GPP node 1030 communicates over the Network API 1017 to the core 1000 to inform the core 1000 that which PDP contexts the UE has established. The 3GPP node 1030 includes the RAB ID with the indication to the platform core 1000.

2.2 Policy and Rooting Control & Enforcement

The platform 700 can instruct the 3GPP network entity 1030 to enforce specific data and signalling traffic routeing and policy rules for a specific User. The communication between platform 700 and 3GPP is performed over the Network API 1017.

Routeing and policy enforcement applies to both signalling and data traffic. As with the known existing mechanisms for control of Policy for data traffic, Policy control is provided from a central location (Policy DB) and distributed to a Policy Application in the platform 700 which directly controls the Routeing and Policy Enforcement functions at the Network Node 1030 and the platform 700.

For signalling, the criteria would need to include Interface and/or protocol identifier, indicator of specific message(s) within protocol (e.g. Handover Command) and frequency/measurement type (e.g. for Measurement Reports).

The platform 700 introduces the concept of a new Policy Function in the network for converged control of Signalling plane and Data traffic, and is referred to as the Policy DB. The implementation of the platform 700 may mean this functionality is realised as an extension to the existing PCRF 9 or as a separate physical entity.

The platform GW 802 interfaces with the PCRF 9 and the Policy DB through the Network APIs 1017/Adaptors 1020 and retrieves customer specific policy information to be enforced in the network. The enforcement of the policy may be done either in the platform or in the 3GPP node 1030 depending on the Application. As a consequence, the platform 700 is responsible for filtering and distributing the relevant policy information and only enforcement actions relevant to the 3GPP node are passed to the Adaptors 1020.

In general, duplication of functionality has a negative impact on latency and therefore policy enforcement should be applied only once within the platform 700 environment. As a consequence, routeing needs to be performed before policy enforcement.

It is important to maintain the integrity of the data flow for each PDP context specifically for each UE, as the UE may have multiple primary PDP contexts each with separate rules and charging information for each.

For example, if the routeing decision from the platform 700 indicates that traffic for a flow needs to be routed to the platform 700, then the 3GPP Node 1030 should not apply any policy enforcement. Conversely, for a flow, for which the routeing action is to duplicate, it is more appropriate to apply the policy enforcement in the 3GPP Node 1030. It is worth remembering that both the routeing and policy decisions are being controlled by the platform 700 and therefore care needs to be taken.

Figure 13:
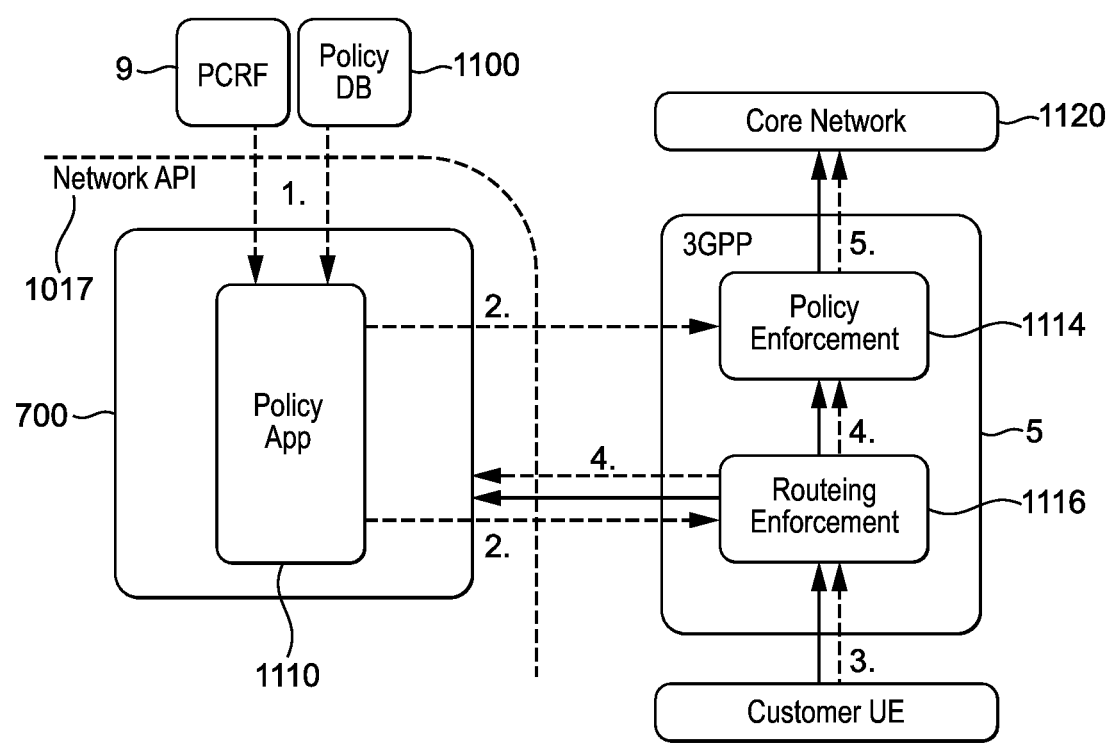
FIG. 13 shows the exchange of data between network elements according to an embodiment of the invention for performing Policy and Routeing Control & Enforcement.

FIG. 13 shows steps (1) to (5) to perform the signalling for policy routeing control and enforcement.

1. The PCRF 9 and Policy DB 1100 provide policy to the Policy App 1112 hosted in the platform 700.
2. The Policy App 1112 passes a set of rules/triggers to the Policy Enforcement 1114 and Routeing Enforcement 1116 functions at the 3GPP node (e.g. SGSN 5) for User Signalling or Data Traffic.
3. As Signalling or Data traffic arrives from the customer UE (as shown in the example) or from the Core network 1120, it is passed to the Routeing enforcement function 1116 within the 3GPP node (e.g. SGSN 5); and this function 1116 routes the traffic based on the available rule.
4. The Traffic is either Passed to the Policy Enforcement function 1114, Routed to the platform 700, or Duplicated and provided to both. The Policy Enforcement function 1114 handles the traffic in accordance with the rules provided by the Policy App 1110 (in 2.). The platform 700 also includes Routeing/Policy Enforcement functions, handling more detailed rules.
   The Policy Enforcement function 1114 may either drop the Traffic, or pass to the Core Network 1120.
5. When the platform 700 provides data to the 3GPP entity (e.g. SGSN 5) to be inserted into the data flow for a user, the platform 700 marks the DiffSery code point of the IP packet to indicate which priority the 3GPP (e.g. SGSN 5) entity should use for transmission of this packet.

2.3 SAVi Traffic Management

Figure 14:
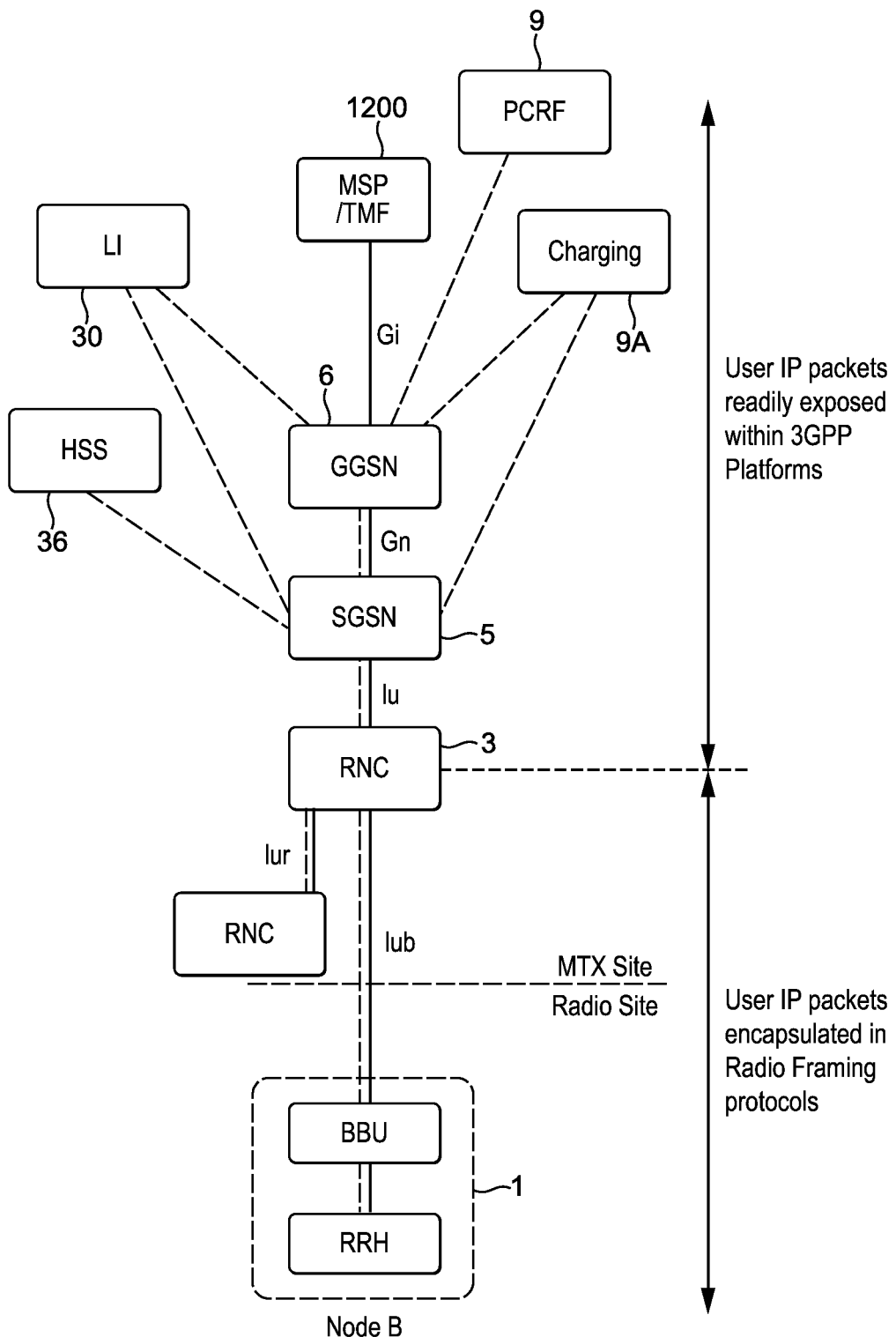
FIG. 14 shows the network architecture according to an embodiment of the invention for 3G/HSPA mobile networks.
Figure 15:
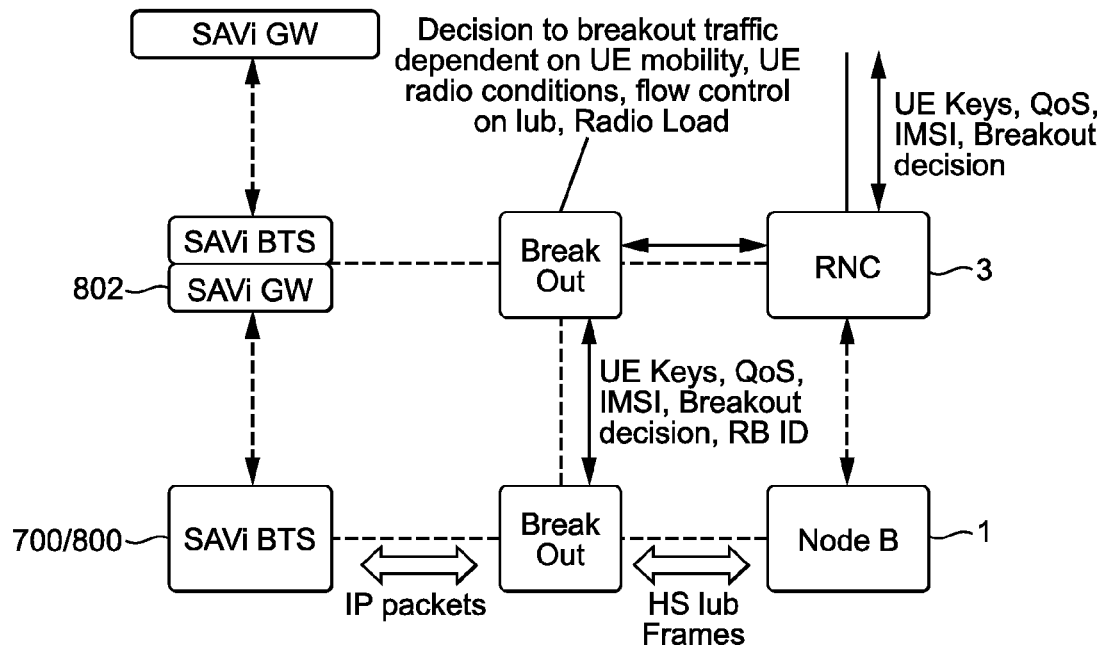
FIG. 15 shows a breakout functionality for the network architecture of FIG. 14 according to an embodiment of the invention.

Referring to FIG. 14, the downlink data of user services which are served from the Gi LAN, or from the internet, pass through the Traffic Management Function 1200 or Optimisation Functions of the Gi LAN; this can either be a stand alone node, or can be implemented as part of the GGSN 6.

The Traffic Management Function 1200 analyses the IP packets associated with the service, and acts based on the policy defined by the operator. The Traffic Management Function 1200 has the ability to determine which service the IP packets relate.

The Optimisation Functions of the network perform certain actions on the content included within the packets; understands the needs of the service and whether there is any benefit of further optimisation.

The Traffic Management Function 1200 and Optimisation Function can mark the packets to indicate the service category or Service Group they belong to. This marking could be the DiffSery code points of the IP packet.

When the 3GPP node receives the IP packet of a PDP context, the node understands the Packet marking scheme used by the Traffic Management and Optimisation Functions 1200. The 3GPP node can be configured over the Network API 1017 to intercept downlink packets for a PDP context with specific packet markings and pass them to the platform 700.

Video Optimisation Example

When a User is watching a video from a source off-net at a time where the network has low utilisation. The central Optimisation Function is aware that the limitation for the delivery of the content is the radio and therefore it chooses not to optimise the content beyond targeting it to the device.

The Optimisation Function marks the packets associated with the stream to indicate that further optimisation may be required.

The 3GPP node is configured to understand that any packets with that marking should be passed to the platform 700. An Optimisation Function runs on the platform 700 and further optimises the content to radio conditions of the device to ensure that uninterrupted playback is achieved.

P2P Filesharing Example

When a User is using P2P Filesharing application, the packets associated to the application pass through the Traffic Management Function 1200 where they are identified. The Traffic Management Functions 1200 marks the downlink packets.

If the 3GPP node has not been configured to pass these packets to the platform 700, the 3GPP node understands the packet marking and can use it for the radio scheduling.

If the 3GPP node has been configured to pass these packets to the platform 700, the packets are passed to the platform 700. The platform 700 can use these packets in a number of ways, for example:

If the radio load is low these packets could be passed directly to the radio; if the load is high and there are many users using this type of data on the cell, the platform 700 can change the packet marking before passing them to the 3GPP node (to give these packets a lower priority on the radio).

They can be used to determine how to treat the uplink packets associated with this flow—for example, changing TCP window sizes to impact the downlink flow from the traffic source.

2.4 Interactions with RRM

The platform 700 may also request specific RRM functionality for a specific device over the Network API 1017. A few examples of this control are as follows:

Requesting that the 3GPP entity provide measurements to the platform 700 of the radio quality for the User; or configure events based on the Radio performance and system load for a specific UE.

Requesting that RRC state of UE is changed or maintained; or that the platform 700 is informed when the RRC will be changed.

Requesting that the SRNC (source RNC) relocation procedure is delayed (e.g. until a file download is completed.)

2.5 Interactions with CN Bearer Management

The platform 700 may also communicate to Core Network 3GPP entities over the Network API 1017 to request information or specific CN handling for a specific device or bearer. A couple of examples of this control are as follows:

Requesting the Core Network 1120 to establish, modify or remove bearers based on radio conditions of the customer Requesting that the QoS profile associated with a User bearer is changed; e.g. Maximum Bit rate Setting events for the Core Node to report when a parameter is changed for a User; e.g. IP address 2.6 User Departure Notification When the UE leaves the 3GPP node, either because the UE has transitioned back to PMM-Idle mode, or because it has moved to a new 3GPP node; the 3GPP node is responsible for informing the platform 700 over the Network API 1017 that the UE has departed. The 3GPP node references the UE with its IMSI.

3 SAVi Introduction in 3GPP Network Architecture

The different variants of the 3GPP network architecture will present different challenges when introducing the platform 700 architecture. 3GPP architectures where user IP packets can be easily exposed present the quickest opportunity for realising the platform 700 architecture.

3.1 3G/HSPA Mobile Networks

In most markets today, the 3G networks are deployed with Radio functions of the RNC deployed in central MTX (Mobile Telephone exchange) sites.

The framing protocols of the radio extent up to the RNC platform 3 from the UE, and it is at this point that IP packets are exposed. The RNC platform 3 is also aware of radio performance of the UE, and the load of the cell in which the UE is being provided service. The IP packets of the User are easily accessible on all nodes higher in the operator network.

It is possible to gain access to the IP packets of the User at the Node B radio site 1; however extra functionality would be required to extract and insert packets potentially replicating some RNC-like functions at the Node B 1.

Figure 16:
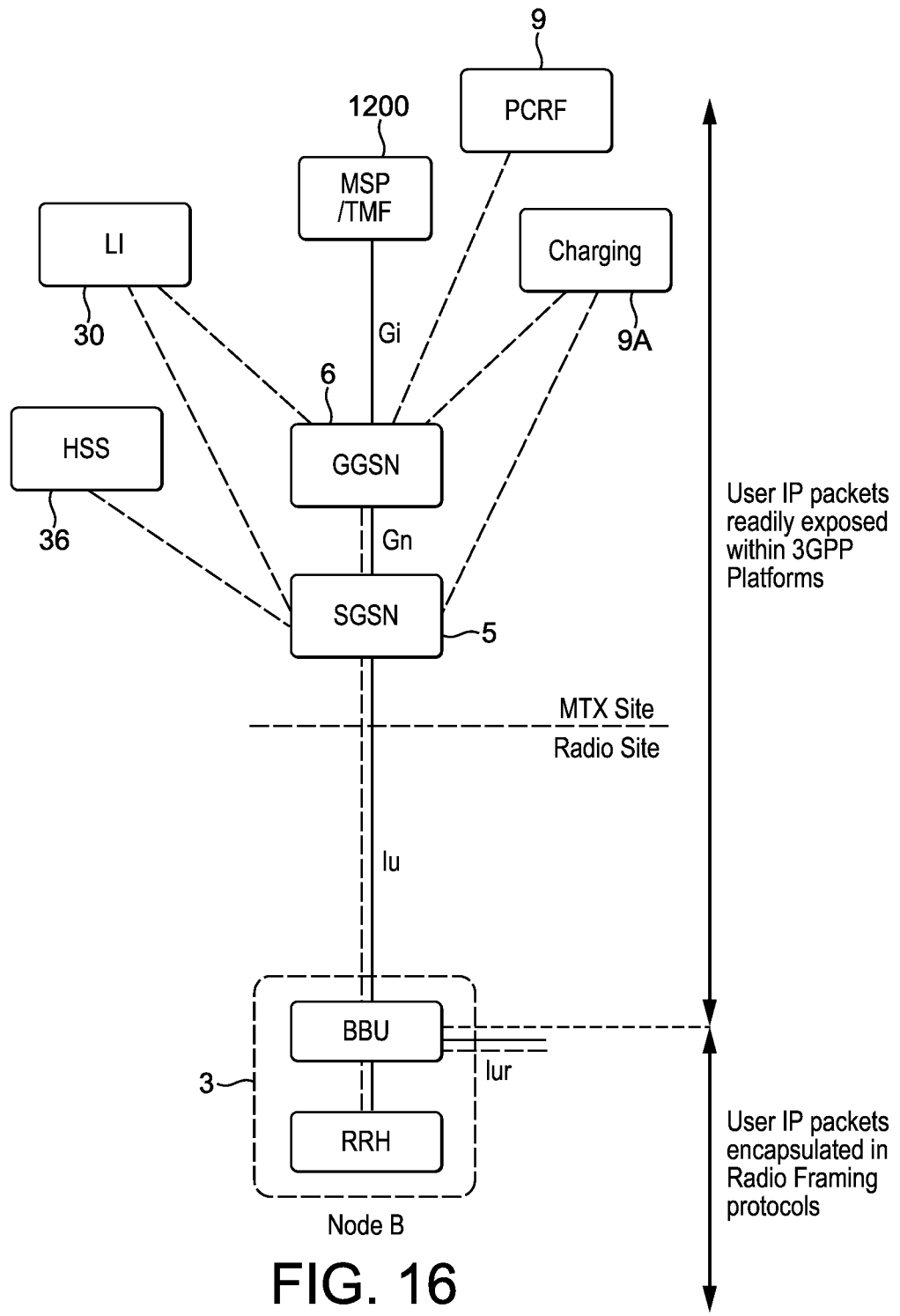
FIG. 16 shows the network architecture according to an embodiment of the invention for Evolved HSPA mobile networks.

The 3GPP access vendor may enable the platform 700 to be hosted at the Radio/Node B sites, however additional breakout functionality would be required between the Node B 1 and the RNC 3 to enable the platform 700 environment to be introduced. This is shown in FIG. 16.

The additional functionality would include mechanisms to at least manage the following aspect of the UTRAN design:

The extraction and introduction of User traffic from the secure links between the UE and RNC 3;

Inserting traffic onto a Rel-99 radio bearer in the downlink; and flow control over the Iub interface without impacting other downlink traffic flowing through the RNC 3;

Macro-diversity combining of uplink transmissions; and co-ordinated extraction of uplink transmissions across multiple radio sites;

Control over RRM algorithms in the RNC 3 in terms of load balancing, outer loop power control, and resource assignment between HS and Rel-99

The platform 700 (access node 800) at the Node B would treat its controlling RNC as the GW 802; and conduct procedures with this entity. The platform 700 Functions at the RNC 3 would then be responsible for registering with a central GW 802.

3.2 Evolved HSPA Mobile Networks

In some markets, the 3G/HSPA networks have been enhanced to move RNC functions from central MTX sites to the Radio site, as shown in FIG. 16.

The framing protocols of the radio therefore are terminated at the Radio site, allowing IP packets to be exposed.

The IP packets of the User are therefore easily accessible on all nodes across the operator network without significant extra functionality.

The deployment of evolved HSPA network functionality poses some challenges to operators. They require inter-radio site communication to ensure macro diversity gains are maintained in the uplink for HSUPA, and some changes in the core network to allow large numbers of "RNC" enabled Node Bs to be controlled from the core network nodes.

The introduction of platform 700 at the NodeB/Radio site 3 in the evolved HSPA network requires no extra functionality of the 3GPP network; and therefore it is considered a particularly advantageous deployment option for the platform 700.

The Iur interface within the Evolved HSPA mobile network is used to allow a user to be served on a neighbouring Node B, whilst having traffic routed back to a serving RNC function of the anchor Node B site. In this architecture, the Serving Node B may need to access information from neighbouring cells to identify the specific radio performance and load information for UE.

3.3 LTE Mobile Networks

Figure 17:
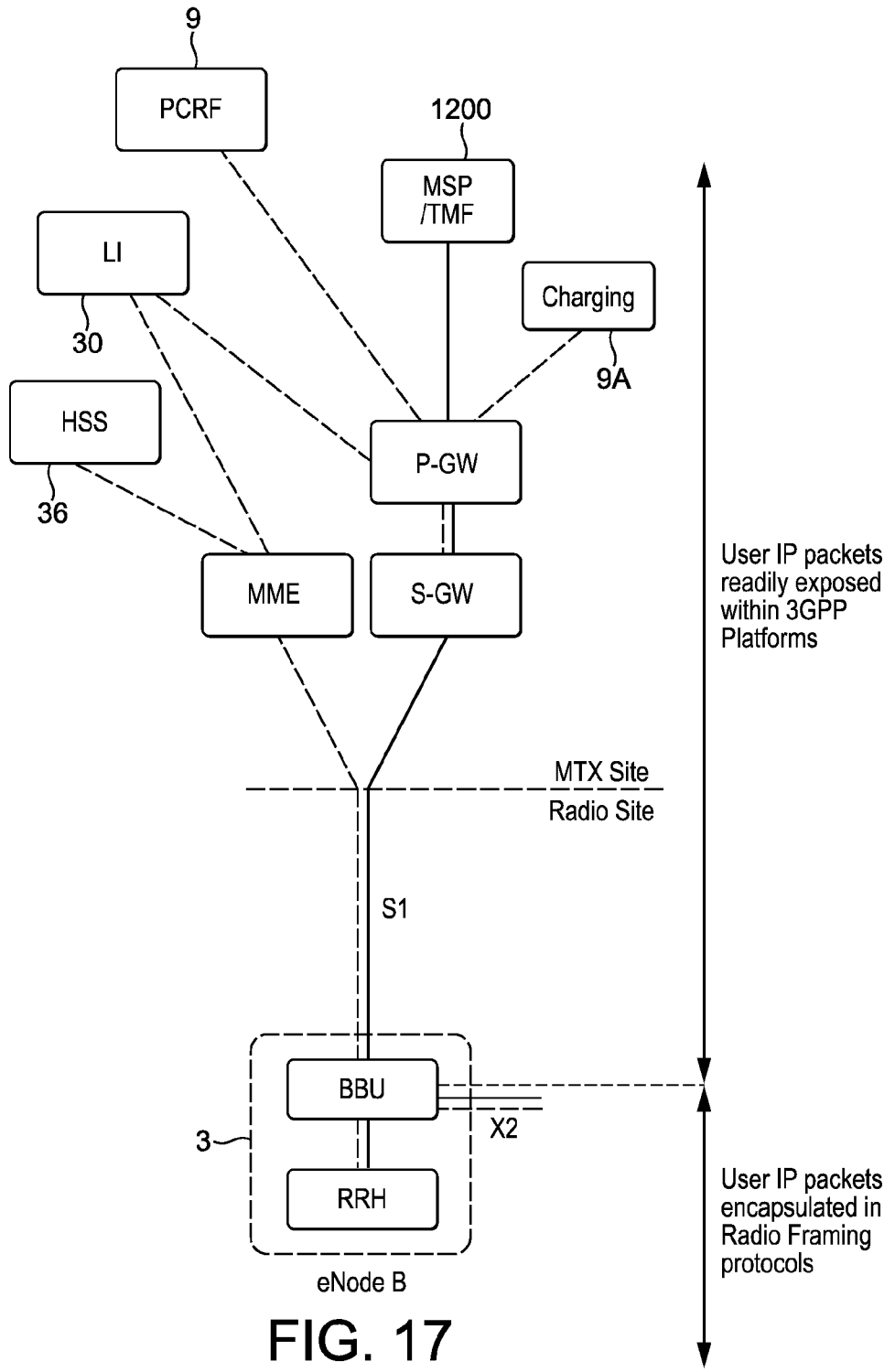
FIG. 17 shows the network architecture according to an embodiment of the invention for LTE mobile networks.

LTE networks, as shown in FIG. 17, share a similar functional architecture as Evolved HSPA, with the framing protocols of the radio being terminated at the Radio site, allowing IP packets to be exposed.

The IP packets of the User are therefore easily accessible on all user plane nodes across the operator network without significant extra functionality.

The deployment of LTE networks also require inter-radio site communication for optimised mobility. The core network is upgraded as part of LTE deployment.

The LTE core network will be upgraded to include the IMSI in the Initial UE context, which is sent to the eNB when the UE transitions to Active state; and it will also need to be included in the inter-eNB handover signalling.

The design of LTE included a new inter-radio site interface called the X2 interface, which includes some functionality for mobility whereby downlink packets are forwarded between radio sites from source site for delivery on a neighbour cell. One of the main differences between the X2 and the Iur interface of the evolved HSPA is that for LTE the packets are forwarded when the RRM control has moved to the new radio site; whereas for Evolved HSPA the RRM control for the UE does not transition between sites.

The LTE architecture also differs from other 3GPP systems in there is Ciphering and Integrity Protection of Mobility Management and Session Management signalling between the UE and the MME, this means that the NAS messaging may not be modified or even viewed (if Ciphering enabled) by the Access Network.

3.4 GPRS Mobile Networks

Figure 18:
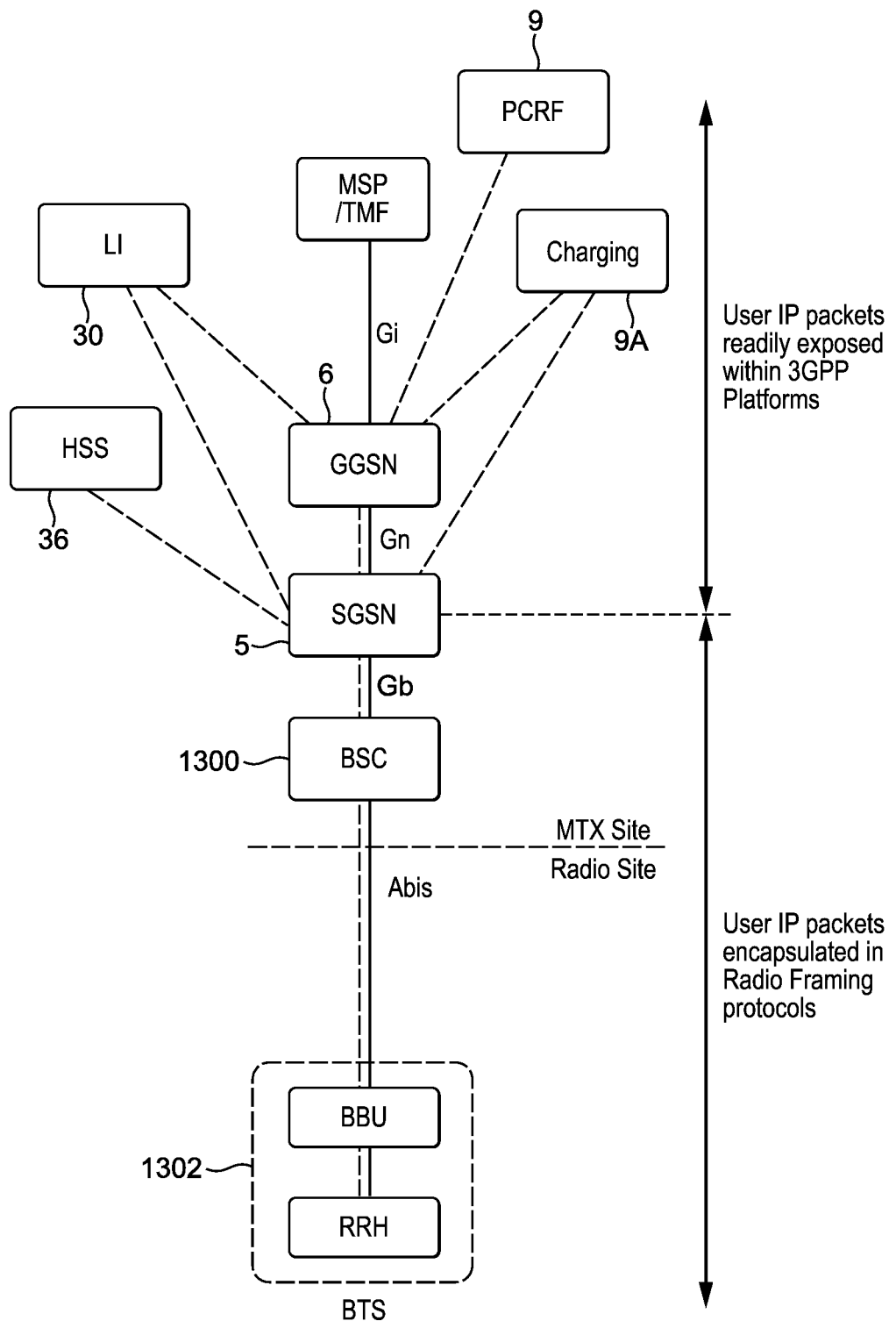
FIG. 18 shows the network architecture according to an embodiment of the invention for GPRS mobile networks.

The first packet systems deployed by 3GPP Mobile operators was GPRS, as shown in FIG. 18. These networks are still in operation and their traffic is growing due to Smartphone data usage.

The framing protocols of the radio extend up to the SGSN platform 5 from the UE, and it is at this point that IP packets are exposed. The SGSN platforms however is not aware of radio performance of the UE this knowledge does not extend beyond the BSC platform 1300.

As SGSNs and 2G Radio Access networks are typically from different vendors it may be difficult to offer that breakout functionality can be offered below the SGSN 5. To allow traffic breakout at the radio site would require the SGSN functions to be hosted at the BTS/radio site 1302.

When UEs are provided service via the 2G/GPRS access network the platform environment at the base station site 1302 may still provide information useful to the service functions of the central network; even if explicit operations on the data stream may not be possible from the base station site.

3.5 SAVi Implementation in the Access Network

The SAVi environment can be introduced through different upgrades to the access network.

Option A is an overlay solution, wherein a new Hardware module is added to radio site alongside existing 3GPP modules. Option B is where platform 700 functionality is introduced by performing a hardware or software upgrade to an existing 3GPP Hardware Module. Option C is where the existing 3G Hardware Module is replaced with a new Hardware Module comprising the platform 700 with 3GPP functions hosted in Software or Hardware.

It is envisaged that the implementation of the Radio site will evolve over time with initial deployments based on Options A or B; and evolve to Option C at a later date. Option A would also be applicable when the platform 700 environment was deployed on a Transmission PoC radio site.

4 Procedures Between SAVi and SAVi Gateway

There are a number of generic procedures which are common to all platform 700 implementations.

4.1 SAVi Platform Registration/De-Registration

When the platform 700 at an access node 800 is introduced to the network, the platform 700/800 registers its existence on the GW 802. The 3GPP Node and cell information of the cells which are controlled by the platform 700/800 are provided to the GW 802. The control of a 3GPP node is determined by the platform 700/800 having connectivity to the 3GPP node containing the RRC function of the Access Node 800.

The GW 802 provides the generic rules/configuration to the platform 700/800, e.g. the list of applications and services which can be used by all platform 700 users. The GW 802 updates its DNS (Domain Name System) 1400 to include a record for the new platform 700/800 and records for each of the cells that this Node B 3 controls.

If the IP address of the platform 700/800 is changed, the platform 700/800 needs to re-register with the GW 802.

4.2 SAVi User Registration/De-Registration

The 3GPP network may inform the platform 700 environment that a new User has registered/become active on the system; and may also provide a pointer to the generic profile to be used by the platform 700 until specific configuration details of the user are known.

When the platform becomes aware that a new user has arrived in the platform 700/800 environment the platform 700/800 registers on the Gateway 802. The platform 700/800 can register that is playing one or more of the below roles for a specific UE:

a) Controller: where the platform 700 environment is on the user plane path for the User and has a relationship with the 3GPP Access node controlling the RRC of the UE.

b) Traffic Source: where the platform 700 environment is on the user plane path for the User (i.e. the User has a PDP context active). For example, the platform 700 environment can host applications or optimisation functions for the user.

c) Information Source: where the platform 700 environment can provide information relating to the UE, for example about the resource usage/availability on the target cell on a Drift RNC.

As the platform 700 starts to play an additional role for the UE the platform 700 informs the GW 802 of the additional roles.

If the platform 700/800 indicates it is a Traffic Source or a Controller for a UE, the GW 802 provides the platform 700/800 the SAVI UE context including policy and charging information to the platform 700/800 environment as an increment to the generic rules/configuration, e.g. enabling additional applications to be offered to this specific UE.

The 3GPP network may indicate over the Network API 1017 that a user (with a given IMSI) is no-longer available on the network node which can trigger the platform 700/800 environment to indicate to the GW 802 is no longer a Controller or Information Source for the UE; however if there are on-going applications for this UE then the platform 700/800 environment may stay registered for this device as a Traffic Source. The GW 802 or the platform 700/800 environment at any time may trigger the UE to be deregistered for one or all of the above roles.

5 SAVi Services

5.1 Hosting Environment

The platform 700 provides an environment to host services and applications on the data path between the user and the internet 8. The platform 700 services can broadly be split into two categories:

Hosted Those which are hosted in the platform 700 environment and the IP address of the application/service hosted in the platform 700 environment is known to the UE.

Transparent Those where the UE believes it has a connection with a remote web-server and the IP address of the application/service hosted in the platform 700 environment is not known to the UE.

5.2 User Data Breakout

Figure 19:
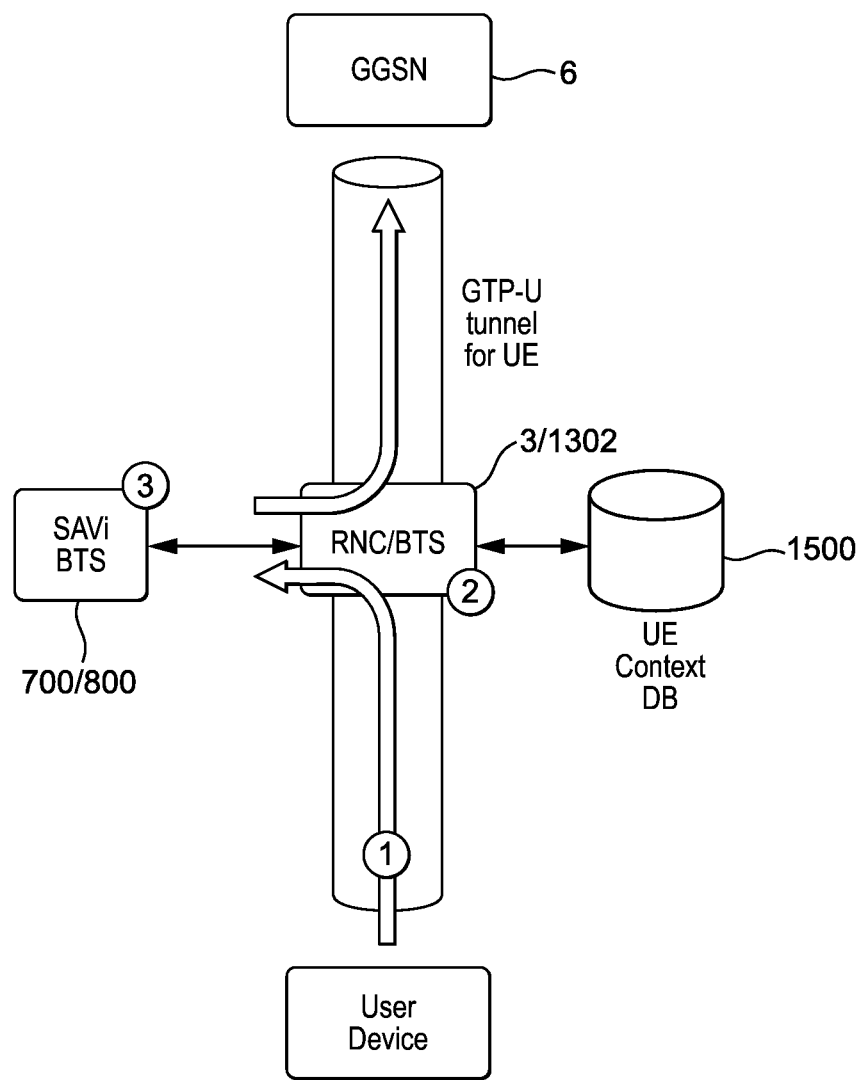
FIG. 19 shows the exchange of data between network elements according to an embodiment of the invention for performing User Data Breakout.

The steps performed are described with reference to FIG. 19.

- (0) As the UE transitions to Active state; the RNC 3/BTS 1302 informs the platform 700/800 that a user has arrived and passes the IMSI and Subscriber type to the platform 700/800, which trigger the retrieval of more detailed UE context information for this device from UE context database 1500.
- (1) When a service is activated on the User device, the device sends a data packet in the uplink on a PDP context—if a context is not active, the device establishes one (which triggers step 0 here).
- (2) The RNC 3/BTS 1302 receiving the data packet determines that Breakout is configured for this user/PDP context—and routes packets to the platform 700/800 indicating the IMSI and a Context ID.
- (3) When platform 700/800 receives the packet from the 3GPP it determines whether this packet can be handled by platform 700/800—based on the detailed UE context for this UE. If the packet can not be served by the platform 700/800, it is returned to the RNC 3/BTS 1302 with IMSI and Context ID and inserted into the uplink GTP-U tunnel for the UE.

5.3 Hosted Services—DNS

Figure 20:
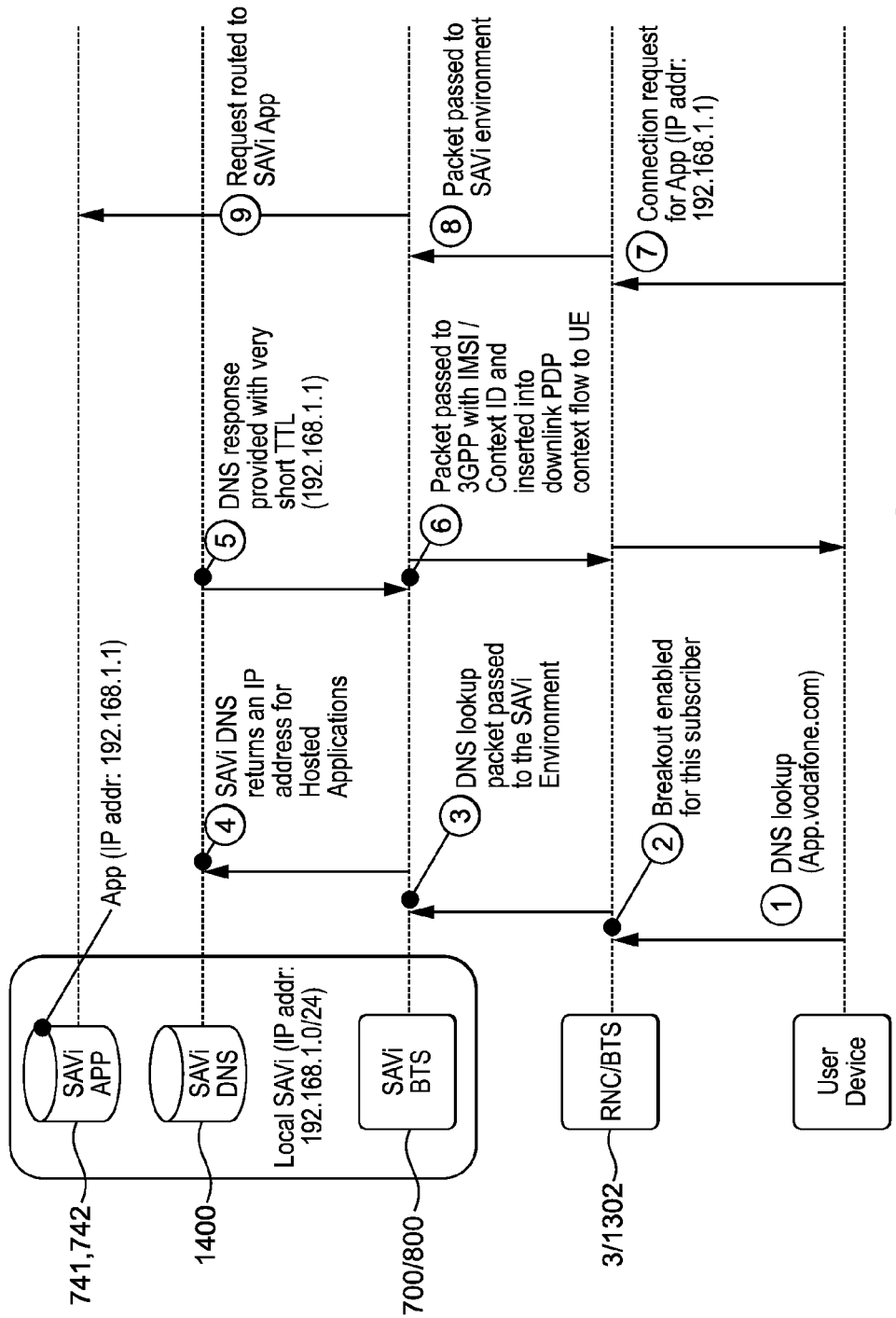
FIG. 20 shows the exchange of data between network elements according to an embodiment of the invention for performing Hosted Services—DNS.

FIG. 20 shows steps (1) to (9).

When the platform 700 DNS service 1400 receives a DNS Lookup request (1), (2), (3) from a UE for a locally hosted application 741,742, the DNS 1400 checks the UE profile to determines whether this UE is not allowed to use the local application 741,742; if this application 741,742 is allowed for the User a response is issued providing the IP address (4) of the local application 741,742, however if the UE is not allowed to access the application then the DNS request is returned to the uplink GTP-U tunnel of the PDP context.

The DNS 1400 service hosted in the platform 700 Environment can be configured to provide a response to the DNS Lookup based on the User profile. For instance, if the User is likely to be mobile the DNS response could be for a centrally hosted version of the Application; whereas if the User is unlikely to be mobile the response would be the IP address of the locally hosted version of the Application 741,742.

The TTL (Time to Live) of the DNS response (5) would need to be configured to avoid caching of DNS responses in the User device for locally hosted applications 741,742, as the IP address of the application could be different on a neighbouring cell. Steps (6), (7), (8) and (9) are then performed.

5.4 Hosted Services—Enterprise App

Figure 21:
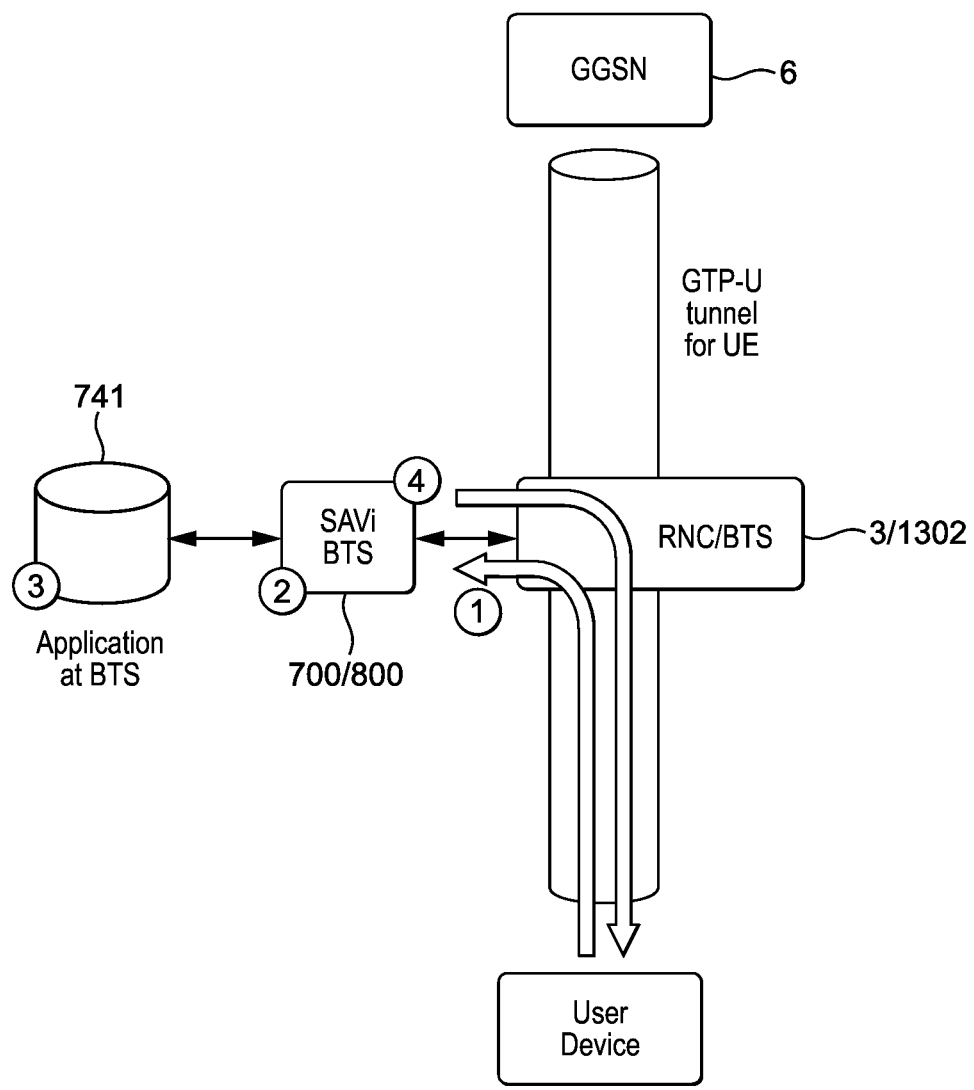
FIG. 21 shows the exchange of data between network elements according to an embodiment of the invention for performing 6.4 Hosted Services—Enterprise Application.

FIG. 21 shows steps (1) to (4).

- (1) UE sends a Request for Application 741 hosted on the access node platform 700/800; (Source IPaddr of UE PDP context, Destination IPaddr in platform 700/800 address range); The RNC 3/BTS 1302 pushes the data packet to the platform 700/800 because the UE context of the User is platform 700/800 enabled.
- (2) The platform 700/800 determines that packets are for local Application 741 hosted on platform 700/800 and that the UE is allowed to access the application 741 and then passes the packets to the hosted application 741. If packets are not for local application 741 or the user does not have access rights the packets are returned to the uplink GTP-U tunnel of the PDP context.
- (3) The Application 741 responds to the User Device (Source IPaddr—local SAVi address; Destination IPaddr—User IP address) and passes packets to the platform 700/800.

The platform 700/800 passes the packets to the RNC 3/BTS 1302 and they are inserted in the Downlink bearer to the User Device.

5.5 Transparent Services—Caching

Figure 22:
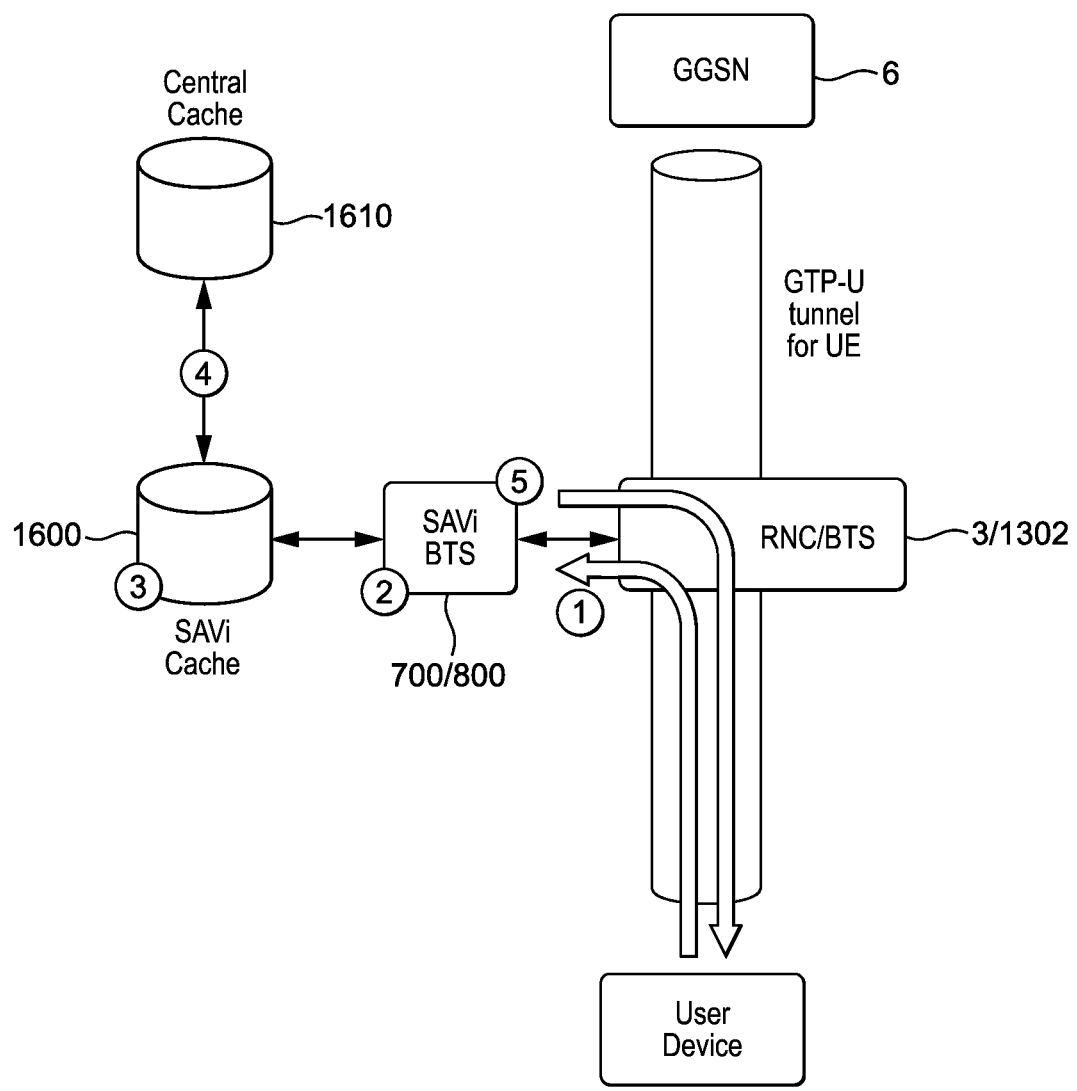
FIG. 22 shows the exchange of data between network elements according to an embodiment of the invention for performing Transparent Services—Caching.

FIG. 22 shows steps (1) to (5).

- (1) Request for Web object is forwarded to platform 700/800 with IMSI and Context ID.
- (2) Platform 700/800 determines whether request can be processed by the platform 700/800 and forwards the data packet to the platform 700 Cache 1600.
- (3) Cache 1600 determines that content is cacheable, and verifies that no restrictions apply for this UE of this content (e.g. it is not an adult file) and it determines whether the content is available locally. If the content is available it is served from the cache 1600 (Go to step 5).
- (4) Otherwise, the Cache 1600 establishes a connection to the central cache 1600 which is used to retrieve the content; the Central cache 1600 may then forward the request to the content server if it is not available. The content is then passed to the platform 700 Cache 1600 where it may be stored.
- (5) The platform 700/800 returns the content to the User Device, by passing the Data packets to the RNC 3/BTS 1302 with IMSI and Context ID

5.6 Remoteable Services

Figure 23:
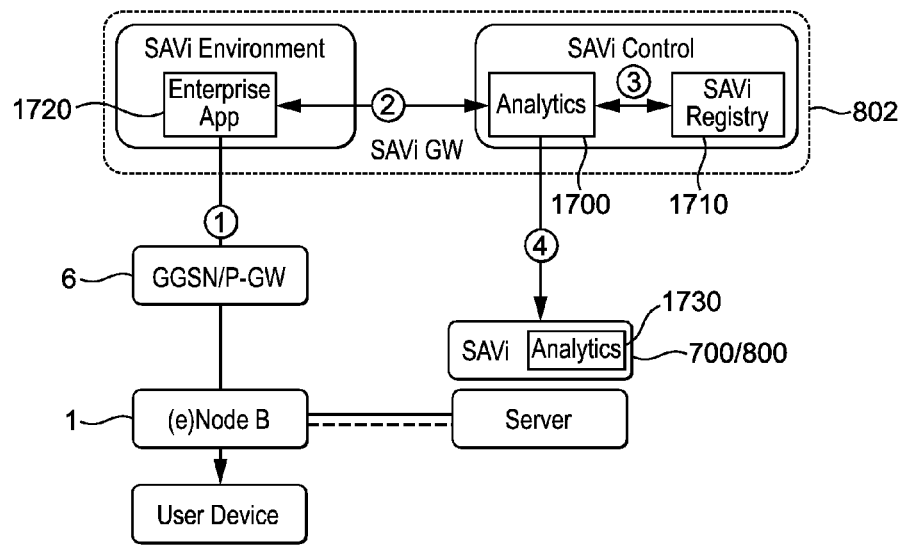
FIG. 23 shows the exchange of data between network elements according to an embodiment of the invention for performing Remoteable Services.

An important aspect of the platform 700 system is the ability for remote service to retrieve real-time user information from the platform 700 environment such that it can be used to improve service quality and efficiency as well providing the enablers for new service creation. Steps (1)-(4) are shown in FIG. 23.

1. The UE initiates an Enterprise App 1720; and access point platform 700/800 at edge does not host this application at the site; the system is configured to host this service from a central environment.
2. The Enterprise App 1720 requires UE or Area specific information and can request this information through platform 700 APIs to the Analytics application 1700 hosted on the GW 802. Example information that can be requested includes: System Load, RR conditions, UE Location and Mobility.
3. Analytics App 1700 asks platform Registry 1710 which access node platform 700/800 is hosting this customer (Controller)
4. Analytics App 1700 contacts Remoteable Analytics service 1730 at access node platform 700/800 and pulls necessary information, which is passed back to Enterprise App 1720. The Remoteable Analytics service is responsible for pulling information from other local services on the access node platform 700/800. If the parameters are being tracked over a period of time, periodic and event based reporting of information can be configured.

5.7 Control Plane Proxy

Figure 24:
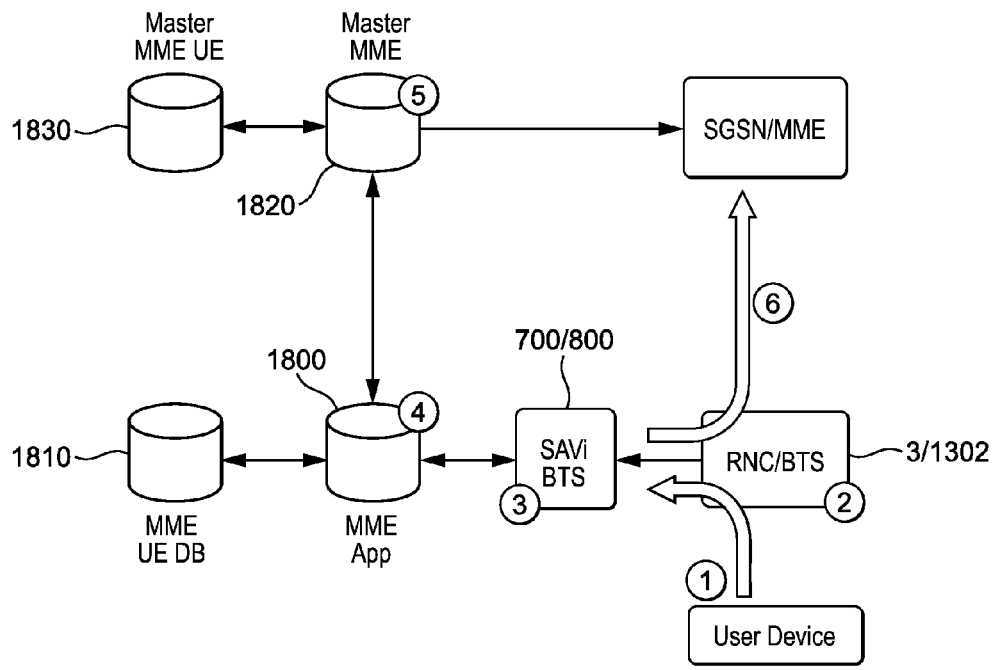
FIG. 24 shows the exchange of data between network elements according to an embodiment of the invention for providing Control Plane Proxy.

As the number of devices increases on mobile networks the control infrastructure will struggle to scale to meet the increased demand. Some devices do not benefit from having centrally hosted control infrastructure, e.g. M2M and MBB (Mobile Broadband) devices, therefore these devices could be handled more locally. FIG. 24 describes steps (1)-(6).

1. When the UE arrives on cell and sends the Initial L3 message which includes the P-TMSI of the device.
2. The Radio nodes would be configured to route the Initial L3 message to the access node platform 700/800.
3. Platform 700/800 receives the L3 message and sends to MME App 1800 hosted in platform 700/800.
4. MME App 1800 checks to see if the UE is known in MME UE DB 1810, if it is known the DB 1810 returns UE profile and MME App 1800 creates response for the UE; else MME app 1800 sends request to Master MME App 1820 (including the Initial UE message).
5. Master MME 1820 App checks its DB 1830 and decides whether to serve the UE centrally or locally:
    a) If centrally; the Master MME App 1820 passes the UE record and UE message to central MME with IP address X (which triggers MME to bring context into memory allowing response to UE to be prepared; and returns an indication to platform 700/800 MME App 1800 that the UE is being served centrally and sends IP address X—platform 700/800 sends packet to RNC 3 including IP address X
    b) If at the edge; the Master MME App 1820 sends UE record to the MME App 1800 on the platform 700/800—The MME App 1800 creates the response for the UE and passes this to the platform 700/800; The Master MME App 1820 stores the address of the Edge MME App 1800 which has requested the context;

The Master MME App 1820 determines last cell UE came to active state and sends a purge message to the MME App 1800 on that BTS 1302. The platform 700/800 on this cell removes this UE from its local MME UE DB 1810.

6. If served centrally the RNC/BTS 3/1302 Sends the Initial UE message to IP address X At the end of the session when the UE returns to Idle; the MME APP 1800 at the platform 700/800 sends the latest UE/MME context to the Master MME App 1820; which updated the Master MME UE DB 1830.

When determining whether the UE is allowed to use a local MME App 1800, the Central MME 1820 may assign a P-TMSI to the UE in manner whereby the structure indicates whether local hosting is allowed—e.g. if MSB of the P-TMSI is "0" then always serve this UE centrally—i.e. Do not pass to the platform 700/800; whereas a MSB of "1" means the message should be passed to the platform 700/800.

Mobility 6.1 Application Requirements

When a user is active on a base station which has an access node platform 700/800 deploy, the user has been registered on the GW 802 by the controlling platform. The Services/Applications hosted by the platform 700/800 will have different requirements and these can broadly be split into two categories:

State-less: Applications or Services that require mobility to be supported for the duration of the TCP connection; new TCP connections can be handled by a different service/application instance. Typical examples of state-less applications are TCP/Content optimisation and web cacheing.

State-full: Applications or Services that require mobility to be supported for new TCP connections; new TCP connections need to be handled by the same service/application instance to avoid interruptions to the service.

The platform 700/800 will need functionality to support Mobility for both categories.

6.2 Mobility Support within 3GPP

The UTRAN network was designed based on the Serving RNC 3 being an anchor point within the access network for user traffic, hiding much of user mobility from the core network. If a User is using cells on Node Bs 1 of a neighbouring RNC, that RNC forwards the packets to the SRNC. The Serving RNC decides when the RNC anchor point should be changed through the SRNS relocation procedure.

In UTRAN when platform 700 is co-located with the RNC function, the RNC function can ensure that platform 700 mobility is minimised whilst the user has an active connection to a local hosted service/application. If platform 700 environment is hosted with a Node B 1, in front of RNC functions, then the 3GPP mobility of UTRAN cannot be relied on to support inter-site mobility.

When platform 700 is introduced to an evolved HSPA network, where the RNC function is collapsed to the radio site, the platform 700 environment controlling the User will correspond to the Node B site which includes the Serving RNC function for a user. Due to the inefficiency on site backhaul of relaying data traffic over the Iur between sites, before platform 700 was devised it could be assumed that the Iur between the evolved HSPA Node Bs would be a short-lived connection. However the introduction of platforms 700 without adequate mobility support would mean that all traffic for a UE would need to be passed back to the Source Node B, not just the State-full applications, or long-lived Stateless applications.

For LTE, a different approach was developed for mobility whereby some communication happens between radio sites however the duration for which downlink packets are forwarded from source site for delivery on a neighbour cell only occurs during or shortly after the handover procedure. Therefore, unless the LTE system can be operated in a manner whereby the Data forwarding between sites is extended in both time and direction, the mobility between platform 700 environments would be more critical.

6.3 SAVi to SAVi Mobility

When a UE is in RRC connected state within 3GPP, the access node platform 700/800 has been made aware of the UE on the associated RAN node; the platform 700/800 has registered with the GW 802 as a Controller or a Information Source for the UE; and received the UE SAVi context for the UE.

The UE then starts using service where parts of the service functionality are provided an access node platform 700/800 of the serving cell. The UE starts to move and the radio conditions dictates that the user needs to move to a new cell controlled by a new 3GPP Node.

The handover signalling in the network between 3GPP Nodes includes the IMSI of the UE; such that the new 3GPP Node is informed that a new UE will be arriving shortly. The 3GPP Node is configured to inform the associated new platform 700 environment that a UE is about to arrive (passing IMSI of the device). The new platform 700 can register as a Controller with the GW 802 and receive the UE context.) When a UE arrives on a new cell, the new platform 700 associated with the new data path needs to insert itself on the data flow to ensure service continuity.

When the Source 3GPP Node sends the handover messaging to the UE, the 3GPP node informs the platform 700/800 that the UE will be moving cell and the access node platform 700/800 is informed of the Cell_ID of the target cell.

The access node platform 700/800 performs a DNS lookup for the new target platform 700, using a defined format, for example Cell_ID.SAVi.Vodafone. The DNS 1400 of the access node platform 700/800 operates in a normal manner, verifying that the requesting application is authorised to make the request; and then responds with the IP address of the new platform 700. If the DNS does not include the record, it requests the DNS of the GW 802.

If the User has any open applications or ongoing TCP connections terminating at the, access node platform 700/800, the Source access node platform 700/800 contacts the target new platform 700 and establishes an IP connection. The Source access node platform 700/800 informs the new target platform 700 that specific traffic from the UE should be sent via the IP connection to the Source access node platform 700/800. The Source access node platform 700/800 updates the default route for Data traffic the User to be the IP connection to the new target access node platform 700/800.

When the UE arrives on the new Target platform 700, the Source access node platform 700/800 subscribes to a Mobility Service for the UE hosted on the Target platform 700. The Mobility Service notifies other platforms 700 subscribed to the Service of a change of Controller for the UE, including the Cell/Node ID of the new Controller. A platform 70 which is hosting an on-going application for a UE would trigger the establishment of a connection to the new Controller as discussed above.

When the Source platform 700/800 indicates to the Target platform 700 which uplink traffic should be forwarded it describes the traffic as follows:

| Application Types | Hosted (Platform Dest IPaddr) | Transparent (Web Server Dest IPaddr) |
|---|---|---|
| Stateless | Existing Connections route to Source access node platform 700/800 based on Destination IP address New Connections handled on Target platform 700 | Existing Connections pass to Source access node aplatform 700/800 (Case 1) New Connections handled on Target platform 700 |
| Statefull | Existing Connections Route to Source access node platform 700/800 based on Destination IP address New Connections Source access node platform 700/800 based on Destination IP address (Case 2) | Existing Connections passed to Source access node platform 700/800 (Case 1) New Connections passed to Source access node platform 700/800 (Case 3) |

For existing sessions of Hosted applications the UE is sending packets to the IP address of the Source access node platform 700/800, and therefore routeing would not be a challenge.

However there are a number of areas where there are issues for the routeing of Uplink packets to the Source access node platform 700/800, and these are:

Case 1 When a UE arrives on a Target platform 700 and an existing connection is open for the UE, the target platform 700 does not know whether the another platform 700 is performing any operations on the data stream. The Target platform 700 must route any uplink packets for connections already established prior to arriving on the Target platform 700 via the platform 700 hosting the application. However the Target platform 700 is unaware to which platform 700 the uplink data should be routed (as there could be multiple for an active & mobile subscriber).

Solution 1: the platform 700 hosting the application would need to provide information about the ongoing connection controlled by the application, e.g. the source/destination addresses of the connection; (assumes connection information does not change over time . . . )

Case 2 When a UE arrives on a Target platform 700 and a State-full Application is running for the UE on another platform 700. If the UE establishes a new connection for that Application the Target platform 700 would need to know to route the connection request to the platform 700 that hosts this application and this would not be a problem if the UE addresses the application by IP address. However, if the UE first sends a DNS lookup for the application then DNS Server 1400 on the Target platform 700 would need to return an IP address for the Application on the platform 700 that is hosting the Application.

Solution 2: the platform 700 hosting the service would need to provide a DNS record associated with the open state-full application to the Target platform 700; Solution 3: the platform 700 hosting the service would need to register responsibility for a given Application (e.g. with a common Application ID used across all platforms 700) and any new DNS requests resulting in use of that application would result in the request being forwarded to the platform 700 hosting the service).

Case 3 When a UE arrives on a Target platform 700 and a State-full Application is running on the Source platform 700 operating transparent on the data flow between the UE and a web-service. If the UE establishes a new connection for that Web-service the Target platform 700 would need to know to route the connection request to the platform 700 that hosts the application controlling the data flow for this web-service. As the Application operation is transparent to the data flow the UE is not aware of which platform 700 this service is hosted on. Additional information would need to be provided by the platform 700 hosting the Application to new application allow new requests to be routed to the platform 700.

Solution 4: the platform 700 hosting the service would need to register responsibility for a given Application (e.g. with a common Application ID used across all platforms 700) and any new DNS requests or connection establishments resulting in use of that application would result in the request or establishment being forwarded to the platform 700 hosting the service).

Of the solutions proposed, the most generic would be for the platform 700 hosting an application to contact a new platform 700 when the UE arrives on the platform to:

Establish an IP connection with the new platform 700,

Send a list of Application IDs where new connections from the UE should be passed on the established IP Connection.

Send a list of Destination IP Address (& port numbers) where User packets from ongoing connections should be passed on the IP connection.

When there are no longer any ongoing applications for a UE on a platform 700 it can initiate the disconnection of the IP connection with the Controller, which triggers the Controller to revert to the original handling for the UE.

An early implementation could avoid complexity by requesting that all traffic is routed via the platform 700 whilst any application remains hosted by on the platform 700.

6.4 SAVi to Non-SAVi Areas

When the UE is operating in an enabled area served by a platform 700, and the device moves outside of the area or moves to 2G the uplink traffic from the UE would pass to the GGSN 6.

Figure 25:
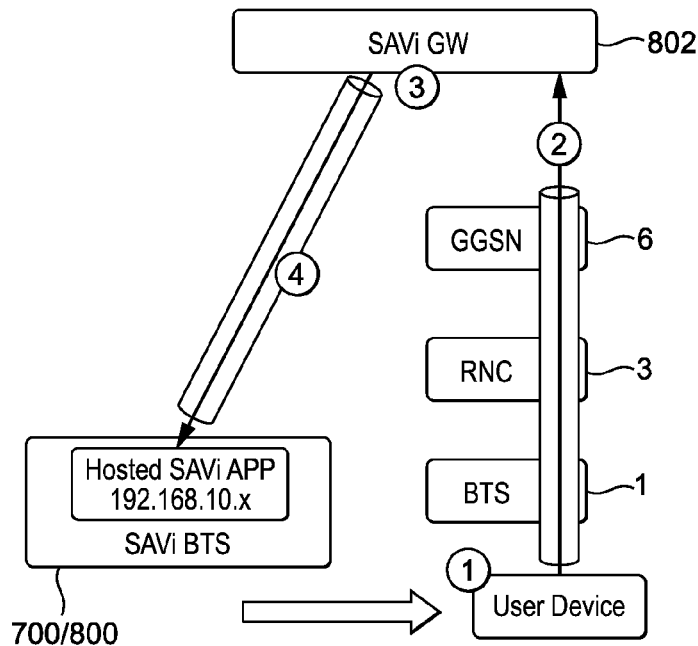
FIG. 25 shows the exchange of data between network elements according to an embodiment of the invention for allowing a platform to provide service in the uplink when a mobile terminal moves out of an area served by the platform.

For Applications/Services hosted on the platform 700 environment the UE the IP address would be that of a platform 700 (one of the platform Traffic Sources for the UE). If this IP address is routeable then it is possible to introduce a platform 700 entity on the data path to avoid the service continuity problems—this could be a function of the GW 802. Steps (1)-(4) as shown in FIG. 25.

1. When the UE communicating with an Application hosted on an access node platform 700/800 and it changes cell to a cell outside of an area served by platforms 700, the uplink packets to the application would be sent to the network in the normal manner.
2. The uplink packet would not be intercepted by the access node platform 700/800 and would flow to the GGSN 6. The IP address of hosted apps would be routeable to the GW 802; (E.g. The range of IP addresses for platforms 700 could be 192.168.x.x/16)
3. When the GW 802 receives the packet it determines whether a Traffic Source exists for this user (based on source IP address of the packet) on the platform 700 specified by the destination IP address of the IP packet, otherwise the packets are dropped by the GW 802.
4. The GW 802 passes the IP packets on an IP connection to an access node platform 700/800; Downlink packets (i.e. the Response) are passed back from the application/access node platform 700/800 to the GW 802 to deliver to GGSN 6.

For downlink packets, when the access node platform 700/800 loses connectivity to the UE, the packets can be routed to the GW 802, and it would be responsible for delivering the packets on the Gi LAN, which would route the packets to GGSN 6 and onto the PDP context of the UE.

Figure 26:
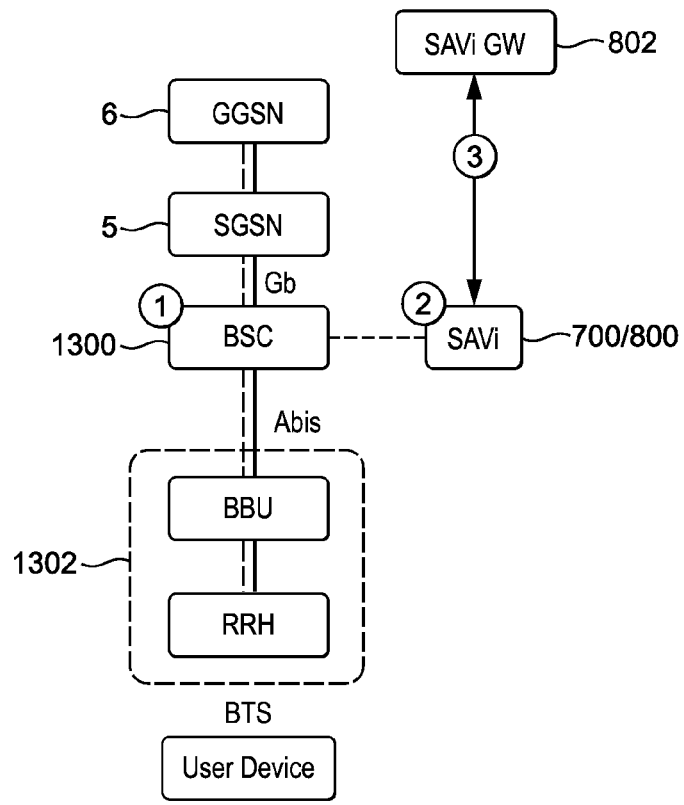
FIG. 26 shows the exchange of data between network elements according to an embodiment of the invention for allowing a platform to provide service in the downlink when a mobile terminal moves out of an area served by the platform.

Even in areas where a platform Controller is not available on the PDP Context data path (e.g. because of encrypted data connections), useful information of the service can still be provided by platform 700 Information Sources for the UE. Steps (1)-(3) are shown in FIG. 26.

1. When the UE enters PMM Active State the BSC 1300 is provided the 3GPP UE context by the SGSN 5, this context includes the IMSI of the UE.
2. The BSC 1300 is configured to inform the access node platform 700/800 when a new UE has arrived on the 3GPP system; and passes the IMSI to the access node platform 700/800. The access node platform 700/800 is (made) aware that the 3GPP platform has no ability to control the User plane of the PDP context for this UE. The access node platform 700/800 configures the 3GPP platform to provide measurements relating to User/system to the access node platform 700/800.
3. The access node platform 700/800 registers with the GW 802 and indicates it is an Information Source for the UE. The GW 802 updates the Registry 1710 allowing other Central Applications and service to request information regarding this UE from the access node platform 700/800.

7 SAVi Impact on Core Systems

Today, the Policy, Lawful Intercept, Billing and Customer databases integrate into the Core Network nodes of the 3GPP network. The related functions of the 3GPP network including enforcement points are also part of the core network. Information from these core systems is very limited in the access networks; with the only information flowing to the access typically is a sub-set of QoS parameters for the customer data passing over the network.

7.1 3GPP Charging in SAVi

In the traditional 3GPP architecture the GGSN 6 is responsible for the creation of CDRs (Call Data Records) which are passed to the billing system for Non-roaming customers; whereas the SGSN 5 creates the CDRs for Roaming customers.

Before platform 700 are introduced the GGSN 6 (and SGSN 5 for roaming customers) had complete visibility of the traffic flowing to each customer, with the User Plane passing transparently to the customer through intermediary network nodes. Platforms 700 enable new network and service applications to be deployed which can change the total volume of traffic over the network, and therefore some modifications are needed to the design of charging.

Network Applications such as Video optimisation cause the GGSN 6 to overestimate, whereas other Network Applications such as Caching & CDN (Content Delivery Network) cause the GGSN to underestimate, the quantity of traffic consumed by/delivered to a customer. Service Applications hosted by the platforms 700 will mean that the GGSN will have little or no visibility of the data consumed by a customer.

Figure 27:
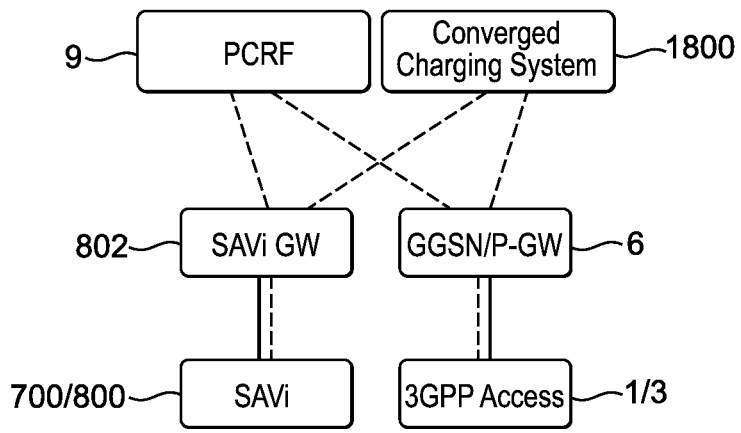
FIG. 27 shows the network elements according to an embodiment of the invention for allowing charging.
Figure 28:
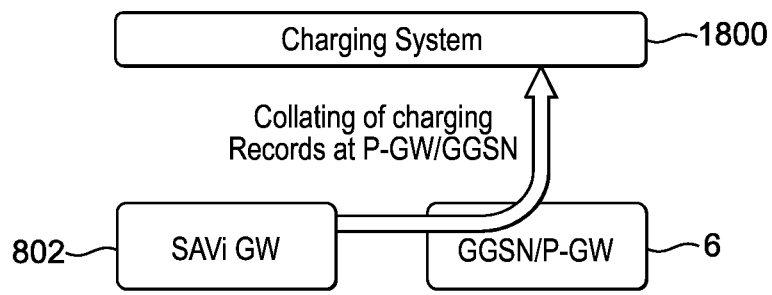
FIG. 28 shows one method of providing charging in the platform environment.

There are a number of solutions for the integration of platforms 700 and 3GPP charging that are dependent on the charging mechanism applicable to the customer (i.e. offline/post-pay and online/prepay) and these are to maintain the existing byte count model. FIG. 27 shows a converged charging system 1800 in a network that includes access node platforms 700/800 and GWs 802. The proposed solutions are:

A. As shown in FIG. 28, the GW 802 provides charging information to the GGSN 6 over the Network API 1017 (via the GGSN Adaptor 1020) to address the inaccuracies in the GGSN 6 assessment of customer data consumption. The GGSN 6 receiving this information would be responsible for collating the information into a single CDR (eG-CDR). No additional requirements are expected on the eG-CDR format. The data consumption could be categorised using the Charging Key concept defined in 3GPP to capture consumption that is associated with overestimation and underestimation independently.

B. The Network API 1017 could be used to pass Charging information to another 3GPP network node in the user data flow, and that 3GPP node would be responsible for inserting the provided information into a specially marked GTP-U frame in the uplink which is removed and incorporated by the GGSN 6 into the CDR (eG-CDR). The format of the information should ensure that there are no additional requirements on the format of the eG-CDR.

Figure 29:
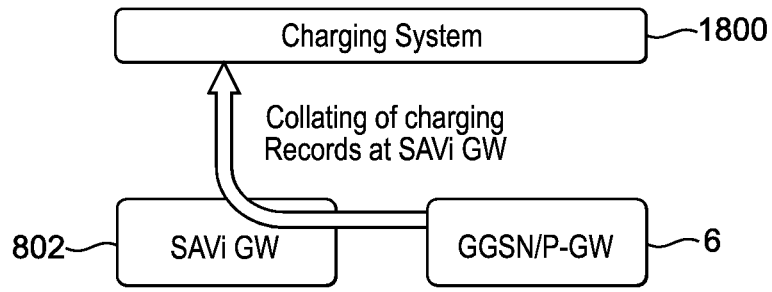
FIG. 29 shows another method of providing charging in the platform environment.

C. As shown in FIG. 29, the GGSN 6 charging interface is routed via GW 802 and GW 802 is responsible for collating the GW 802, access node platform 700/800 and GGSN 6 charging records into a single CDR record.

Options A & B require the Network API 1017 to allow charging information to be passed from GW 802 to 3GPP node; whereas Option C requires the GW 802 to collate the GGSN 6 charging records and interface into the Charging System 1800 in a consistent manner.

To create new model (Smart Charging) applicable to both offline and online charging mechanisms:

a) Each Service Application 741,742 has its own means of charging e.g. through the use of Mondrian/GIG/ER that does not necessarily require byte counts.
b) Network Applications 1015, 1016 that cause the GGSN 6 to underestimate generate byte count level charging information that is in addition to the GGSN 6 information. It is up to the charging systems to process this appropriately. There is a risk of credit fragmentation here for online charging.
c) Network Applications 1015, 1016 that cause the GGSN 6 to overestimate, the platform 700 environment indicates to the GGSN 6 over the Network API 1017 to inhibit counting traffic attributed to such applications. The platform environment uses the references to policy received from the PCRF 9 for such applications to describe the associated traffic flows. The platform 700 environment is then responsible for counting and reporting the data traffic associated with such application. As a result each application's data traffic is only counted once but there may be two sources of charging data for a customer.

7.2 Adult Content Filtering

Responsible operators include functionality within networks to ensure inappropriate content is not delivered to users unless they have explicitly proved they are an adult.

In the future a greater granularity of content types are likely to be required to determine whether content may or may not be delivered to specific groups of UEs.

If the platforms 700 are to host applications and serve content within the Access Network then they need to be informed as part of the user profile of any restrictions for that user.

When content is stored in the cache 1600 of the platform 700/800; the GW 802 provides an identifier for the content which is used by the platform 700/800 to determine which groups of UEs can access a piece of stored content.

A similar scheme is provided for the hosted applications 1015,1016 and services 741,742; whereby the applications and services may also have an associated Adult content restriction.

When a UE is not allowed to receive content due to Adult Content Filtering rules; the User request is forwarded back onto the Uplink GTP-U tunnel to existing handling within the network is maintained.

7.3 Maximum Bit-Rate Policy Enforcement

In the 3GPP system, each PDP context has associated Uplink and Downlink

Maximum Bit Rate parameters. The Downlink maximum bit rate parameter for a specific PDP context is enforced by the GGSN 6, whereas the uplink maximum bit rate parameter is enforced by the RAN 1,3.

When the platforms 700 are is introduced on the data path of the PDP context the GGSN 6 no longer can enforce the Maximum Bit-rate for the PDP context, and therefore this functionality will need to be replicated by the platform 700 or the 3GPP node which provides connectivity between the platform 700 and the PDP context of the UE. The Maximum Bit Rate of a PDP context can be included in the RAB parameters sent by the SGSN 5, and this can these can either be enforced by the 3GPP node on the downstream of the platform 700; or passed to the platform 700. However if the platform 700 is performing the enforcement of Maximum Bit Rate then all data associated with the User in the downlink would need to pass through the platform 700.

For the uplink again either the platform 700 or the 3GPP node can perform the enforcement of Maximum Bit Rate. If it is the platform 700, all uplink traffic for that PDP context would need to be routed via the platform 700, and if it is the 3GPP node, enforcement would need to be completed on the node before the routeing of uplink packets to the platform 700.

7.4 Lawful Intercept in SAVi

The design of platforms 700 aims to minimise the impact to Lawful Intercept (LI) within the network. Existing content routed through the GGSN 6 in the uplink or downlink will continue to be handled by existing LI implementation.

Lawful Intercept in one platform 700 implementation is designed to avoid Lawful Intercept information being known by the platform 700 environment; and further optimisations of the design to reduce the volumes of data required to be passed around the network may be provided in other implementations.

Figure 30:
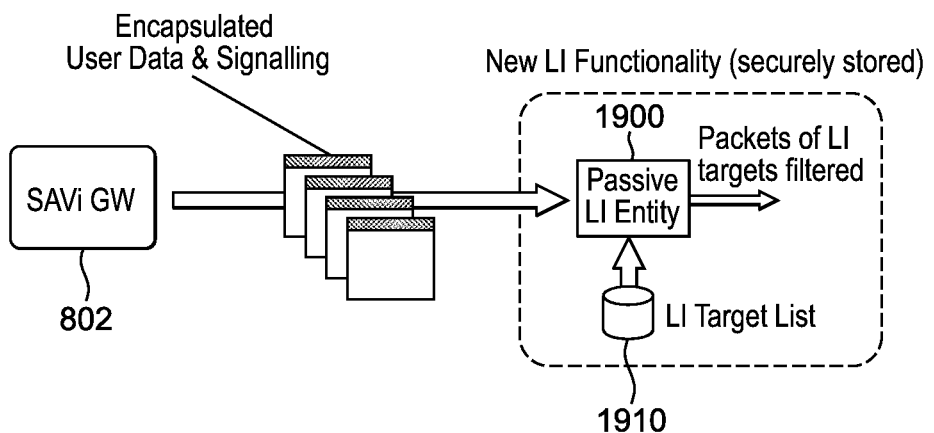
FIG. 30 shows the network elements according to an embodiment of the invention for allowing Lawful interception of data.

All Data of all users served by platforms 700 is passed through a Passive LI Entity 1900 as shown in FIG. 30; and this data would be encapsulated with at least User ID, cell ID, and Time of Transmission.

The Passive LI Entity 1900 has the capability and authority to see all data and is responsible for filtering based on the User information included in the encapsulation and data in an LI target list 1910 which identifies users subject to LI.

7.4.1 Signalling Plane

In one platform 700 implementation, GMM/SM (CPRS Mobility Management/Session Management) signalling messages to the SGSN 5/MME will be maintained for all users; and therefore the existing LI implementations would also remain.

Figure 31:
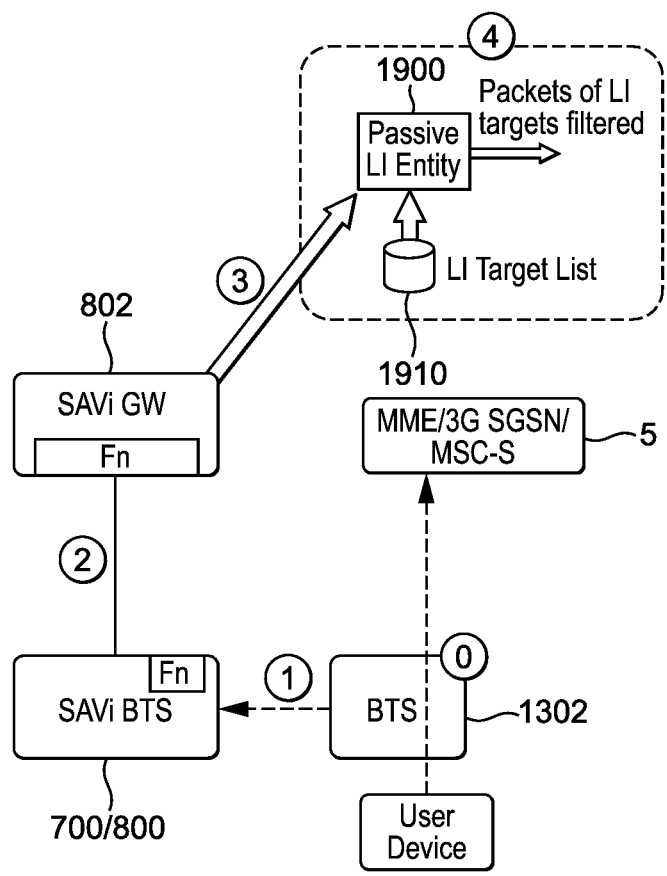
FIG. 31 shows the exchange of data between network elements according to an embodiment of the invention for Lawful interception in the signalling/control plane.

In other implementations, the access node platform 700/800 may capture all LTE and 3G 3GPP GMM & SM related signalling messages; host 2G SGSN software allowing 2G GMM/SM signalling messaging to be exposed to the access node platform 700/800; and tunnel these to the network (via GW 802) as a uniform signalling related interface. FIG. 31 shows steps (0)-(4) for such implementation.

0) Access node platform 700/800 sets rules on BTS 1302 to copy all GMM/SM/CC/MM signalling messages for all Users to the access node platform 700/800 (as well as sending to core network node)
1) When L3 message passes BTS 1302; the BTS 1302 duplicates message to access node platform 700/800.
2) Access node platform 700/800 packages all L3 Signalling messages received; with a new LI Header: including UE ID, timestamp, IMEI, Cell ID/Location—as well as any specific fields of L3 message which are important to LI to avoid LI entity 1900 having to dig through the signalling message again, and sends to the access node platform 700/800.
3) Access node platform 700/800 passes all encapsulated Signalling messages & new LI header to the LI entity 1900.
4) LI entity 1900 performs filtering based on new LI header; and correlates events of the UE based on this new header—avoiding lengthy process of analysing each message individually

7.4.2 Cached Content at Radio Site

Figure 32:
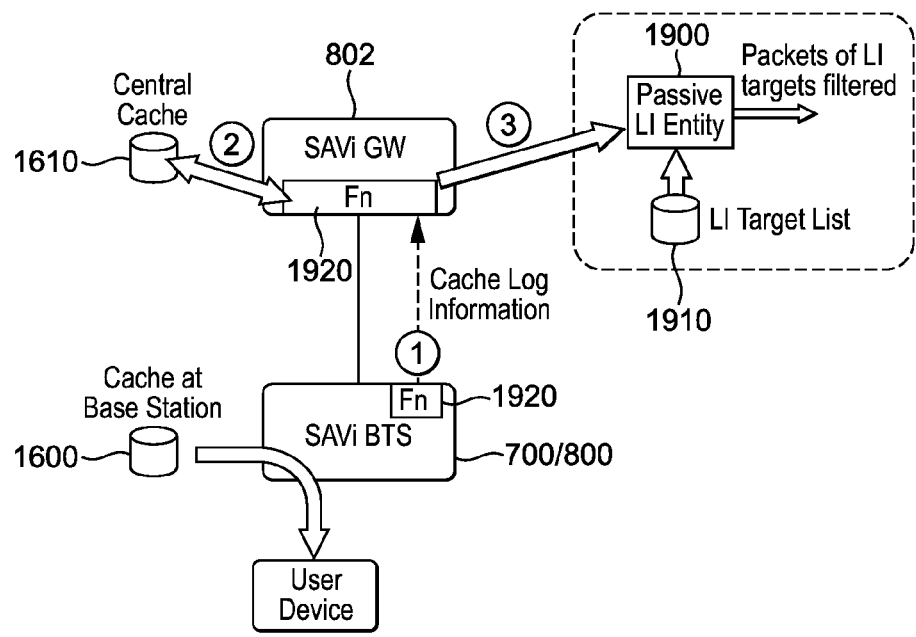
FIG. 32 shows the exchange of data between network elements according to an embodiment of the invention for Lawful interception when there is content caching at the radio site.

For content cached locally at the access node platform 700/800, it can be assumed that a central copy of the content is available, and therefore a reference of the specific content needs to be reported to the access node platform 700/800. Other information may also need to be sent, for example, total delivered traffic volume, pointers to identify which part of the content was delivered (e.g. Start Point & Offset). Steps (1)-(3) are shown in FIG. 32.

Figure 33:
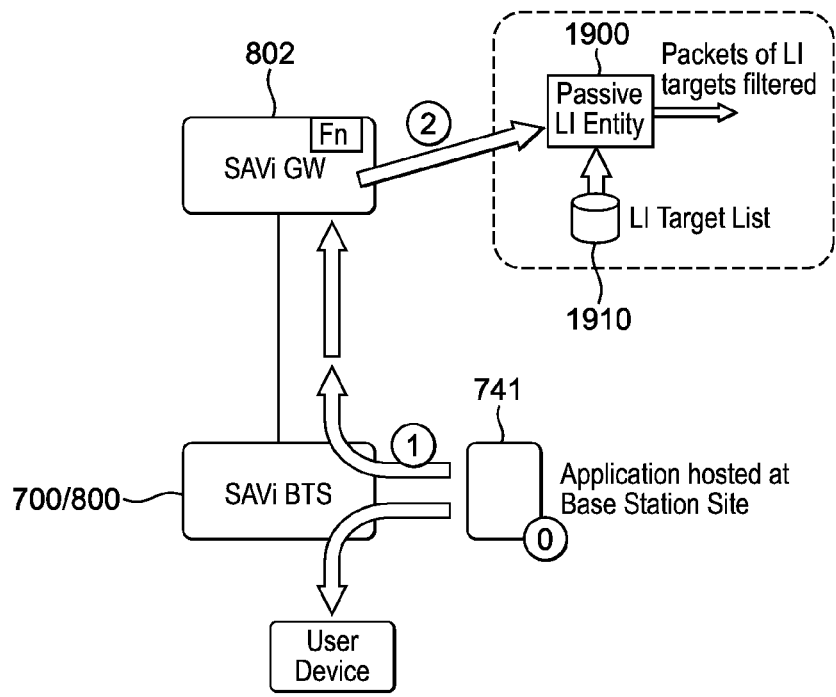
FIG. 33 shows the exchange of data between network elements according to an embodiment of the invention for Lawful interception when an application is hosted at the radio site.

1) "Log" Information is sent in real-time to the LI Function 1920 in Gateway 802 for All Users (irrespective of whether LI target)—Referencing content and User
2) LI function 1900 in GW 802 responsible for retrieving "Log" information from access node platform 700/800; and pulling relevant content from Central Cache 1610.
3) Packets for All users passed to LI function 1920. Each packet is encapsulated with header including the Identity of User 7.4.3 Applications Hosted at Base Station Site During the Application certification/integration process it will be identified how the Lawful Intercept should be applied for data from that application. For each application 741 hosted at the access node platform 700/800; none, some or all traffic related to the application 741 may be duplicated and passed to the Gateway platform 802. The Platform 700 of the Gateway 802 would be responsible for routing the duplication of both uplink and downlink Application traffic. The access node platform 700/800 at the base station would not be aware of any customer specific LI requirements, and reporting is purely based on application/service type. FIG. 33 shows steps (0)-(2).

0) Classification of Application 741 by type—prior to installation—which determines if all/some/none of traffic is of potential LI interest
1) All Traffic of potential LI interest (irrespective of User) is duplicated and passed to Gateway 802—labelled with Source and destination User and Application
2) Gateway 802 responsible for ensuring all data passed to LI system and labelled correctly An example of an application 741 which has traffic of partial interest to LI may include Game servers which include traffic related to the internal operation of the game, as well as an associated voice or messaging path for in-game person to person communications. During Application 741 certification/integration it would be deemed that the communications aspects of the game need to be handled through LI; therefore the access node platform 700/800 would filter these packets and pass them to the Gateway 802. Other access node platform 700/800/Customer specific information would also need to be passed with the Data, e.g. customer identities of each of the locally served end-points.

Figure 34:
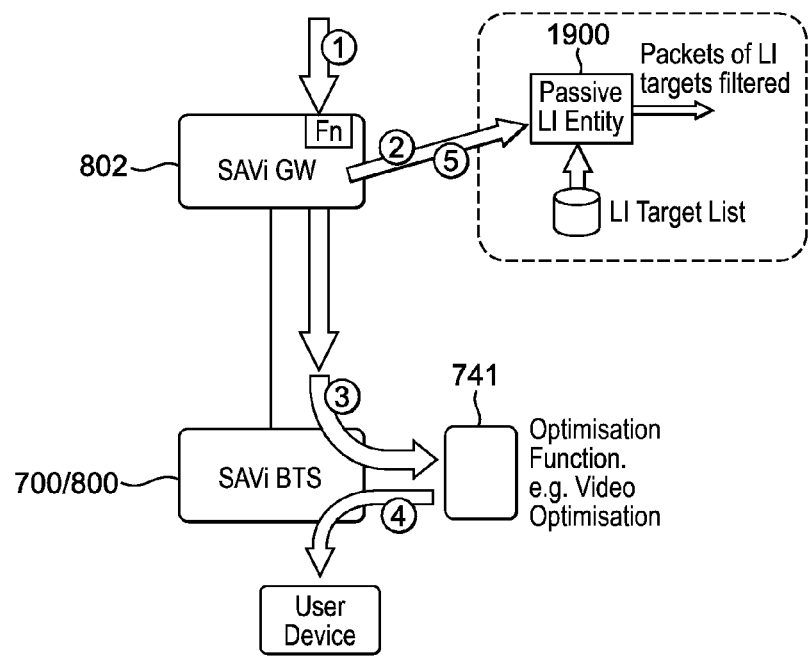
FIG. 34 shows the exchange of data between network elements according to an embodiment of the invention for Lawful interception when content is optimised at the radio site.

7.4.4 Content Optimised at Base Station Site

Where the access node platform 700/800 is performing optimisation of the content, it is assumed that the LI function does not need to be made aware of the created lower quality version of the data flow, and therefore LI routeing function of the access node platform 700/800 is not invoked. FIG. 34 shows steps (1)-(5).

1) User traffic received is from Web 8.
2) Gateway 802 is responsible for ensuring all data passed to LI system 1900 and labelled correctly.
3) Traffic is received at access node platform 700/800; however the content needs to be optimised, e.g. resolution adjusted due to real-time radio conditions.
4) Packets and content are delivered to User are different than those delivered to LI; however this is considered to be equivalent to voice which typical transcoded after LI is enforced.
5) Alternatively the feed to the LI system 1900 (2) could be delayed until the GW 802 has been informed of the outcome of the transmission to the User.

7.4.5 Uplink Content Spooled to Base Station Site

Figure 35:
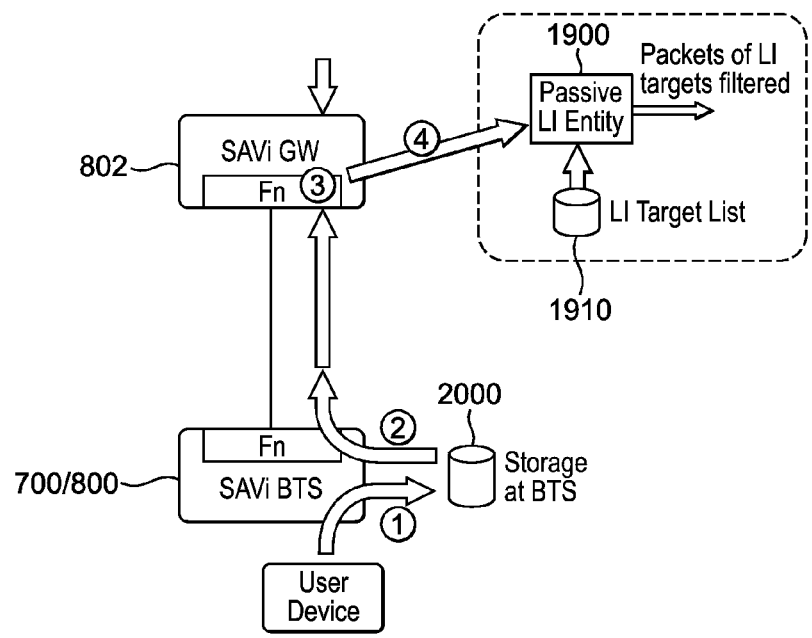
FIG. 35 shows the exchange of data between network elements according to an embodiment of the invention for Lawful interception when Uplink Content is Spooled to the Base Station site.

When content is spooled from the user device to the access node platform 700/800, it may then delivered more slowly in the uplink over the backhaul transport to the Gateway 802. The access node platform 700/800 is responsible for ensuring content stored at the access node platform 700/800 cannot be accessed by other Applications nor by other Users until it has been passed to the GW 802 and LI been enforced. The access node platform 700/800 is also responsible for running timers associated to Content received and stored at the access node platform 700/800 to ensure that it is delivered within a set period of time e.g. 30 mins. FIG. 35 shows steps (1) to (4).

1) Uplink content is transmitted by the User is stored at the access node platform 700/800 for some time
2) When the backhaul congestion has reduced the access node platform 700/800 passes the User content to the GW 802—Including information on Time of transmission & Customer details
3) A function in GW 802 is responsible for packaging the uplink transmission with time and User information (For All Users)
4) Packets for All users are passed to LI function 1900. Each packet is encapsulated with header including the Identity of User & Time of transmission 8 Roaming For subscribers roaming onto platform 700 enabled 3GPP network their signalling and traffic is assumed not to impact the functional requirements of the platforms 700. Certain functions and applications may need to be inhibited for these subscribers which would be handled through local configuration/policy. Depending on the roaming configuration (e.g. home routed traffic), it may not be possible to retrieve information such a policy information from a PCRF 9 or may not be possible to control the actions of the GGSN 6 since they reside in the home network of the subscriber.

9 Security

Due the typical environment where platforms 700 will be deployed, the functionality of the platform 700 and the information which is held on the platform 700, security and integrity of the platform is an imperative.

The communications link between the 3GPP node and platform 700 needs to be secure.

Figure 36:
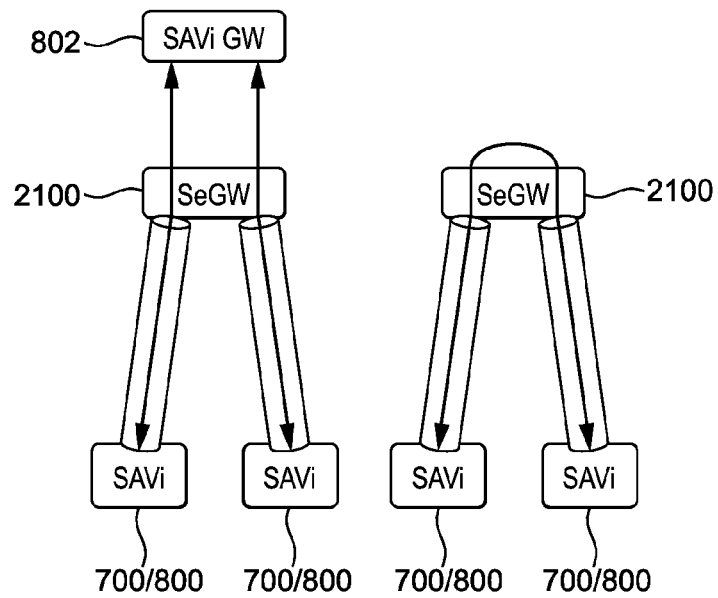
FIG. 36 shows the network elements according to an embodiment of the invention including a security gateway.

The security architecture for communications between platforms 700 should follow similar architecture principles as LTE; whereby the site to site communications of the X2 interface is typically via a Security Gateway (SeGW) 2100 in the operator's network, as shown in FIG. 36.

The communications between platform 700 and the GW 802 is secured between the platform 700 and the SeGW 2100, and then the path of the communications between the SeGW 2100 and GW 802 can be assumed to be over a trusted transmission network.

10 Early Implementation of SAVi

When platforms 700 are introduced into a 3GPP network, there may be significant cost and complexity integrating platforms 700 into the Core systems. It is therefore envisaged that tactical solutions to enable platforms 700 to be deployed whilst minimising complexity are required.

As the core systems are already integrated into SGSN 5 and GGSNs 6, these nodes may need to be leveraged, requiring these nodes to see all traffic for all users.

There are a number of possible solutions for the re-use of the SGSN/GGSN functions, and the following description is based on just one example. The main aim of a tactical solution is to minimise the impact to legacy systems; and as user data is dominated by the downlink and transmission networks are typically symmetric it should aim to minimise additional downlink data on the transmission network.

The GGSN 6 is responsible for performing charging, IP packet spoofing and some aspects of LI; and the IP packet spoofing capability can be abused to perform charging and LI for packets that injected by the platform 700.

The solution needs to cope with applications/services hosted in the platforms 700 environment as well as services that are required to operate transparently on the data stream. For the early implementations it is assumed that all user traffic is maintained within the PDP context of the user; therefore the platforms 700 would not need to ensure that users presented the correct IP address—this functionality could be maintained in the GGSN 6.

10.1 Hosted Services/Applications

Figure 37:
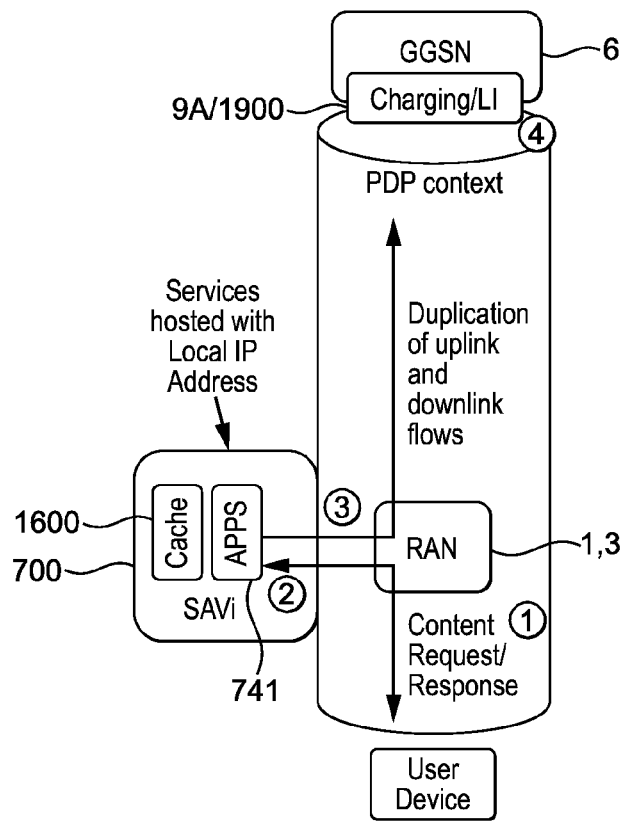
FIG. 37 shows the exchange of data between network elements according to an embodiment of the invention for hosting services on the platform.

FIG. 37 shows steps (1) to (4).

1) When the User requests a service that is hosted on the platform 700 environment, the DNS response for this service returns an IP address local to the platform 700 (e.g. an operator defined range of Public IP addresses for platform 700; or a range of private IP addresses).
2) When an IP packet for a local service is received in the platform 700 from the UE; the platform 700 passes the packet to the local service/application 741; and duplicates the packet and sends it back onto the GTP-U tunnel of the same PDP context in the uplink to the GGSN 6. (A) The source IP address would be that of the UE; and the destination address would be from the platform IP address range.
3) When the service/application 741 responds to the User device, the platform 700 duplicates the downlink packets and sends them to the GGSN 6 in the uplink GTP-U tunnel of the PDP context. (B) The source IP is the address the service/application 741; and the destination address that of the UE.
4) The GGSN 6 would need to be configured to enforce Charging 9A and LI before IP 1900 spoofing/firewalls functionality. For (A) the GGSN 6 is configured to ensure destination IP address for local SAVi service/applications 741 are not routeable; and for (B) the GGSN 6 would be configured to drop packets whose source IP address is not of the UE.

10.2 Transparent Services

Figure 38:
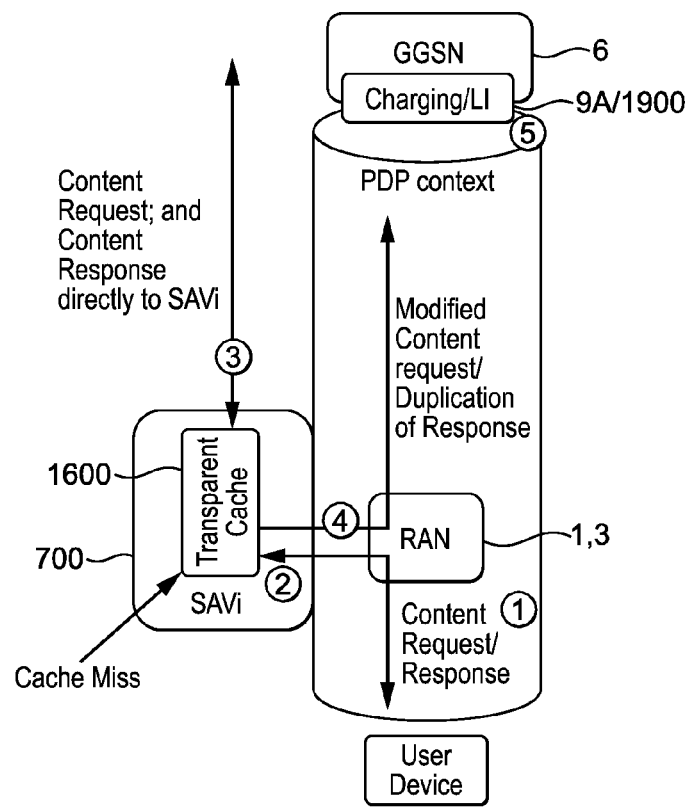
FIG. 38 shows the exchange of data between network elements according to an embodiment of the invention for transparent services on the platform.

FIG. 38 shows steps (1) to (5).

1) The User requests a service and the DNS response for this service returns an IP address which is not local to the platform environment (e.g. a 3$^{rd}$ party web site)
2) A request from the UE is received in the platform 700 environment; the platform 700 checks the local cache 1600 for the content. The platform 700 duplicates the User Request and sends it in the uplink GTP-U tunnel of the user's PDP context to the GGSN 6, however the (A) Source Address of the IP packet is modified to indicate a local IP Address of the cache 1600.
3) If the content does not exist in the cache 1600 the platform 700 contacts the GW 802 for the content; when the content is retrieved from the 3$^{rd}$ party web server. When the GW 802 responds with the content corresponding to the request, the content can be tagged with Adult Content Filter rules such that it can be stored at the cache 1600.
4) The platform verifies the UE context information stored in the platform 700 to determine whether restrictions to the content apply to this user. If it is OK to deliver this content to this UE the platform 700 sends the packets to the UE; The platform 700 also duplicates downlink packets and sends them on the uplink GTP-U tunnel of the users PDP context to the GGSN 6; (B) The packet includes a source IP is the address the web page; and the destination address is that of the UE.
5) The GGSN 6 is configured to enforce Charging 9A and LI 1900 before IP spoofing/firewalls functionality. (A&B)

The GGSN 6 determines if the source IP address of the packets received on the uplink GTP-U tunnel does not correspond to the IP address of the UE and therefore the GGSN 6 would be drop packets.

For these early implementation options, considerable quantities of content may be unnecessarily transmitted in the uplink. This could be addressed by introducing a caching capability in the uplink GTP-U data path.

10.3 Pre-Pay Out-of-Credit

Figure 39:
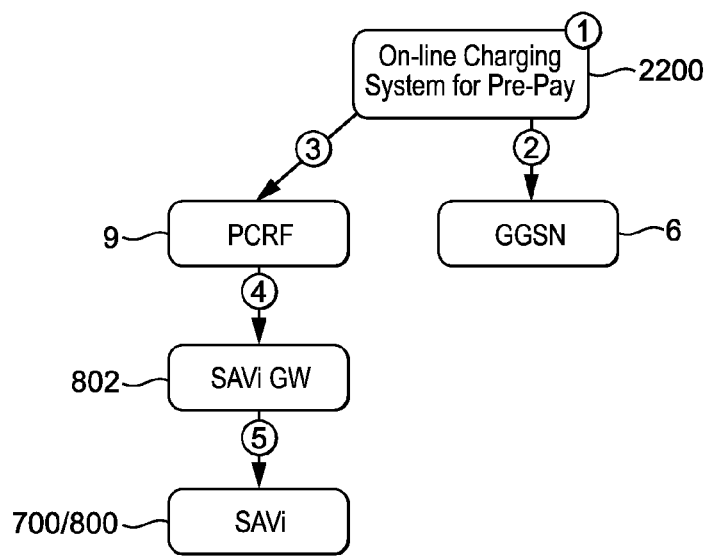
FIG. 39 shows the exchange of data between network elements according to an embodiment of the invention for controlling use of the network by pre-pay subscribers.

One of the challenges with maintaining the charging interfaces at the GGSN 6 is that when content is being served by the platform 700 on the data path of the PDP context; the existing mechanisms to handle the scenario when a pre-pay user runs-out of credit is by-passed by the platform 700. There are a number of solutions to solve this scenario. FIG. 39 shows steps (1) to (5).

1. Pre-paid UE runs out of Credit for Data Session
2. The OCS (Online Charging System) 2200 instructs GGSN 6 of the Out-of-Credit Handling for this UE: a) Block Uplink/Downlink; b) Do nothing or c) Redirect to top-up server
3. If PCRF 9 has subscribed to Out-of-Bundle Events on the OCS 220 for Pre-pay; the OCS 2200 informs the PCRF 9 that the pre-pay user has no credit.
4. PCRF 9 informs GW 802 that UE out of Credit and informs it of the Handling for this UE. Alternatively the OCS 2200 could inform the GW 802 directly of the Out-of-Bundle event.
5. If the Out-of-credit Handling indicates Option a) or Option c) the GW 802 sends an updated UE context to the platform 700; including an indication that the platform 700 can no longer serve traffic for this UE. The platform 700 returns all ongoing sessions to the PDP context to the GGSN 6; and the existing mechanisms implemented at the GGSN 6 will handle the enforcement of Out-of-Bundle scenarios.

The GW 802 registers for top-up events for this UE, and is informed when the UE can again access the platform 700 system. Once the UE has topped-up, the GW 802 updates the UE context in the platform 700 to indicate that the platform 700 can serve traffic for this UE.

10.4 Direct Tunnel

The early implementations of platforms 700 may still require considerable traffic volumes to be passed over the 3GPP network and therefore it may require further capacity investment. It is therefore proposed that 3GPP Direct Tunnel is implemented in the network to limit total throughput of SGSN and Core transmission.

One of the challenges with direct tunnel is the devices that frequently transition between PMM Idle and Active states; which requires core network signalling to toggle the downlink path between SGSN 5 and RNC 3 to maintain paging functionality of the SGSN 5 when the device is in Idle. However this does not need to be completed for the uplink path; it is therefore proposed that direct tunnel be introduced in the uplink even if the Idle/Active signalling load prohibits its use in the downlink.

A.1 Activation

Figure 40:
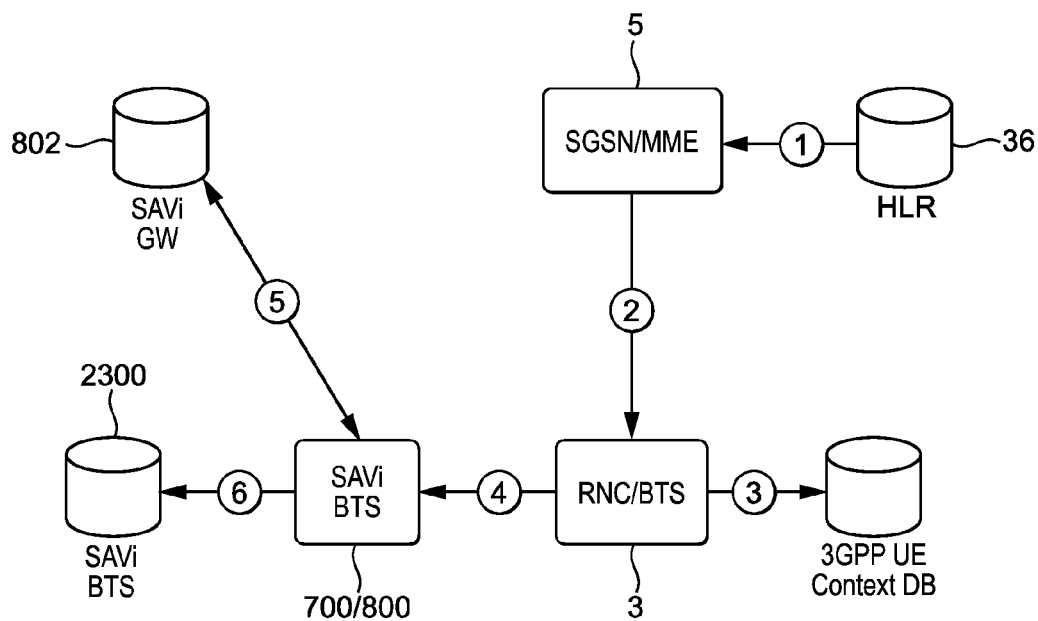
FIG. 40 shows the exchange of data between network elements according to an embodiment of the invention when a mobile terminal attached to the network which includes platforms.

FIG. 40 shows steps (1) to (6).

1. When the UE attaches to the network the HLS 36 provide the SGSN 5 with the Subscriber Profile (RFSP-ID) of the UE. This profile includes a pointer to a Subscriber type which is transparently passed to the RAN 3. The Subscriber Type could be used to indicate whether platforms 700 are available for the UE.
2. The SGSN 5 provides the Subscriber Type when the Iu or S1 interface is established for the UE in the Common ID message alongside the IMSI. Alternatively, one of the QoS parameters passed to the RAN 3 when the UE enters active state can be used to determine whether platforms 700 are applicable to the PDP context.

3. When the RAN 3 receives the UE context from the SGSN 5 it is stored locally within the 3GPP node. The indication of platform 700 applicability for this user is stored as part of this profile. The profile is passed to the new 3GPP RAN node when a mobility event occurs.

4. The 3GPP Node passes an indication to the platform 700 that a new UE that can use platforms 700 has arrived on the node; and provides the IMSI and SAVi Sub Profile.

5. The platform 700 performs User Registration for the new UE and indicates that it is a Controller, Traffic Source and Information source for the UE. The request identifies the UE by the IMSI. The GW 802 responds to the platform 700 and includes the platform UE Context for the UE.

6. The platform 700 stores the SAVi UE context in context store 2300.

The section headings of the description are provided for ease of reference only and should not be interpreted as limiting the scope of protection.

The invention claimed is:

1. A mobile telecommunications network comprising:
   a network core; and
   a radio access network having radio means for wireless communication with terminals registered with the network, the radio access network comprising control means operable to control the use of network resources by said terminals,
   wherein the control means is operable to receive a request for a service from a terminal and to determine, based on one or more specified criteria associated with the requested service, whether the control means should provide access to an application hosted on the control means that provides the requested service, or whether the control means should pass the request elsewhere for provisioning by another entity, and
   wherein the control means is operable to return to the terminal an address which facilitates access to the application providing the service hosted on the control means, or to return a second address that provides access to the service elsewhere in dependence upon the determination by the control means.

2. The network of claim 1, wherein the control means is further operable to receive network policy from the network core, wherein the determination of whether the control means should provide access to an application hosted on the control means which provides the requested service or should pass the request to another entity is dependent on the network policy.

3. The network of claim 2, wherein the network policy includes routing information.

4. The network of claim 1, wherein the request for service is a DNS lookup request.

5. The network of claim 1, wherein the address which facilitates access to the service at the control means is an IP address of an application providing the requested service at the control means.

6. The network of claim 1, wherein the address which facilitates access to the service elsewhere is an address which enables the service to be provided via the network core.

7. The network of claim 1, wherein the control means is further operable to record details of content that it delivers to a terminal and to pass the details to the core network, the details enabling the core network to access a copy of the content for analysis.

8. The network of claim 1, wherein the control means is further operable to host an application and to selectively pass traffic related to that application for analysis by the network core.

9. The network of claim 1, wherein the control means is further operable to cache data relating to an application hosted thereby and includes means for temporarily restricting access to the cached data until the cached data has been analysed at the network core.

10. The network of claim 1, wherein the control means is further operable to cache data relating to an application hosted thereby, the control means further operable to check the cache data in response to receiving the request for service to determine whether the requested service can be provided at the control means from the cache data.

11. The network of claim 1, wherein the control means is further operable to cache data relating to an application hosted thereby and to apply an identifier to the cached data to be used by the control means to determine whether a terminal is granted access to the cached data.

12. The network of claim 1, wherein the control means is further operable to apply an identifier to the service hosted at the control means, the control means operable to determine if a terminal is granted access to the service dependent on the identifier.

13. The network of claim 1, wherein the control means is further operable to receive from the terminal a terminal profile, and wherein the control means is operable to determine if the terminal is granted access to the service dependent on an indicator within the profile.

\* \* \* \* \*